(12) United States Patent
Kato et al.

(10) Patent No.: US 11,700,455 B2
(45) Date of Patent: Jul. 11, 2023

(54) IMAGE CAPTURING DEVICE, IMAGE COMMUNICATION SYSTEM, AND METHOD FOR DISPLAY CONTROL

(71) Applicants: Yoshinaga Kato, Kanagawa (JP); Naoki Tsunoda, Tokyo (JP)

(72) Inventors: Yoshinaga Kato, Kanagawa (JP); Naoki Tsunoda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/178,265

(22) Filed: Feb. 18, 2021

(65) Prior Publication Data

US 2021/0258484 A1 Aug. 19, 2021

(30) Foreign Application Priority Data

Feb. 19, 2020 (JP) .................................. 2020-025870
Jan. 21, 2021 (JP) .................................. 2021-008249

(51) Int. Cl.
*H04N 5/232* (2006.01)
*H04N 5/247* (2006.01)
*H04N 23/698* (2023.01)
*H04N 23/45* (2023.01)

(52) U.S. Cl.
CPC ........... *H04N 23/698* (2023.01); *H04N 23/45* (2023.01)

(58) Field of Classification Search
None
See application file for complete search history.

(56) References Cited

U.S. PATENT DOCUMENTS

| 6,445,399 B1 * | 9/2002 | Sroka | G06T 7/73 715/767 |
| 7,965,314 B1 * | 6/2011 | Miller | H04N 5/33 250/330 |
| 10,592,750 B1 * | 3/2020 | Yavagal | G06V 20/41 |

(Continued)

FOREIGN PATENT DOCUMENTS

| CN | 104954644 A | 9/2015 |
| CN | 110691192 A | 1/2020 |

(Continued)

OTHER PUBLICATIONS

Miguel Lourenco, et al., "Localization in indoor environments by querying omnidirectional visual maps using perspective images", 2012 IEEE International Conference on Robotics and Automation, May 14-18, 2012, 7 pages, XP032450865.*

(Continued)

*Primary Examiner* — Edemio Navas, Jr.
(74) *Attorney, Agent, or Firm* — Xsensus LLP

(57) ABSTRACT

An image capturing device includes: an imaging device to capture a first image; and circuitry to receive a second image from another image capturing device, the second image being captured with the another image capturing device and having an angle of view wider than that of the first image, and control a display to sequentially display the first image, and an image of an area of the second image that is similar to the first image, the image similar to the first image having the degree of similarity to the first image that is equal to or greater than a threshold.

19 Claims, 31 Drawing Sheets

(56) References Cited

U.S. PATENT DOCUMENTS

| | | | | |
|---|---|---|---|---|
| 2010/0110212 | A1* | 5/2010 | Kuwahara | H04N 5/23206 348/148 |
| 2012/0249408 | A1* | 10/2012 | Moliton | G02F 1/1347 345/156 |
| 2015/0271415 | A1* | 9/2015 | Uemura | H04N 5/232945 348/222.1 |
| 2017/0302856 | A1 | 10/2017 | Noguchi et al. | |
| 2018/0182065 | A1 | 6/2018 | Yoshida et al. | |
| 2018/0184001 | A1 | 6/2018 | Yoshida et al. | |
| 2018/0376058 | A1* | 12/2018 | Iwamoto | H04N 5/2628 |
| 2019/0149744 | A1 | 5/2019 | Fukunaga | |
| 2020/0288083 | A1 | 9/2020 | Toda | |
| 2020/0304751 | A1 | 9/2020 | Katoh et al. | |
| 2020/0412944 | A1* | 12/2020 | Okada | H04N 5/23229 |
| 2021/0344838 | A1* | 11/2021 | Takamizawa | H04N 5/23296 |

FOREIGN PATENT DOCUMENTS

| | | |
|---|---|---|
| JP | 2018-110384 | 7/2017 |
| JP | 2018-169601 | 11/2018 |
| JP | 2020-021200 | 2/2020 |

OTHER PUBLICATIONS

Extended European Search Report dated Jun. 15, 2021 in European Patent Application No. 21156186.5, 8 pages.

Miguel Laurenco, et al., "Localization in indoor environments by querying omnidirectional visual maps using perspective images", 2012 IEEE International Conference on Robotics and Automation, May 14-18, 2012, 7 pages, XP032450865.

Office Action dated Feb. 7, 2022 in Chinese Patent Application No. 202110189868.0, 8 pages.

* cited by examiner

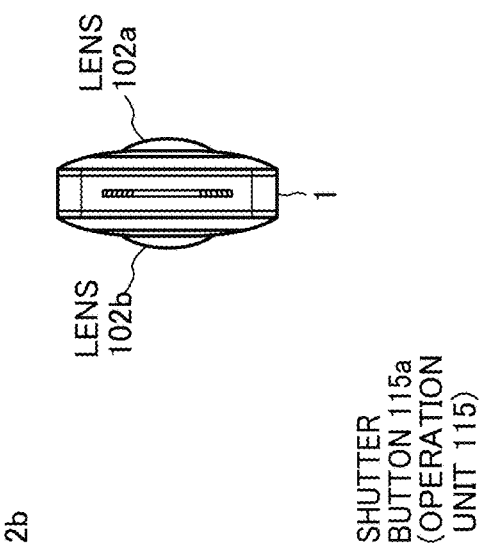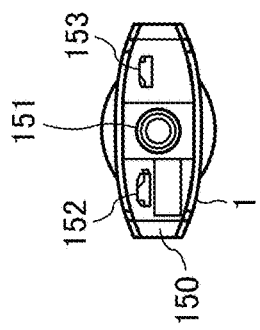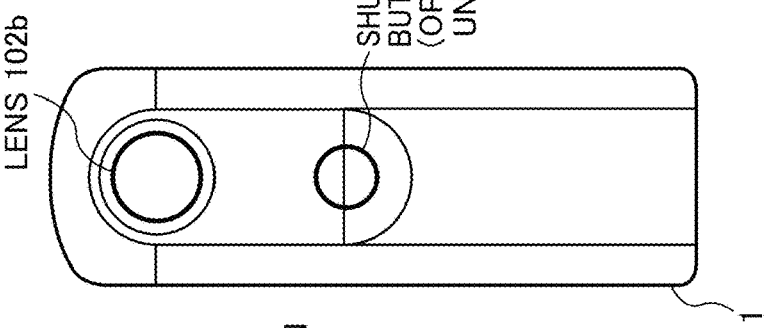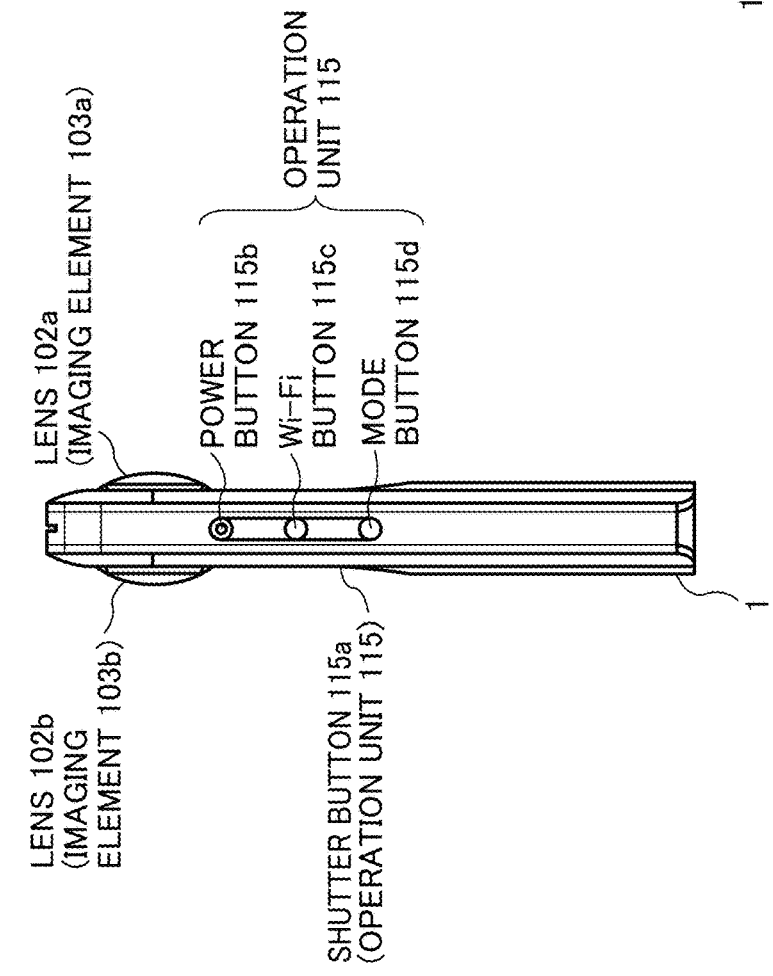

HEMISPHERICAL IMAGE (FRONT)

HEMISPHERICAL IMAGE (BACK)

EQUIRECTANGULAR PROJECTION IMAGE EC (WIDE-ANGLE VIEW IMAGE)

FIG. 4B
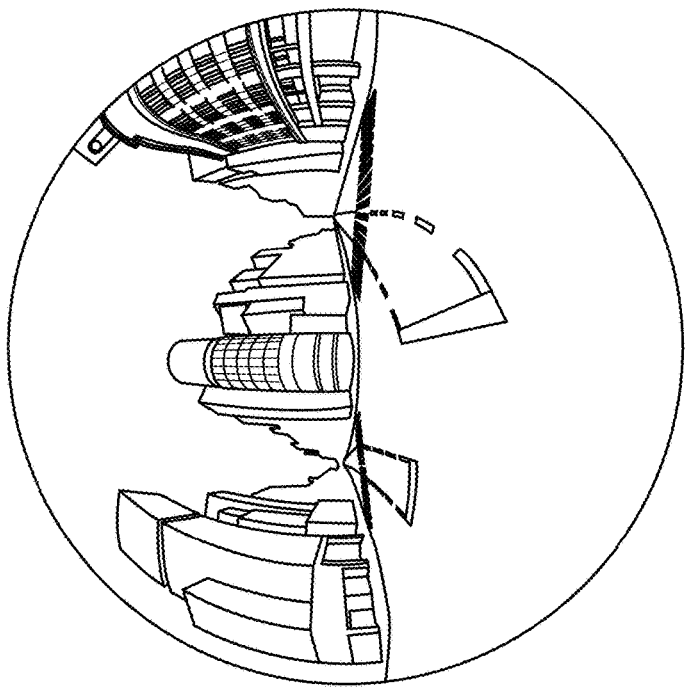
SPHERICAL IMAGE CE
FIG. 4A
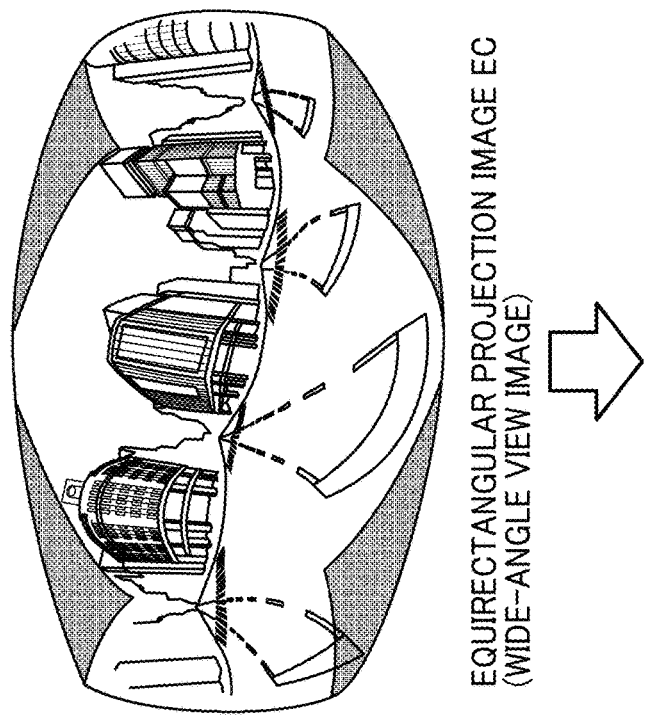
EQUIRECTANGULAR PROJECTION IMAGE EC
(WIDE-ANGLE VIEW IMAGE)
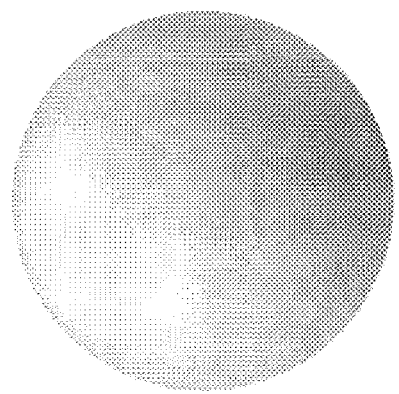

FIG. 26
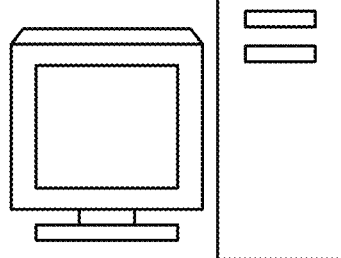
IMAGE COMMUNICATION SYSTEM
IMAGE MANAGEMENT SERVER 5
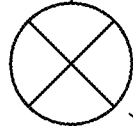
ACCESS POINT 7
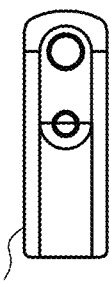
SPHERICAL IMAGE CAPTURING DEVICE 1 (WIDE-ANGLE VIEW IMAGE CAPTURING DEVICE)
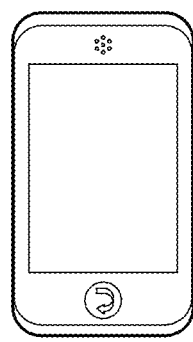
SMART PHONE 3 (NARROW-ANGLE VIEW IMAGE CAPTURING DEVICE)
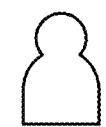
USER A

IMAGE CAPTURING DEVICE, IMAGE COMMUNICATION SYSTEM, AND METHOD FOR DISPLAY CONTROL

CROSS-REFERENCE TO RELATED APPLICATIONS

This patent application is based on and claims priority pursuant to 35 U.S.C. § 119(a) to Japanese Patent Application Nos. 2020-025870, filed on Feb. 19, 2020, and 2021-008249, filed on Jan. 21, 2021, in the Japan Patent Office, the entire disclosure of which is hereby incorporated by reference herein.

BACKGROUND

Technical Field

The present invention relates to an image capturing device, image communication system, method for display control, and recording medium.

Description of the Related Art

Recently, there is a demand for displaying a wide-angle view image with an image capturing device capable of displaying an image as a narrow-angle view image. For example, a wide-angle view image, such as an equirectangular projection image, may be captured with a wide-angle view image capturing device such as a spherical (360-degree) image capturing device. The captured wide-angle view image may be then displayed using a narrow-angle view image capturing device, such as a smart phone.

However, even though the wide-angle view image can be taken, the narrow-angle view image capturing device can only display a limited portion of the wide-angle view image, as the narrow-angle view image. By just looking at an object in the narrow-angle view image, it has been difficult for a viewer to recall a place where the image was taken or situation under which the image was taken.

SUMMARY

According to one or more embodiments, an image capturing device includes: an imaging device to capture a first image; and circuitry to receive a second image from another image capturing device, the second image being captured with the another image capturing device and having an angle of view wider than that of the first image, and control a display to sequentially display the first image, and an image of an area of the second image that is similar to the first image, the image similar to the first image having the degree of similarity to the first image that is equal to or greater than a threshold.

According to one or more embodiments, an image communication system includes: the image capturing device and the another image capturing device configured to capture the second image.

According to one or more embodiments, a method for controlling display of an image, includes: obtaining a first image and a second image, the second image having an angle of view wider than that of the first image, the second image having been captured by a second image capturing device different from a first image capturing device that has captured the first image; and controlling a display to sequentially display the first image, and an image of an area of the second image that is similar to the first image, the image similar to the first image having the degree of similarity to the first image that is equal to or greater than a threshold.

According to one or more embodiments, a control program for causing a computer system to carry out the method for controlling display of an image is provided.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 1A to 1D (FIG. 1) are respectively a right side view, a rear view, a plan view, and a bottom view of a spherical image capturing device, according to embodiments;

FIG. 4A and FIG. 4B are views respectively illustrating the image in equirectangular projection covering a surface of a sphere, and a spherical image, according to embodiments;

FIG. 26 is a schematic diagram illustrating a configuration of an image communication system according to a fifth embodiment;

Figure 2:
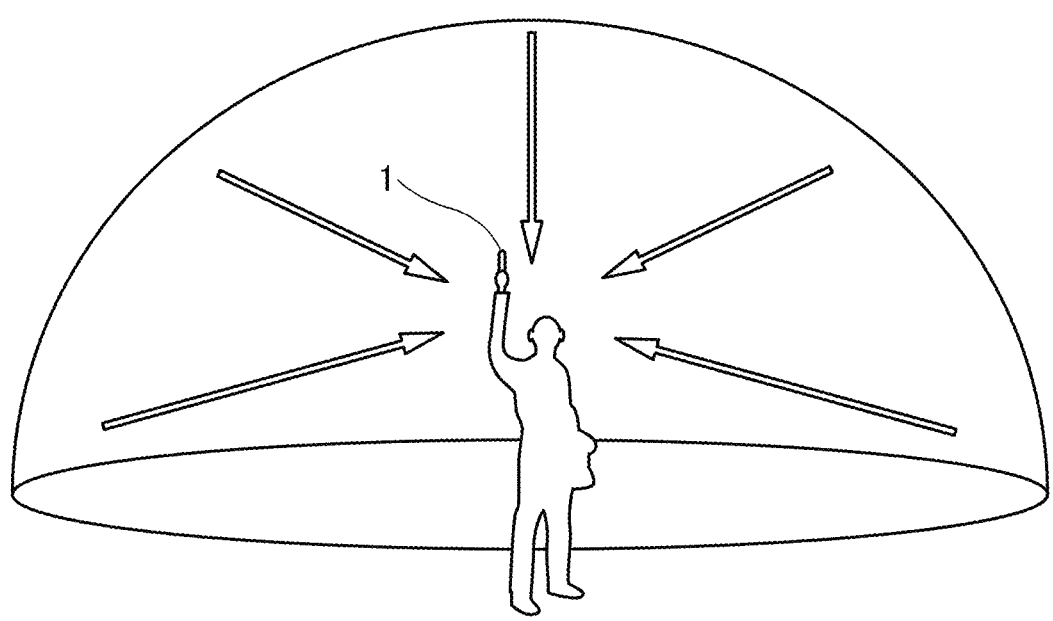
FIG. 2 is an illustration for explaining how a user uses the spherical image capturing device, according to embodiments.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a, "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Overview:

Embodiments of the present invention are described below, with reference to the drawings.

First, referring to FIGS. 1 to 7, operation of generating a spherical image is described according to one or more embodiments.

First, referring to FIGS. 1A to 1D, an external view of a spherical image capturing device 1, is described. The spherical image capturing device 1 is a digital camera for capturing images from which a 360-degree spherical image is generated. FIGS. 1A to 1D are respectively a left side view, a rear view, a plan view, and a bottom view of the spherical image capturing device 1.

As illustrated in FIGS. 1A to 1D, the spherical image capturing device 1 has an upper part, which is provided with a fish-eye lens 102a on a front side (anterior side) thereof, and a fish-eye lens 102b on a back side (rear side) thereof. The spherical image capturing device 1 includes imaging elements (imaging sensors) 103a and 103b in its inside. The imaging elements 103a and 103b respectively capture images of an object or surroundings via the lenses 102a and 102b, to each obtain a hemispherical image (the image with an angle of view of 180 degrees or greater). As illustrated in FIG. 1B, the spherical image capturing device 1 further includes a shutter button 115a on a rear side of the spherical image capturing device 1, which is opposite of the front side of the spherical image capturing device 1. As illustrated in FIG. 1A, one side of the spherical image capturing device 1 is provided with a power button 115b, a Wireless Fidelity (Wi-Fi) button 115c, and an image capturing mode button 115d. Any one of the power button 115b and the Wi-Fi button 115c switches between ON and OFF, according to selection (pressing) by the user. The image capturing mode button 115d switches between a still-image capturing mode and a moving image capturing mode, according to selection (pressing) by the user. The shutter button 115a, power button 115b, Wi-Fi button 115c, and image capturing mode button 115d are a part of an operation unit 115. The operation unit 115 is any section that receives a user instruction, and is not limited to the above-described buttons or switches.

As illustrated in FIG. 1D, the spherical image capturing device 1 is provided with a tripod mount hole 151 at a center of its bottom face 150. The tripod mount hole 151 receives a screw of a tripod, when the spherical image capturing device 1 is mounted on the tripod. The bottom face 150 of the spherical image capturing device 1 further includes a Micro Universal Serial Bus (Micro USB) terminal 152, on its left side. The bottom face 150 further includes a High-Definition Multimedia Interface (HDMI, Registered Trademark) terminal 153, on its right side.

Next, referring to FIG. 2, a description is given of a situation where the spherical image capturing device 1 is used. FIG. 2 illustrates an example of how the user uses the spherical image capturing device 1. As illustrated in FIG. 2, for example, the spherical image capturing device 1 is used for capturing objects surrounding the user who is holding the spherical image capturing device 1 in his or her hand. The imaging elements 103a and 103b illustrated in FIGS. 1A to 1D capture the objects surrounding the user to obtain two hemispherical images.

Figure 3A:
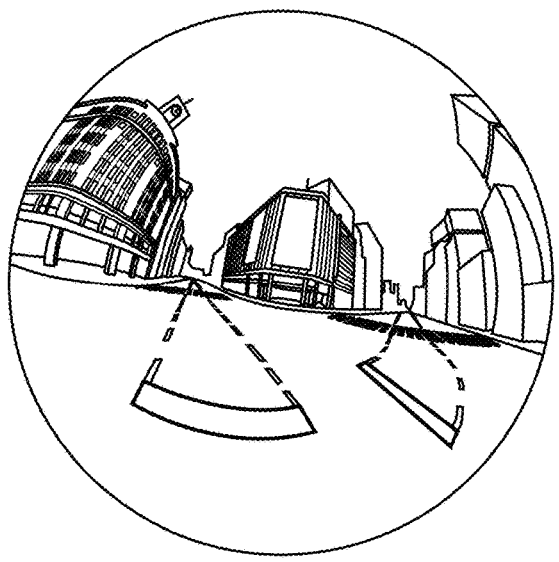
FIGS. 3A, 3B, and 3C (FIG. 3) are views illustrating a front side of a hemispherical image, a back side of the hemispherical image, and an image in equirectangular projection, respectively, captured by the spherical image capturing device, according to embodiments.
Figure 3B:
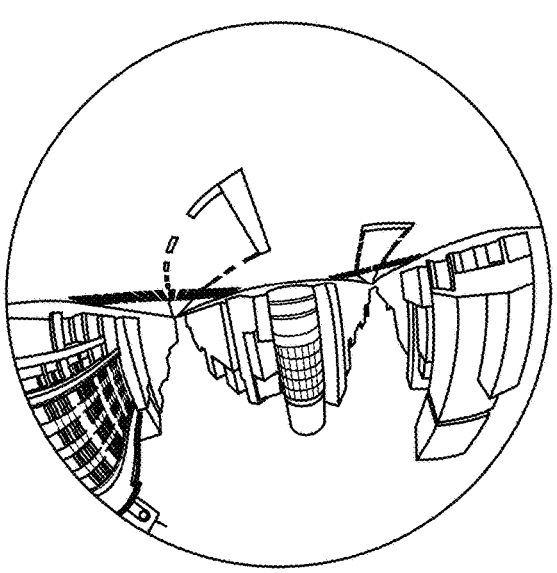
Figure 3C:
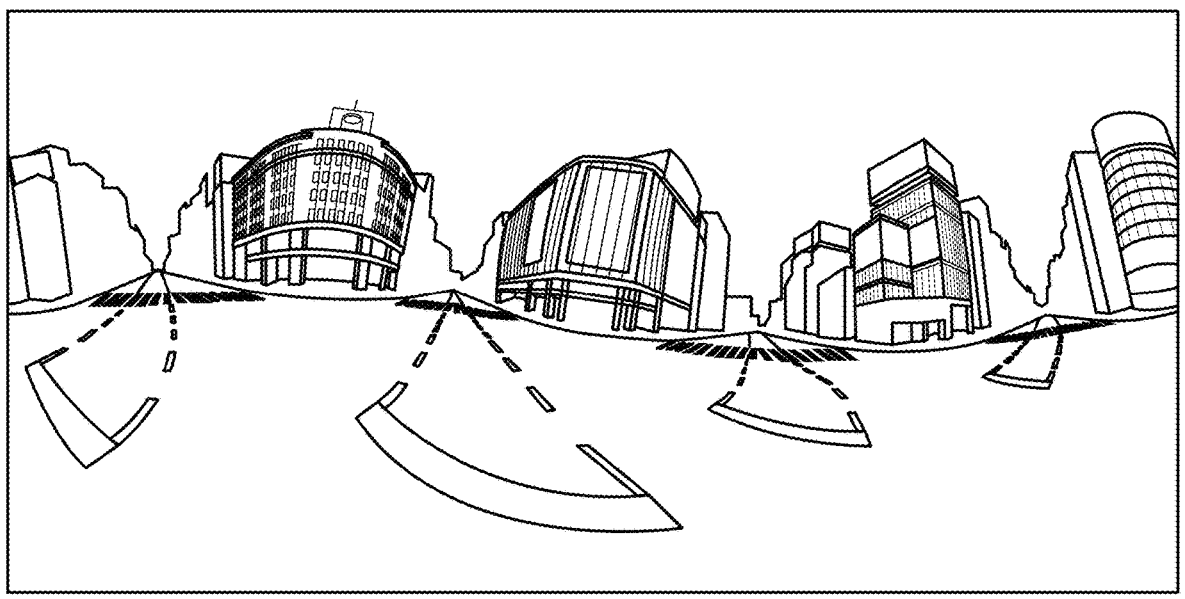

Next, referring to FIGS. 3A to 3C and FIGS. 4A and 4B, a description is given of an overview of an operation of generating an equirectangular projection image EC and a spherical image CE from the images captured by the spherical image capturing device 1. FIG. 3A is a view illustrating a hemispherical image (front side) captured by the spherical image capturing device 1. FIG. 3B is a view illustrating a hemispherical image (back side) captured by the spherical image capturing device 1. FIG. 3C is a view illustrating an image in equirectangular projection, which is referred to as an "equirectangular projection image" (or equidistant cylindrical projection image) EC. FIG. 4A is a conceptual diagram illustrating an example of how the equirectangular projection image maps to a surface of a sphere. FIG. 4B is a view illustrating the spherical image.

As illustrated in FIG. 3A, an image captured by the imaging element 103a is a curved hemispherical image (front side) taken through the fish-eye lens 102a. Also, as illustrated in FIG. 3B, an image captured by the imaging element 103b is a curved hemispherical image (back side) taken through the fish-eye lens 102b. The hemispherical image (front side) and the hemispherical image (back side), which are reversed by 180-degree from each other, are combined by the spherical image capturing device 1. This results in generation of the equirectangular projection image EC as illustrated in FIG. 3C.

The equirectangular projection image is mapped on the sphere surface using Open Graphics Library for Embedded Systems (OpenGL ES) as illustrated in FIG. 4A. This results in generation of the spherical image CE as illustrated in FIG. 4B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image. Further, although the above-described example illustrates a case in which an equirectangular projection image is mapped on a three-dimensional sphere CS, the equirectangular projection image may be mapped on a cube or a prism.

Figure 5:
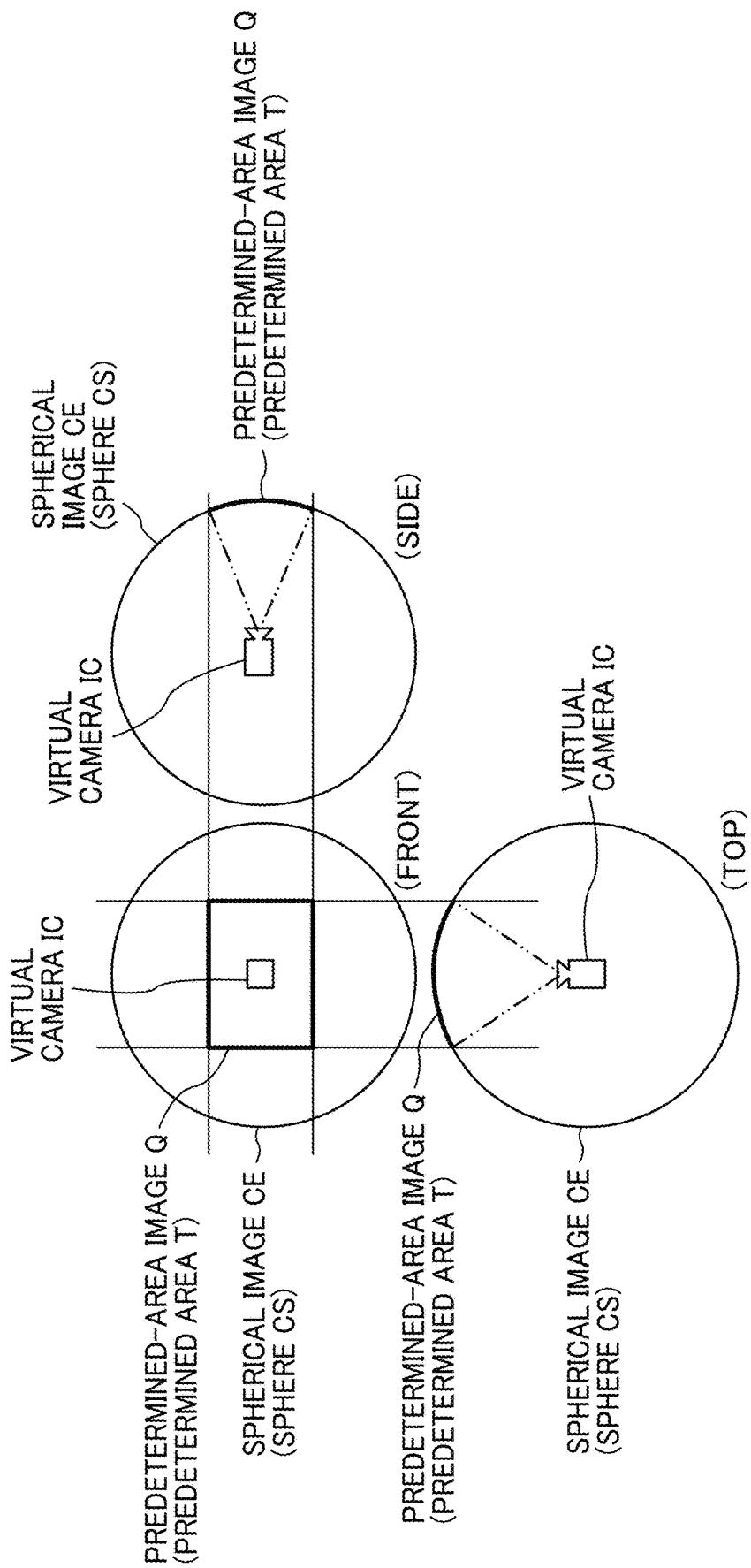
FIG. 5 is a view illustrating positions of a virtual camera and a predetermined area in a case in which the spherical image is represented as a three-dimensional solid sphere according to embodiments.

Since the spherical image CE is an image attached to the sphere surface, as illustrated in FIG. 5B, a part of the image may look distorted when viewed from the user, providing a feeling of strangeness. To resolve this strange feeling, an image of a predetermined area, which is a part of the spherical image CE, is displayed as a flat image having fewer curves. The predetermined area is, for example, an area of the spherical image CE that is displayed to the user, when the spherical image is displayed via a display. While the term "predetermined" is used, the predetermined area may be changed according to user operation. For example, as described referring to FIG. 7, the predetermined area that is firstly displayed is at least set according to information on the vertical camera IC. Hereinafter, a description is given of displaying the predetermined-area image Q with reference to FIG. 5 and FIGS. 6A and 6B.

Figure 6A:
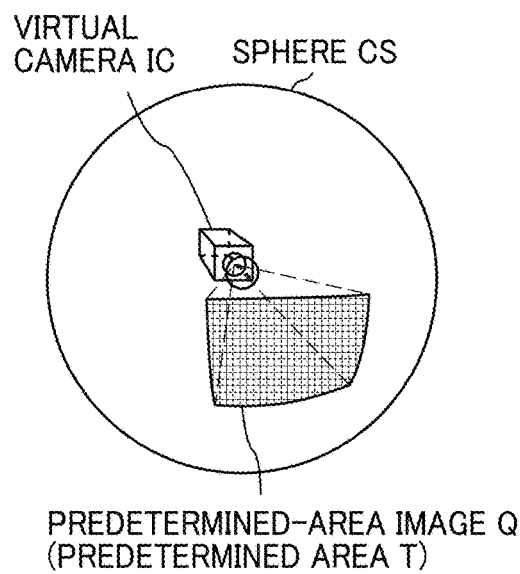
FIGS. 6A and 6B are respectively a perspective view of FIG. 5, and a view illustrating an image of the predetermined area on a display, according to embodiments.
Figure 6B:
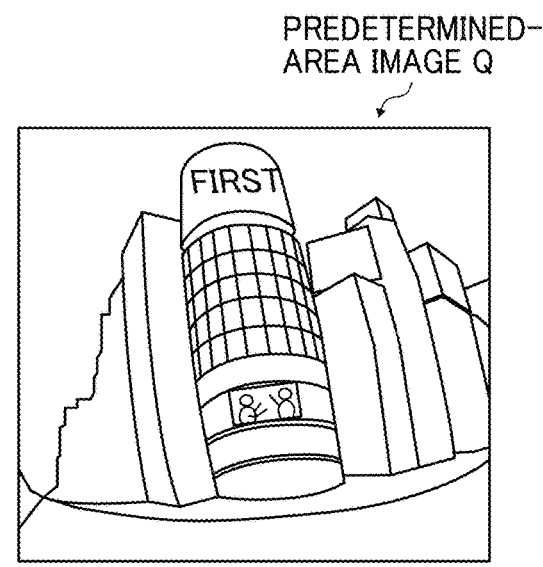

FIG. 5 is a view illustrating positions of a virtual camera IC and a predetermined area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the predetermined-area image Q when displayed on a display. In FIG. 6A, the spherical image CE illustrated in FIG. 4B is represented as being mapped on the three-dimensional solid sphere CS. Assuming that the spherical image CE is mapped on the solid sphere CS, the virtual camera IC is inside of the spherical image CE as illustrated in FIG. 5. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE.

The predetermined-area image Q, which is an image of the predetermined area T illustrated in FIG. 6A, is displayed on a display as an image of an imaging area of the virtual camera IC, as illustrated in FIG. 6B. FIG. 6B illustrates the predetermined-area image Q represented by the predetermined-area information that is set by default. The following explains the position of the virtual camera IC, using an imaging direction ($\theta$, $\varphi$) and an angle of view $\alpha$ of the virtual camera IC. The imaging direction is also referred to as a line-of-sight direction of the user.

Figure 7:
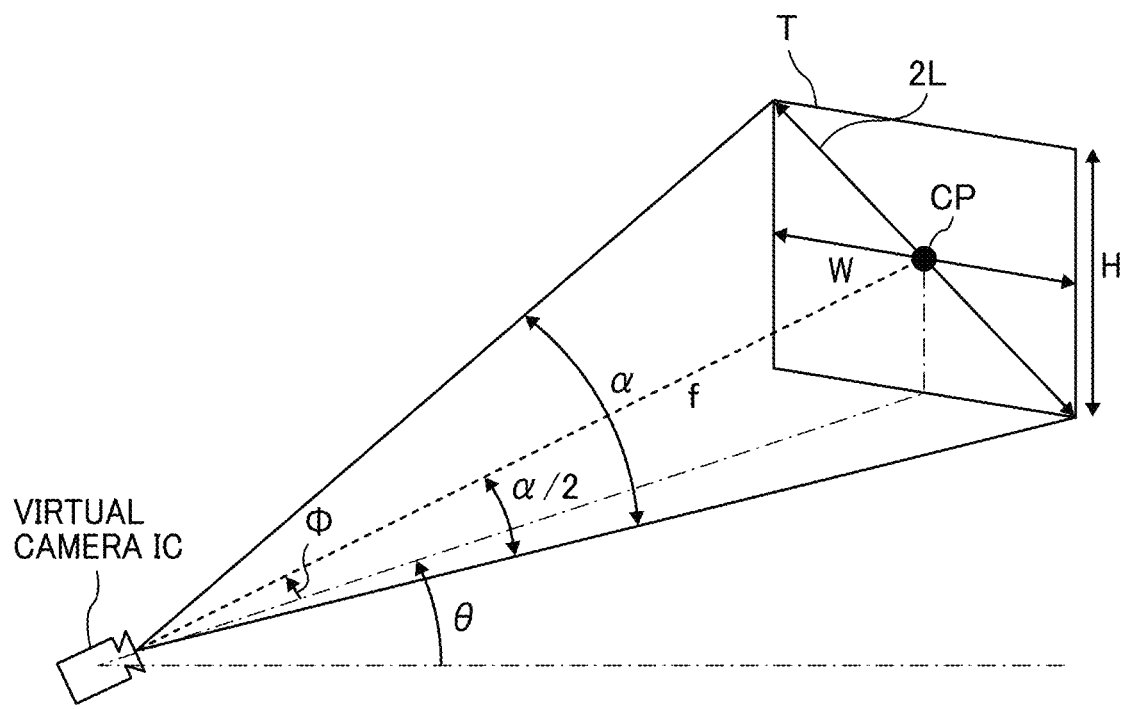
FIG. 7 is a view illustrating a relation between predetermined-area information and a predetermined-area image according to embodiments.

Referring to FIG. 7, a relation between the predetermined-area information and the image of the predetermined area T is described according to the embodiment. FIG. 7 is a view illustrating a relation between the predetermined-area information and the image of the predetermined area T. As illustrated in FIG. 7, "$\theta$" denotes a pan angle in the imaging direction of the virtual camera IC, "$\Phi$" denotes a tilt angle in the imaging direction of the virtual camera IC, and "$\alpha$" denotes an angle of view. Further, "W" denotes a width of the predetermined area T, and "H" denotes a height of the predetermined area T. The position of the virtual camera IC is adjusted, such that the point of gaze of the virtual camera IC, indicated by the imaging direction ($\theta$, $\Phi$), matches the central point CP of the predetermined area T as the imaging area of the virtual camera IC. The predetermined-area image Q is an image of the predetermined area T, in the spherical image CE. "f" denotes a distance from the virtual camera IC to the central point CP of the predetermined area T. "L" is a distance between the center point CP and a given vertex of the predetermined area T (2L is a diagonal line). In FIG. 7, a trigonometric function equation generally expressed by the following equation 1 is satisfied.

$$L/f = \tan(\alpha/2) \qquad \text{(Equation 1)}$$

First Embodiment

Referring now to FIGS. 8 to 16, an image capturing system is described according to a first embodiment.

Figure 8:
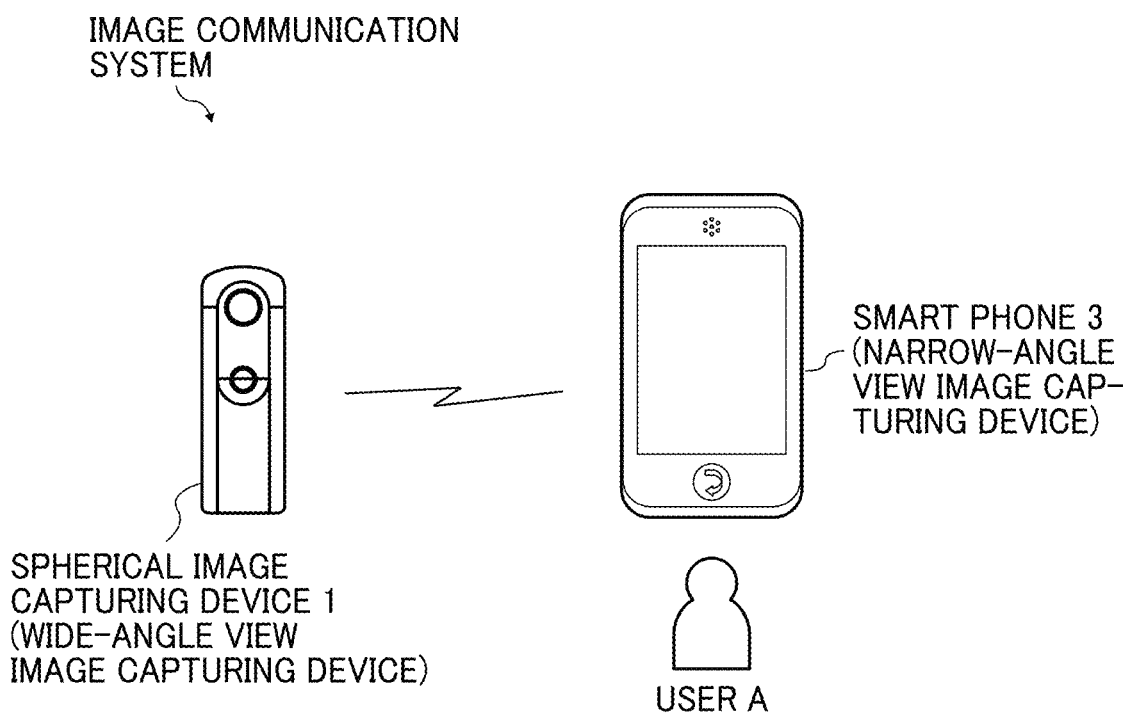
FIG. 8 is a schematic diagram illustrating a configuration of an image communication system according to a first embodiment.

Schematic Configuration of Image Communication System:

First, referring to FIG. 8, an overview of the image communication system is described according to the first embodiment. FIG. 8 is a schematic diagram illustrating a configuration of the image communication system according to the first embodiment.

As illustrated in FIG. 8, the image communication system includes the spherical image capturing device 1, and a smart phone 3. The spherical image capturing device 1 and the smart phone 3 are wirelessly communicable with each other using short-range wireless communication, such as Wi-Fi, BLUETOOTH, and Near Field Communication (NFC). The spherical image capturing device 1 and the smart phone 3 may communicate with each other without using the short-range wireless communication, but using wired communication such as a Universal Serial Bus (USB) cable.

The spherical image capturing device 1 is a special digital camera, which captures an image of an object or surroundings such as scenery to obtain two hemispherical images, from which an equirectangular projection image is generated, as described above referring to FIGS. 1 to 7. The spherical image capturing device 1 is an example of a wide-angle view image capturing device. Examples of the wide-angle view image capturing device also include, but not limited to, an image capturing device (single-lens reflex camera, compact digital camera, smart phone, tablet PC, etc.) capable of capturing a planar image (2D panoramic image, etc.) having a wide-angle view. In the present embodiment, the case in which the spherical image capturing device 1, such as a digital camera for capturing an equirectangular projection image, is used.

The equirectangular projection image is an example of a wide-angle view image (second image). Examples of the wide-angle view image include, in addition to the equirectangular projection image, the above-mentioned planar image of a wide-angle view. Here, the wide-angle view image is generally an image taken with a wide-angle lens, such as a lens capable of taking a range wider than a range that the human eye can perceive. Further, the wide-angle view image is generally an image taken with a lens having a focal length of 35 mm or less in terms of 35 mm film. In the present embodiment, the wide-angle image may be taken at a wider angle than the image (narrow-angle image) obtained by taking the image with the smart phone 3.

The smart phone 3 is a mobile phone used by the user A, which is provided with a mobile Operating System (OS). The smart phone 3 is further provided with an imaging sensor such as CMOS 313, which will be described later, and is capable of capturing such as an object. In this disclosure, the imaging area of the smart phone 3 is narrower than that of the spherical image capturing device 1. In that sense, the spherical image capturing device 1 is an example of a wide-angle view image capturing device, while the smart phone 3 is an example of a narrow-angle view image capturing device. The image, captured with the smart phone 3, is an example of narrow-angle view image (first image). In addition to the smart phone 3, examples of the narrow-angle view image capturing device include a PC, a smart watch, a display, a game machine, a car navigation system, and a wearable terminal, each of which is capable of capturing a narrow-angle view image and installed with a display control application.

Further, the smart phone 3 receives data of the equirectangular projection image EC generated by the spherical image capturing device 1 based on an image of an object, by wireless communication, and displays a predetermined-area image Q, which is a predetermined area T of the equirectangular projection image EC. Accordingly, the smart phone 3 operates as a communication terminal or a display device.

Example Hardware Configuration

Figure 9:
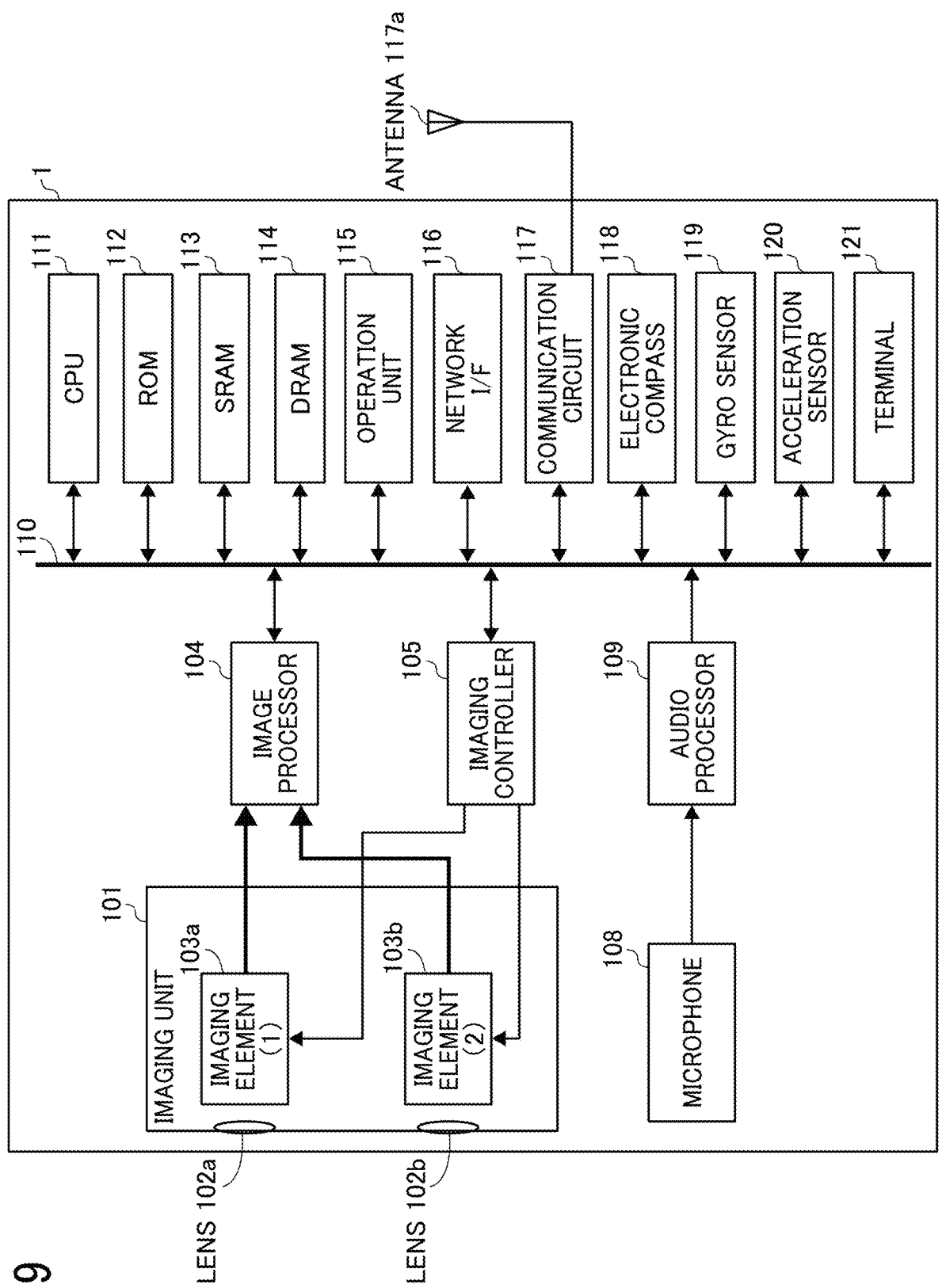
FIG. 9 is a schematic block diagram illustrating a hardware configuration of a spherical image capturing device, according to embodiments.
Figure 10:
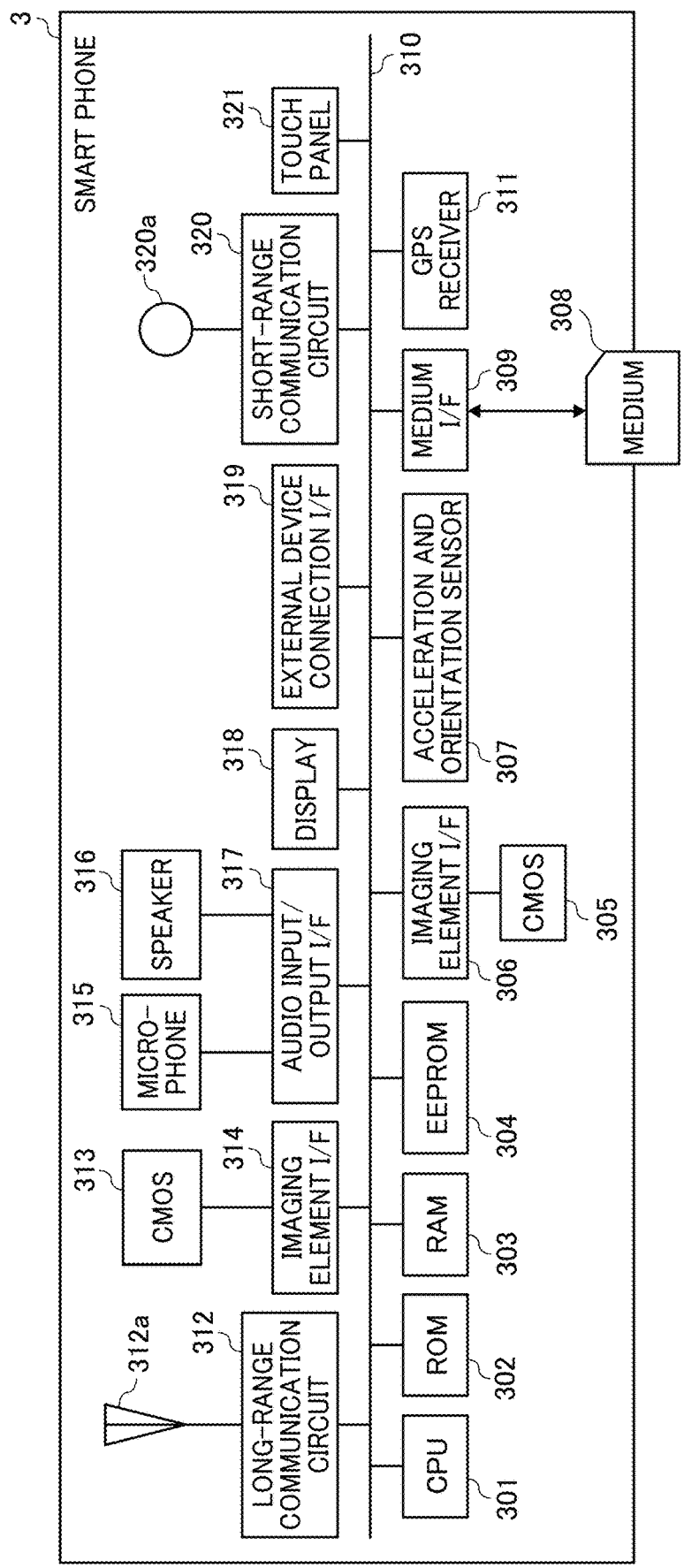
FIG. 10 is a schematic block diagram illustrating a hardware configuration of a smart phone, according to embodiments.

Next, referring to FIGS. 9 and 10, hardware configurations of the spherical image capturing device 1 and smart phone 3 are described according to the embodiment.

Hardware Configuration of Spherical Image Capturing Device:

First, referring to FIG. 9, a hardware configuration of the spherical image capturing device 1 is described according to the embodiment. FIG. 9 is a schematic block diagram illustrating a hardware configuration of the spherical image capturing device 1. The following describes a case in which the spherical image capturing device 1 is a full-view spherical (omnidirectional) image capturing device having two imaging elements. However, the spherical image capturing device 1 may include any suitable number of imaging elements, providing that it includes at least two imaging elements. In addition, the spherical image capturing device 1 is not necessarily an image capturing device dedicated to omnidirectional image capturing. Alternatively, an external omnidirectional image capturing unit may be attached to a general-purpose digital camera or a smart phone to implement an image capturing device having substantially the same function as that of the spherical image capturing device 1.

As illustrated in FIG. 9, the spherical image capturing device 1 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, a network interface (I/F) 116, a communication circuit 117, an antenna 117a, an electronic compass 118, a gyro sensor 119, an acceleration sensor 120, and a terminal 121.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the wide-angle lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 109 are each connected to the CPU 111 via a bus 110. Furthermore, the ROM 112, the SRAM 113, the DRAM 114, the operation unit 115, the network I/F 116, the communication circuit 117, and the electronic compass 118 are also connected to the bus 110.

The image processor 104 acquires image data from each of the imaging elements 103a and 103b via the parallel I/F bus and performs predetermined processing on each image data. Thereafter, the image processor 104 combines these image data to generate data of the equirectangular projection image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b via the serial I/F bus such as the I2C bus. The imaging controller 105 receives various commands from the CPU 111. Further, the imaging controller 105 acquires status data and the like of the group of registers of the imaging elements 103a and 103b via the serial I/F bus such as the I2C bus. The imaging controller 105 sends the acquired status data and the like to the CPU 111.

The imaging controller 105 instructs the imaging elements 103a and 103b to output the image data at a time when a shutter button of the operation unit 115 is pressed. In some cases, the spherical image capturing device 1 is capable of displaying a preview image on a display (e.g., a display 318 of the smart phone 3) or displaying a moving image (movie). In case of displaying movie, the image data are continuously output from the imaging elements 103a and 103b at a predetermined frame rate (frames per minute).

Furthermore, the imaging controller 105 operates in cooperation with the CPU 111 to synchronize the time when the imaging element 103a outputs image data and the time when the imaging element 103b outputs the image data. It should be noted that, although the spherical image capturing device 1 does not include a display in this embodiment, the spherical image capturing device 1 may include the display.

The microphone 108 converts sounds to audio data (signal). The audio processor 109 acquires the audio data output from the microphone 108 via an I/F bus and performs predetermined processing on the audio data.

The CPU 111 controls entire operation of the spherical image capturing device 1, for example, by performing predetermined processing. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, such as the shutter button 115a. In addition to the hardware keys, the operation unit 115 may also include a touch panel. The user operates the operation unit 115 to input various image capturing (photographing) modes or image capturing (photographing) conditions.

The network I/F 116 collectively refers to an interface circuit such as a USB I/F that allows the spherical image capturing device 1 to communicate data with an external medium such as an SD card or an external personal computer. The network I/F 116 supports at least one of wired and wireless communications. The data of the equirectangular projection image, which is stored in the DRAM 114, is stored in the external medium via the network I/F 116 or transmitted to the external device such as the smart phone 3 via the network I/F 116, at any desired time.

The communication circuit 117 communicates data with the external device such as the smart phone 3 via the antenna 117a of the spherical image capturing device 1 by short-range wireless communication such as Wi-Fi, NFC, and Bluetooth. The communication circuit 117 is also capable of transmitting the data of equirectangular projection image to the external device such as the smart phone 3.

The electronic compass 118 calculates an orientation of the spherical image capturing device 1 from the Earth's magnetism to output orientation information. This orientation and tilt information is an example of related information, which is metadata described in compliance with Exif. This information is used for image processing such as image correction of captured images. The related information also includes a date and time when the image is captured by the spherical image capturing device 1, and a size of the image data.

The gyro sensor 119 detects the change in tilt of the spherical image capturing device 1 (roll, pitch, yaw) with movement of the spherical image capturing device 1. The change in angle is one example of related information (metadata) described in compliance with Exif. This information is used for image processing such as image correction of captured images.

The acceleration sensor 120 detects acceleration in three axial directions. The spherical image capturing device 1 calculates its position (an angle with respect to the direction of gravity), based on the acceleration detected by the acceleration sensor 120. With the gyro sensor 119 and the acceleration sensor 120, the spherical image capturing device 1 is able to correct tilt of image with high accuracy.

The terminal 121 is a connector (with a recess) for Micro USB. The terminal 121 is used the spherical image capturing device 1 to communicate via a wired network.

Hardware Configuration of Smart Phone:

Referring to FIG. 10, a hardware configuration of the smart phone is described according to the embodiment. FIG. 10 illustrates a hardware configuration of the smart phone.

As illustrated in FIG. 10, the smart phone 3 includes a CPU 301, a ROM 302, a RAM 303, an EEPROM 304, a Complementary Metal Oxide Semiconductor (CMOS) sensor 305, an imaging element I/F 306, an acceleration and orientation sensor 307, a medium I/F 309, and a GPS receiver 311.

The CPU 301 controls entire operation of the smart phone 3. The ROM 302 stores a control program for controlling the CPU 301, such as an initial program loader (IPL). The RAM 303 is used as a work area for the CPU 301. The EEPROM 304 reads or writes various data such as a control program for a smart phone under control of the CPU 301. The CMOS sensor 305 is an example of a built-in imaging device configured to capture an object (mainly, a self-image of a user operating the smart phone 3) under control of the CPU 301 to obtain image data. In alternative to the CMOS sensor 305, an imaging element such as a charge-coupled device (CCD) sensor may be used. The imaging element I/F 306 is a circuit that controls driving of the CMOS sensor 305. The acceleration and orientation sensor 307 includes various sensors such as an electromagnetic compass or gyrocompass for detecting geomagnetism, and an acceleration sensor. The medium I/F 309 controls reading or writing of data with respect to a recording medium 308 such as a flash memory. The GPS receiver 311 receives a GPS signal from a GPS satellite.

The smart phone 3 further includes a long-range communication circuit 312, a CMOS sensor 313, an imaging element I/F 314, a microphone 315, a speaker 316, an audio input/output I/F 317, the display 318, an external device connection I/F 319, a short-range communication circuit 320, an antenna 320a for the short-range communication circuit 320, and a touch panel 321.

The long-range communication circuit 312 is a circuit that enables the smart phone 3 to communicate with other device through the communication network 100. The CMOS sensor 313 is an example of a built-in imaging device capable of capturing a subject to obtain image data under control of the CPU 301. The imaging element I/F 314 is a circuit that controls driving of the CMOS sensor 313. The microphone 315 is a built-in circuit that converts sound into an electric signal. The speaker 316 is a built-in circuit that generates sound such as music or voice by converting an electric signal into physical vibration. The audio I/O I/F 317 is a circuit for inputting or outputting an audio signal to the microphone 315 or from the speaker 316 under control of the CPU 301. The display 318 is an example of a display device that displays an image of the object, various icons, etc. Examples of the display 318 include a liquid crystal display (LCD) and an organic electroluminescence (EL) display. The external device connection I/F 319 is an interface circuit that connects the smart phone 3 to various external devices. The short-range communication circuit 320 is a communication circuit that communicates in compliance with the near field communication (NFC), the Bluetooth (Registered Trademark), and the like. The touch panel 321 is an example of an input device configured to enable a user to operate the smart phone 3 by touching a screen of the display 318.

The smart phone 3 further includes a bus line 310. The bus line 310 is an address bus or a data bus, which electrically connects the elements in FIG. 10 such as the CPU 301.

Any one of the above-described control program may be recorded on a recording medium in a file format installable or executable by a computer, or any part of the above-described control programs may be distributed via a network in a format that is installable or executable by the computer. Examples of such recording medium include, but not limited to, compact disc readable (CD-R), digital versatile disc (DVD), Blu-ray disc, SD card, and USB memory. The recording medium may be distributed within or outside the country as a program product. The smart phone 3 executes the control program to perform various operations as described in this disclosure.

Example Functional Configuration

Figure 11:
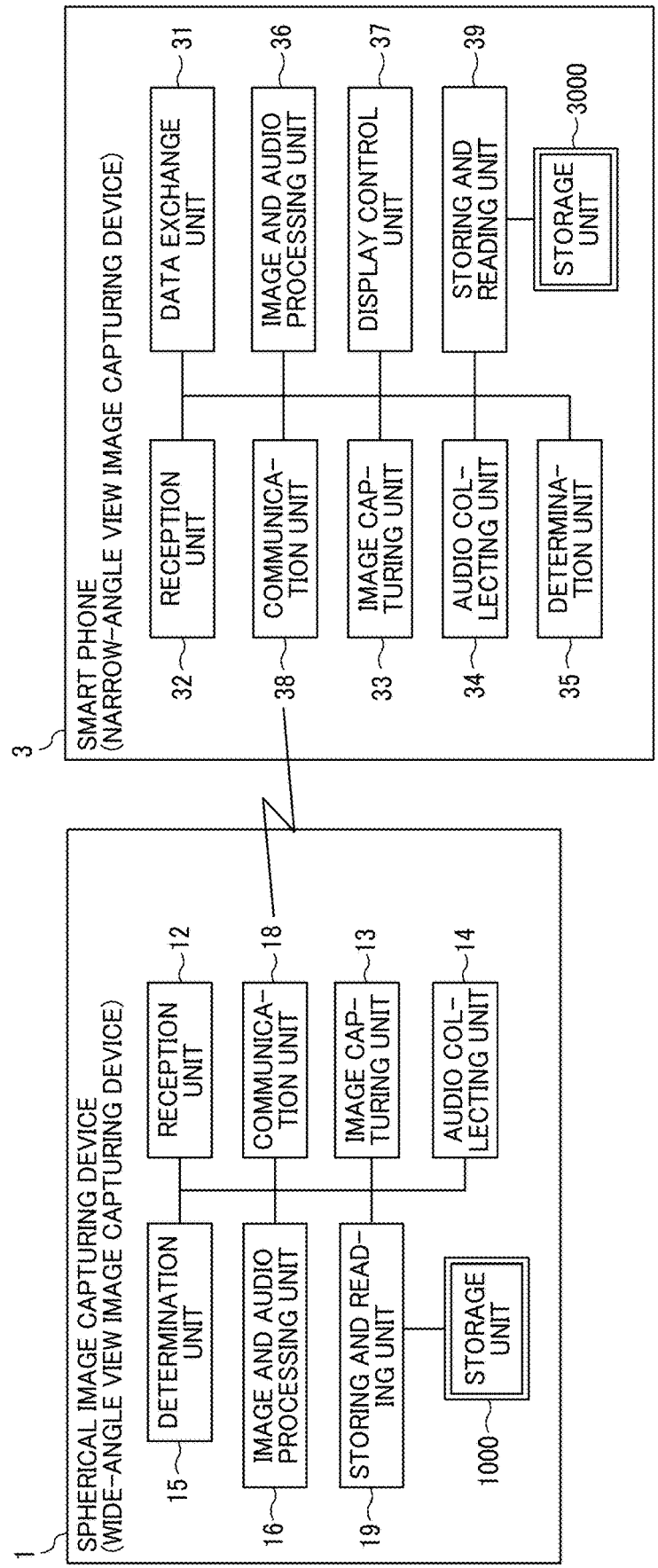
FIG. 11 is a schematic block diagram illustrating a functional configuration of the image communication system of FIG. 1 according to the first embodiment.

Referring now to FIGS. 9 to 11, a functional configuration of the image communication system is described according to the embodiment. FIG. 11 is a schematic block diagram illustrating a functional configuration of the image communication system according to the first embodiment.

Functional Configuration of Spherical Image Capturing Device:

As illustrated in FIG. 11, the spherical image capturing device 1 includes a reception unit 12, an image capturing unit 13, an audio collecting unit 14, a determination unit 15, an image and audio processing unit 16, a communication unit 18, and a storing and reading unit 19. These units are functions that are implemented by or that are caused to function by operating any of the elements illustrated in FIG. 9 in cooperation with the instructions of the CPU 111 according to the control program for the spherical image capturing device expanded from the SRAM 113 to the DRAM 114.

The spherical image capturing device 1 further includes a storage unit 1000, which is implemented by the ROM 112, the SRAM 113, and the DRAM 114 illustrated in FIG. 9.

Functional Configuration of Spherical Image Capturing Device:

Referring to FIGS. 9 to 11, a functional configuration of the spherical image capturing device 1 is described in detail.

The reception unit 12 of the spherical image capturing device 1 is implemented by the operation unit 115 illustrated in FIG. 9, which operates under control of the CPU 111. The reception unit 12 receives an instruction input from the operation unit 115 according to a user operation.

The image capturing unit 13 is implemented by the imaging unit 101, the image processor 104, and the imaging controller 105, illustrated in FIG. 9, each operating under control of the CPU 111. The image capturing unit 13 captures an image of the object and its surroundings to obtain captured image data. As the captured image data, the two hemispherical images, from which the spherical image is generated, are obtained as illustrated in FIGS. 3A and 3B.

The audio collecting unit 14 is implemented by the microphone 108 and the audio processor 109 illustrated in FIG. 9, each of which operates under control of the CPU 111. The audio collecting unit 14 collects sounds around the spherical image capturing device 1.

The determination unit 15, which is implemented by instructions of the CPU 111, performs various determinations.

The image and audio processing unit 16, which is implemented by instructions of the CPU 111 to the image processor 104, combines the two hemispherical images illustrated in FIGS. 3A and 3B to generate an equirectangular projection image EC as illustrated in FIG. 3C. The image and audio processing unit 16, which is implemented by instructions of the CPU 111 to the audio processor 109, generates audio data from audio signals of collected sounds.

The communication unit 18, which is implemented by instructions of the CPU 111 to the communication circuit 117, communicates data with a communication unit 38 of the smart phone 3, to be described below, using the short-range wireless communication. In the case of wired communication, the communication unit 18 is implemented by instructions of the CPU 111 with respect to the terminal 121, to control data communication while receiving power supply from the smart phone 3 via the terminal 121.

The storing and reading unit 19, which is implemented by instructions of the CPU 111 illustrated in FIG. 9, stores various data or information in the storage unit 1000 or reads out various data or information from the storage unit 1000.

Functional Configuration of Smart Phone:

Referring now to FIGS. 10 and 11, a functional configuration of the smart phone 3 is described according to the embodiment. As illustrated in FIG. 11, the smart phone 3 includes a data exchange unit 31, a reception unit 32, an image capturing unit 33, an audio collecting unit 34, a determination unit 35, an image and audio processing unit 36, a display control unit 37, the communication unit 38, and a storing and reading unit 39. These units are functions that are implemented by or that are caused to function by operating any of the hardware elements illustrated in FIG. 10 in cooperation with the instructions of the CPU 301 according to the control program for the smart phone 3, expanded from the EEPROM 304 to the RAM 303.

The smart phone 3 further includes a storage unit 3000, which is implemented by the RAM 303 and EEPROM 304 illustrated in FIG. 10.

Functional Configuration of Smart Phone:

The data exchange unit 31 of the smart phone 3 is implemented by the long-range communication circuit 312 that operates under control of the CPU 301, illustrated in FIG. 10, to transmit or receive various data or information to or from other device (for example, an image management server 5 to be described below) through a communication network such as the Internet.

The reception unit 32 is implemented by the touch panel 321, which operates under control of the CPU 301, to receive various selections or inputs from the user.

The image capturing unit 33, which is implemented by the instructions of the CPU 301 with respect to the CMOS 305 via the imaging element I/F 306 or the CMOS 313 via the imaging element I/F 314, captures an image of the object or surroundings to obtain captured image data.

The audio collecting unit 34, which is implemented by the instructions of the CPU 301 to the microphone 315 via the audio input/output I/F 317, collects sounds around the smart phone 3.

The determination unit 35, which is implemented by instructions of the CPU 301, performs various determinations, to be described below.

The image and audio processing unit 36, which is implemented by the instructions of the CPU 301, applies image processing to the image data obtained from the CMOS 305 via the imaging element I/F 306 or from the CMOS 313 via the imaging element I/F 314. The image and audio processing unit 36 performs image processing on the equirectangular projection image EC, received from the spherical image capturing device 1. The image and audio processing unit 36, which is implemented by instructions of the CPU 301, generates audio data from audio signals of sounds collected at the microphone 315. The image and audio processing unit 36 converts audio data sent from the spherical image capturing device 1 into an audio signal and outputs audio based on the audio signal from the speaker 316 via the audio input/output I/F 317.

The display control unit 37, which is implemented by the instructions of the CPU 301, controls the display 318 to display various screens.

The communication unit 38, which is implemented by the instructions of the CPU 301 with respect to the short-range communication circuit 320, performs data communication with the communication unit 18 of the spherical image capturing device 1. In the case of wired communication, the communication unit 38 is implemented by instructions of the CPU 301 with respect to the external device connection I/F 319, to control power supply or communication of image data with the spherical image capturing device 1 via the communication cable.

The storing and reading unit 39, which is implemented by instructions of the CPU 301, stores various data or information in the storage unit 3000 or reads out various data or information from the storage unit 3000.

Example Operation

Figure 12:
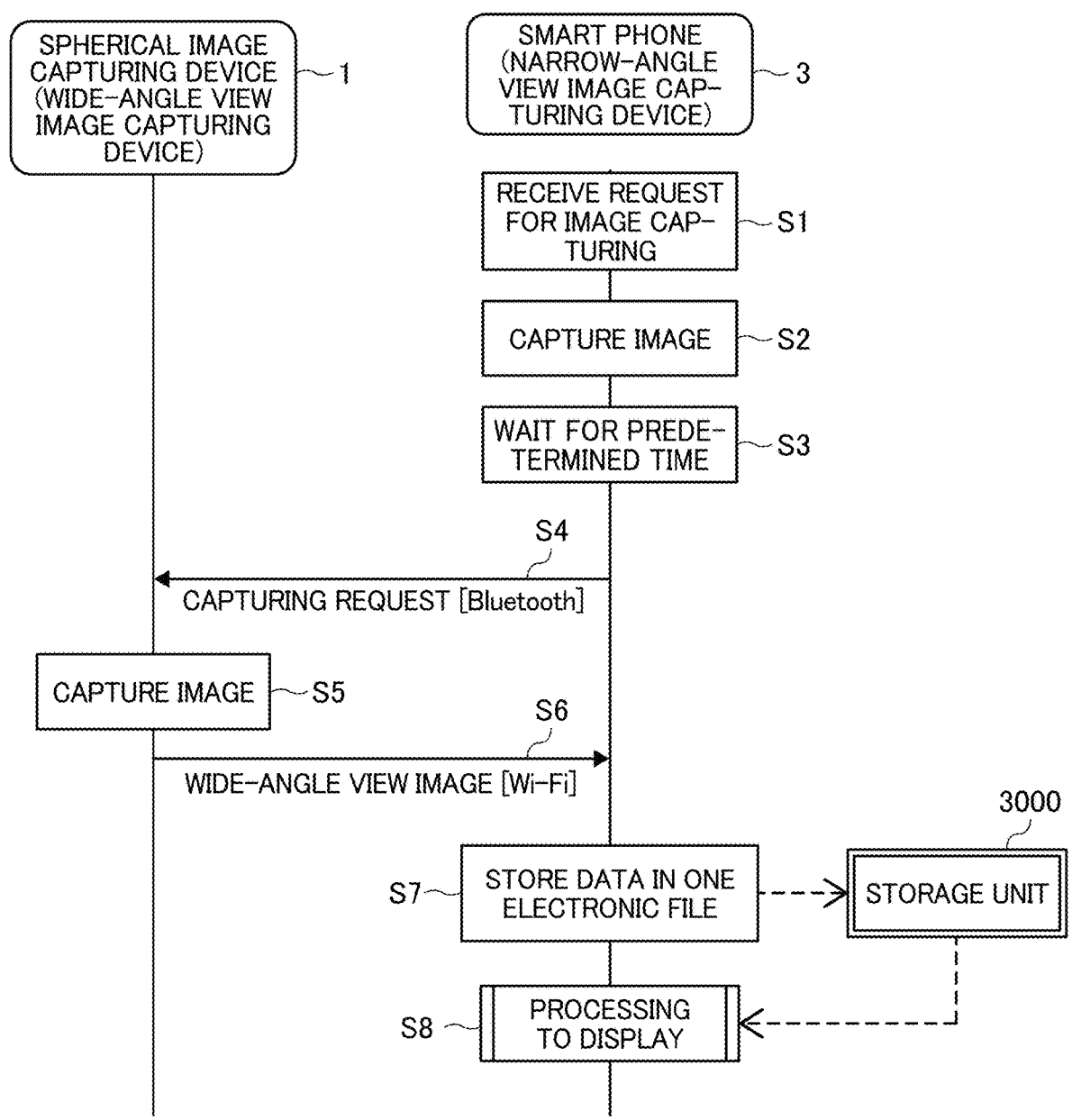
FIG. 12 is a data sequence diagram illustrating linked image capturing processing, performed by the image communication system, according to the first embodiment.

Linked Image Capturing Processing:

First, referring to FIG. 12, processing of capturing images, performed by the smart phone 3 and the spherical image capturing device 1 operating in cooperation, is described according to the embodiment. FIG. 12 is a sequence diagram illustrating linked image capturing processing according to the first embodiment. Prior to processing of FIG. 12, it is assumed that a connection is established between the smart phone 3 and the spherical image capturing device 1 to enable communication via Wi-Fi and Bluetooth. For example, the smart phone 3 establishes a connection with the spherical image capturing device 1 according to a control program stored in the storage unit 3000, to be ready for communication of data with the spherical image capturing device 1.

First, the reception unit 32 of the smart phone 3 receives a request for starting image capturing, from the user A (S1). In response to the request, the image capturing unit 33 captures an image of the target object. The image and audio processing unit 36 generates narrow-angle view image data. The storing and reading unit 39 stores the narrow-angle view image in the RAM 303 at least temporarily. (S2). At S2, the storing and reading unit 39 may store the narrow-angle view image in the storage unit 3000, implemented by the RAM 303 or the EEPROM 304 illustrated in FIG. 10. The storing and reading unit 39 stores the narrow-angle view image data generated from the captured image in the storage unit 3000. In this case, the audio collecting unit 34 may collect sounds to generate audio data, and associate the audio data with the narrow-angle view image data.

The image capturing unit 33 of the smart phone 3 waits for a predetermined time period (S3). For example, the predetermined time period may be set to 3 seconds. With this waiting time, when the user A himself or herself is the target object to be captured as instructed at S2, the user A can either pick up the spherical image capturing device 1 in addition to the smart phone 3, or changes from the smart phone 3 to the spherical image capturing device 1, to be ready for image capturing. In another example, assuming that the smart phone 3 and the spherical image capturing device 1 are relatively apart away from each other, after the user A captures a specific object with the smart phone 3, the user A may turn his or her back to the spherical image capturing device 1 in about 3 seconds. This prevents a face of the user A from being taken by the spherical image capturing device 1.

Next, the communication unit 38 of the smart phone 3 transmits image capturing request information indicating a request for starting image capturing (capturing request) to the spherical image capturing device 1 by Bluetooth (S4). Accordingly, the communication unit 18 of the spherical image capturing device 1 receives the image capturing request information. At the image capturing device 1, the image capturing unit 13 captures the target object and its surroundings (such as scenery), to obtain two items of hemispherical image data. The image and audio processing unit 16 generates equirectangular projection image, from these two items of hemispherical image data, as wide-angle view image data. The storing and reading unit 19 stores the wide-angle view image in the storage unit 1000. (S5)

Next, the communication unit 18 of the spherical image capturing device 1 transmits the wide-angle view image data obtained at S5 to the smart phone 3 by Wi-Fi (S6). Accordingly, the communication unit 38 of the smart phone 3 receives the wide-angle view image data. In the image communication system of the present embodiment, in another example, the communication unit 18 of the spherical image capturing device 1 may transmit more than one image to the smart phone 3, as images to be combined into the wide-angle view image data. For example, the spherical image capturing device 1 may transmit two items of hemispherical image data to the smart phone 3. The smart phone 3 may then combine these two items of hemispherical image data into equirectangular projection image data, as wide-angle view image data. The Bluetooth used for transmission and reception of capturing request at S4 is an example of a first communication method, and the Wi-Fi used for transmission and reception of captured image data at S6 is an example of a second communication method.

Through processing of S1 to S6, the smart phone 3 can acquire wide-angle view image data that cannot be obtained by capturing with its own terminal. Further, the time to capture image data is synchronized by this linking image capturing processing between the smart phone 3 and the spherical image capturing device 1.

Next, the image and audio processing unit 36 of the smart phone 3 stores the narrow-angle view image data obtained at S2 and the wide-angle view image data obtained at S5 in the same, one electronic file. The storing and reading unit 39 stores data of this electronic file in the storage unit 3000 (S7). The narrow-angle view image data or the wide-angle view image data may be stored in any other memory, which may be disposed outside the smart phone 3. Examples of such external memory include, but not limited to, any external server such as a cloud server. This may make easier to share the narrow-angle view image data or the wide-angle view image data. Then, the smart phone 3 controls the display 318 to display the narrow-angle view image and the wide-angle view image (S8).

Figure 13:
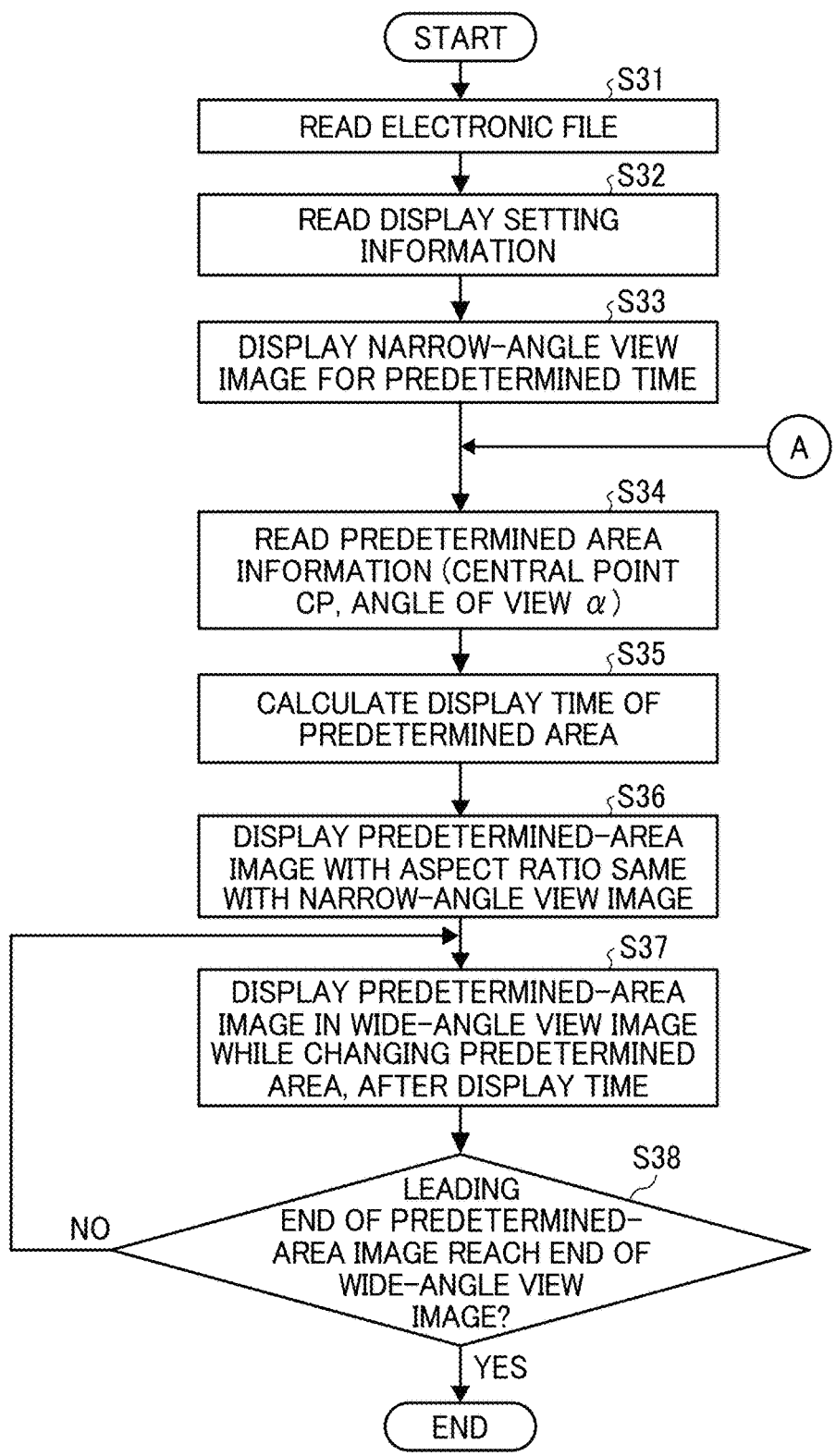
FIG. 13 is a flowchart illustrating processing to display a predetermined-area image according to the first embodiment.
Figure 14:
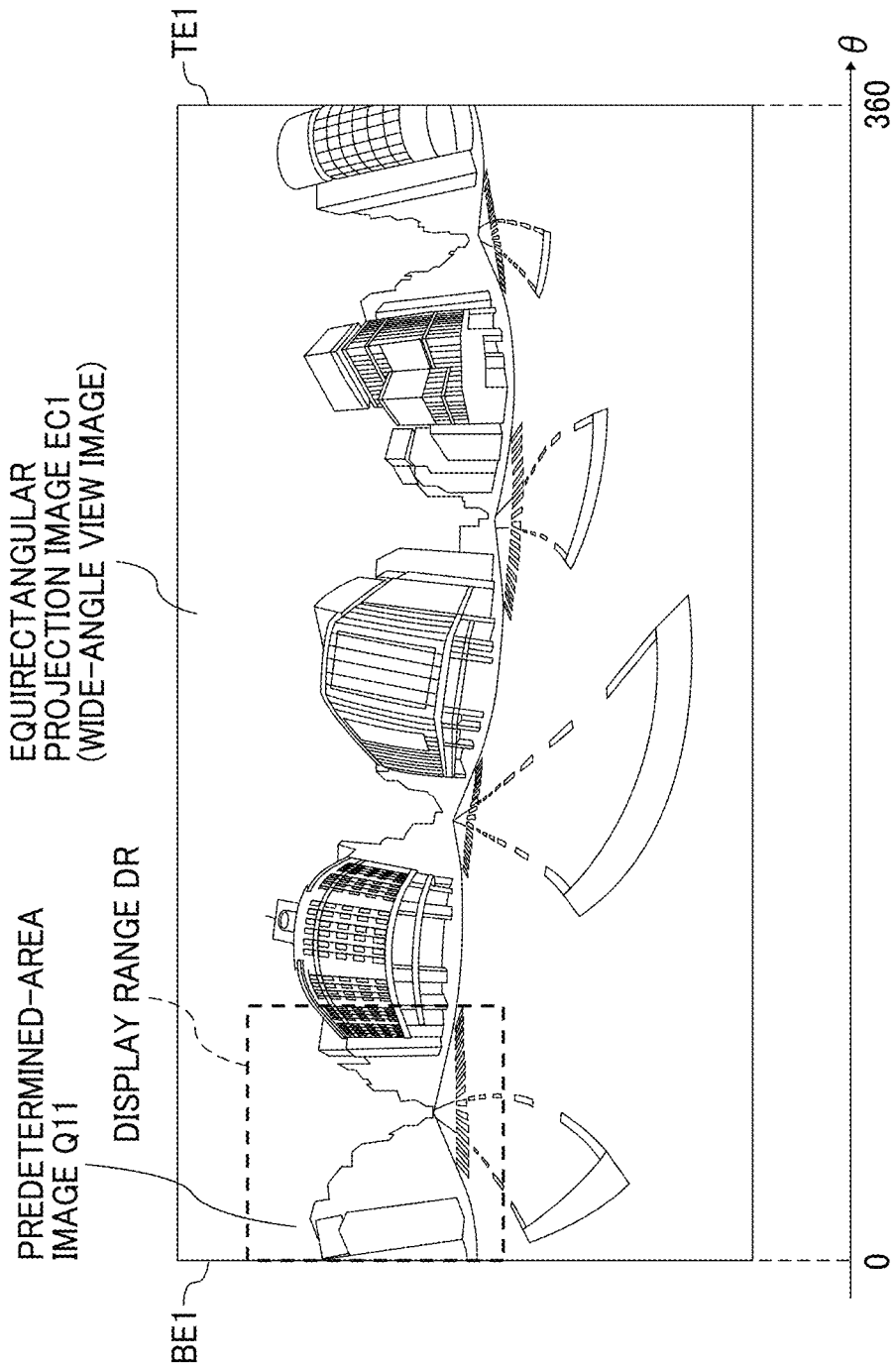
FIG. 14 is a diagram illustrating the relationship between the equirectangular projection image and the predetermined-area image.
Figure 15:
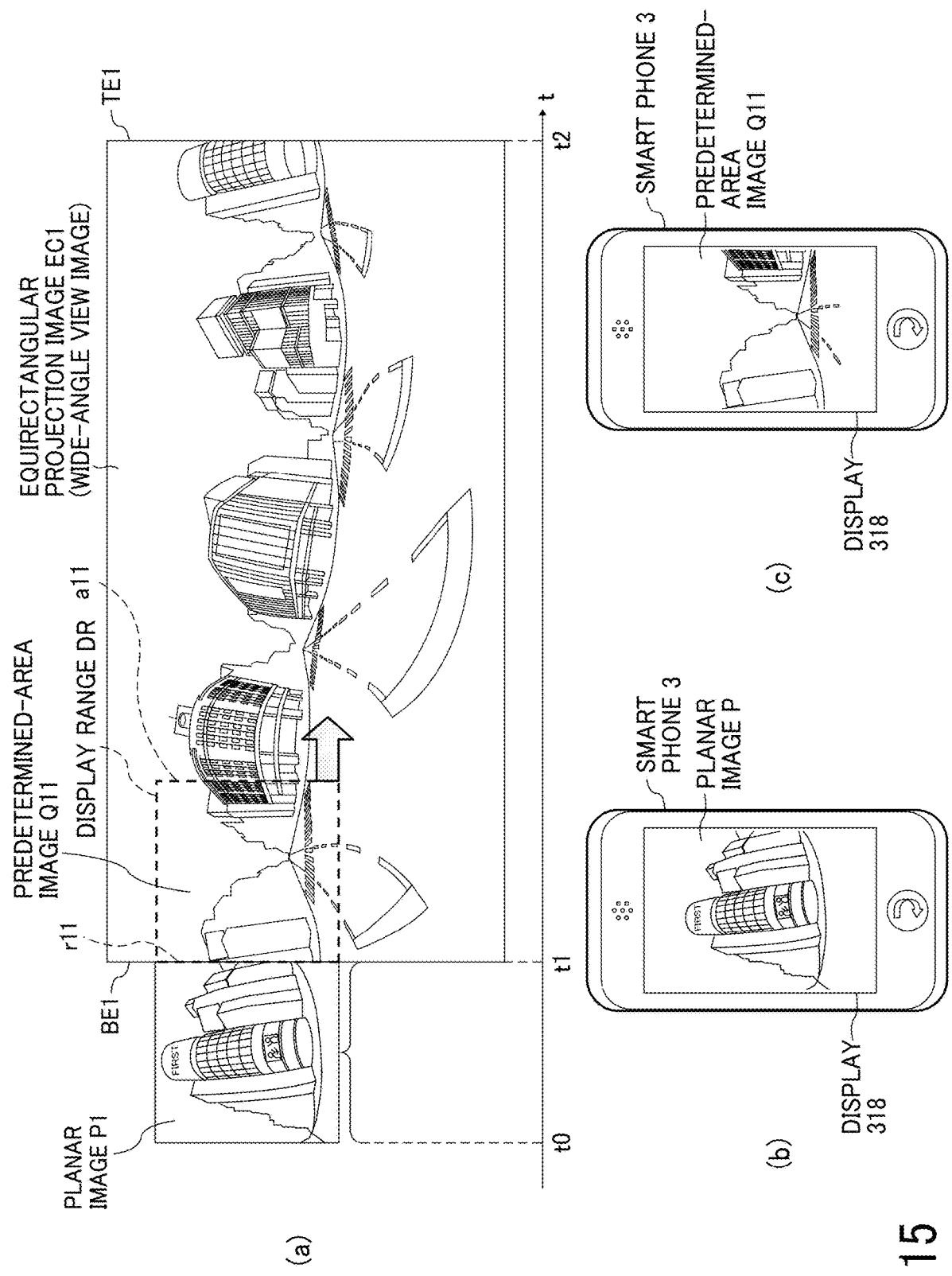
FIG. 15 is an illustration for explaining a time in which the planar image is displayed, and a time in which the predetermined-area image corresponding to a predetermined area of the equirectangular projection image is displayed.

Display Processing:

Referring now to FIGS. 13 and 15, example processing to display images performed at S8 is descried. FIG. 13 is a flowchart illustrating processing to display a predetermined-area image according to the first embodiment. FIG. 14 is a diagram illustrating the relationship between the equirectangular projection image and the predetermined-area image. FIG. 15(a) illustrates a time in which the planar image is displayed, and a time in which the predetermined-area image corresponding to a predetermined area of the equirectangular projection image is displayed. FIG. 15(b) illustrates a planar image displayed on the smart phone. FIG. 15(c) illustrates a predetermined-area image, of the equirectangular projection image, displayed on the smart phone. The processing of displaying images is performed by the smart phone 3, according to the control program stored in the storage unit 3000.

First, the storing and reading unit 39 of the smart phone 3 reads out data of the electronic file from the storage unit 3000 having been stored at S7 (S31). Referring to FIG. 14, the relationship between the equirectangular projection image stored in the electronic file and the predetermined-area image corresponding to the predetermined area of the equirectangular projection image is described.

FIG. 14 is a diagram illustrating the relationship between the equirectangular projection image and the predetermined-area image. As illustrated in FIG. 14, an equirectangular projection image EC1, which is an example of a wide-angle view image, can be expressed using a pan angle θ in the imaging direction of the virtual camera IC (see FIG. 7), starting from the start point BE1 to the end point TE1. Specifically, the pan angle θ of the equirectangular projection image EC1 is equal to or greater than 0 degree, but less than 360 degrees.

As described above, the predetermined-area image Q is an image of an area in the equirectangular projection image EC (an example of wide-angle view image), which is displayed to the user when the predetermined-area image Q is displayed on the display 318. Further, a range of the wide-angle view image to be displayed to the user at a time, such as via the display 318, is referred to as a display range DR. In this embodiment, an area (referred to as a predetermined area) in the equirectangular projection image EC being displayed to the user at a time changes, according to a display range DR. That is, different areas (referred to as different predetermined areas) in the equirectangular projection image EC are displayed to the user at different times, as the display range DR changes. Of those different predetermined areas, the predetermined-area image Q11 is an area in the equirectangular projection image EC1, which is set as a range that is firstly displayed to the user via the display 318. The predetermined-area image Q11 is set according to the predetermined-area information, for example, by the user via the smart phone 3. In this specific example, the predetermined-area image Q11 is set as an area of the equirectangular projection image EC corresponding to the planar image. The image of the predetermined area (that is, the predetermined-area image) of the equirectangular projection image (an example of wide-angle view image), which is determined according to a display range DR of the equirectangular projection image via the display 318, can be expressed by a specific value of pan angle θ. The pan angle θ is any value equal to or greater than 0 but less than 360 degrees. As described below, in this example, a displayable range of the wide-angle view image, which is the entire area of the wide-angle view image, can be expressed by pan angle θ of 360 degrees. With the value of θ, as illustrated in FIG. 15, the display range DR of the equirectangular projection image EC1 and a corresponding predetermined-area image are determined.

Next, referring back to FIG. 13, the storing and reading unit 39 reads out display setting information stored in the storage unit 3000 (S32). The display setting information includes information on a display time of the narrow-angle view image, a displayable range of the wide-angle view image that can be displayed via the display 318, and a total display time it takes until display of all different predetermined-area images completes as the display range DR moves throughout the wide-angle view image. This display setting information is previously stored in the storage unit 3000, for example, by the user A. In such case, in order to make sure that the predetermined-area image of the wide-angle view image is displayed all the way to the end (for example, after display of the narrow-angle view image), the smart phone 3 accepts an input value of display time only when the input value of display time is longer than 0 second. For example, the display setting information is set so that the display time of the narrow-angle view image is 1.0 second, the displayable range of the wide-angle view image is 360 degrees, and the total display time for displaying all different predetermined-area images of the wide-angle view image by movement of the display range DR throughout the wide-angle view image is 1.8 seconds.

Next, as illustrated in FIG. 15(b), the display control unit 37 displays, on the display 318, a planar image P1 (narrow-angle view image) based on the narrow-angle view image data in the electronic file read out at S31 for a predetermined (preset) time (S33). The predetermined time here corresponds to the display time of the narrow-angle view image (for example, 1.0 second). In this case, as illustrated in FIG. 15(a), the planar image P1, as the narrow-angle view image, is displayed from t0 (time is 0) to t1 (time is one second), for 1.0 second.

Next, the and reading unit 39 reads out the predetermined area information on the predetermined area T (see FIG. 6A) stored in the storage unit 3000 (S34). This predetermined area information indicates the center point CP and the angle of view α of the predetermined area T (see FIG. 7). For example, the predetermined area T and the angle of view α are set in advance on the smart phone 3 by the user A, such that the predetermined area information may be stored in the storage unit 3000 of the smart phone 3.

Next, the display control unit 37 calculates a display time of the predetermined-area image, which is a time period during which an image of a certain predetermined area T is kept displayed (S35). For example, the display control unit 37 calculates the display time of the predetermined-area image, by diving the total display time by the displayable range of the wide-angle view image, based on the display setting information read at S32. Specifically, the display control unit 37 obtains 1.8 seconds/360 degrees=0.005 seconds (5 milliseconds) in this case. That is, all different predetermined-area images are displayed, while the display range DR of the wide-angle view image moves to change the value of θ by 1 degree at every 0.005 seconds, until the entire wide-angle view image is displayed.

As illustrated in FIG. 15(c), the display control unit 37 starts displaying the predetermined-area image Q11 on the display 318, which is the image of the predetermined area to be displayed first as the display range DR, with the same aspect ratio as the planar image P (an example of narrow-angle view image) (S36). In this case, as illustrated in FIG. 15(a), a rear end r11 of the display range DR with respect to the moving direction, is positioned at the start point BE1 of the equirectangular projection image EC1 (an example of wide-angle view image). The planar image P1 includes an object, such as a person or a building, or any part of such object.

Next, after the above-calculated display time of the predetermined-area image (for example, 0.005 seconds), the display control unit 37 moves the display range DR by certain angle, such as one degree (for example, θ=1°), to display a predetermined-area image corresponding to the display range DR having θ of 1 degree. That is, the image of a predetermined area being displayed on the display 318 changes, as the display range DR moves in the moving direction, from the start point BE1 to the end point TE1 of the equirectangular projection image EC1 (S37). The moving direction is a direction indicated by an arrow (right direction) in FIG. 15(a). Here, the direction indicated by the arrow is a direction parallel to the equator in the spherical image.

Next, the determination unit 35 determines whether the leading end all of the display range DR with respect to the moving direction has reached the end point TE1 of the equirectangular projection image EC1 (an example of wide-angle view image) (S38). When it is determined that the leading end all has not reached (S38: NO), operation returns to S37. After the display time of the predetermined-area image (for example, 0.005 seconds), the display control unit 37 again moves the display range DR by one degree of pan angle of imaging direction (for example, θ=1°), and displays on the display 318 a predetermined-area image corresponding to the display range DR having been moved (with θ of 2 degrees). Through repeating processing of S37 and S38, as illustrated in FIG. 15(a), the display range DR moves in the direction of the arrow. Finally, the leading end all of the display range DR reaches the end point TE1 of the equirectangular projection image EC11 (an example of wide-angle view image).

When the leading end all of the display range DR reaches the end point TE1 of the equirectangular projection image EC11 (an example of wide-angle view image) (S38: YES), S8 of processing to display ends. In this example, it is assumed that display of all different predetermined-area images completes at t2, which is 1.8 seconds. Accordingly, linked image capturing processing of FIG. 12 ends. In this way, the display control unit 37 displays all different predetermined-area images, in a manner that the display range DR moves (changes) until the entire wide-angle view image is displayed to the user. Instead of displaying the entire wide-angle view image, the display control unit 37 may cause the display range DR move to display a part of the wide-angle image.

According to the present embodiment, as illustrated in FIG. 15, the display control unit 37 displays the narrow-angle view image obtained firstly by capturing an image with the smart phone 3, for a predetermined time period. Then, the display control unit 37 displays different predetermined-area images (such as the predetermined-area image Q11), while moving the display range DR throughout the wide-angle view image, which is obtained by the spherical image capturing device 1 by linked image capturing processing as described above. Accordingly, even if a viewer of the narrow-angle view image does not recognize where the captured image is taken under what situation just by looking at an object in the narrow-angle view image, the viewer can easily recognize the place or the situation once the predetermined-area images with different predetermined areas are displayed.

The example case in which the image communication system is used at wedding reception is described. First, one guest at the wedding reception places the spherical image capturing device 1 at center of a table, for example, by attaching the spherical image capturing device 1 to a tripod placed at a center of the table where guests are seated. The guest captures an image of groom and bride, who are seated at a head table, with the smart phone 3. The smart phone 3 obtains the planar image P1, as a narrow-angle view image, and displays the captured image for a predetermined time. Next, the guest captures an image of guests, using the spherical image capturing device 1, such that the spherical image capturing device 1 obtains a wide-angle view image. The spherical image capturing device 1 transmits the equirectangular projection image EC1, as the wide-angle view image, to the smart phone 3. With this operation, the guest is able to view the image of groom and bride, which is displayed at the smart phone 3. The guest can then view an image of other guests as well as the guest himself or herself. With these images, the viewer feels like if he or she were there with the groom and bride, or other guests, at the wedding reception. The image communication system is able to capture images in various other scenarios, such as images at construction sites.

In this embodiment, the display control unit 37 does not reproduce an image of each predetermined area T in the equirectangular projection image EC1 as one frame of video data, but displays the predetermined-area image corresponding to the predetermined area T in the equirectangular projection image EC1, while shifting the predetermined area T subjected to displaying. Accordingly, in the present embodiment, encoding of video image is not required, such that respective predetermined areas T in the equirectangular projection image EC1 can be displayed seamlessly like a moving image. This also reduces processing load due to encoding processing.

Second Embodiment

Referring now to FIGS. 16 to 19, an image communication system is described according to a second embodiment.

Figure 16:
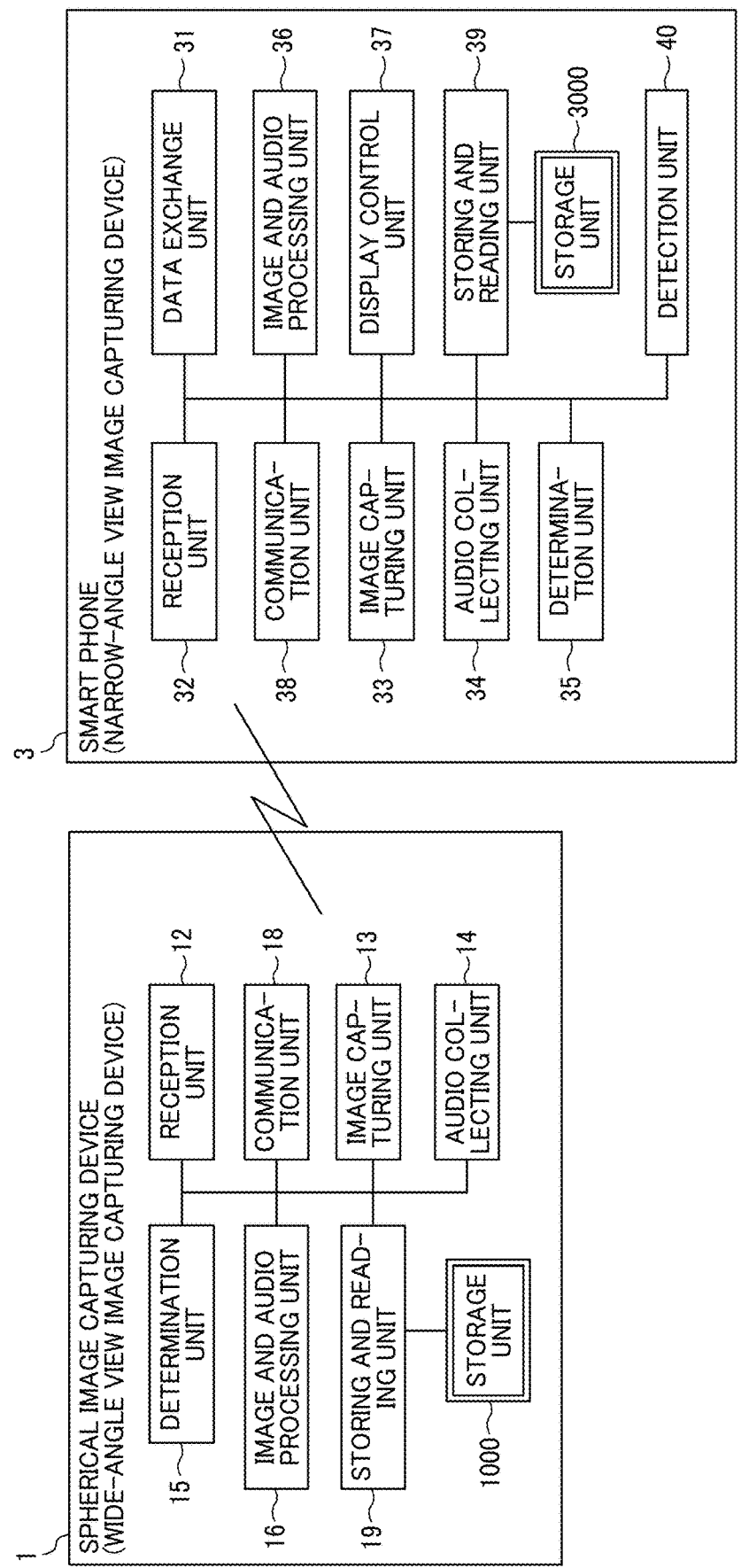
FIG. 16 is a schematic block diagram illustrating a functional configuration of the image communication system according to a second embodiment.

Functional Configuration:

Functional Configuration of Smart Phone:

FIG. 16 is a schematic block diagram illustrating a functional configuration of the image communication system according to the second embodiment. The image communication system of FIG. 16 is substantially similar to the image communication system of FIG. 11, except that the smart phone 3 additionally includes a detection unit 40. Since a functional configuration and a hardware configuration of the image communication system of FIG. 16 are substantially the same with those of the image communication system of FIGS. 8 to 10 except for the function of the detection unit 40, the functional configuration of the detection unit 40 is only described below.

The detection unit 40, which is implemented by the instructions of the CPU 301, detects feature points, as candidates of a specific object such as a human face, in a predetermined-area image of the captured image data acquired by the image capturing unit 33. Specifically, the detection unit 40 refers to shape model data representing a shape model of the specific object (such as the human face) to detect the coordinates of the specific object in the captured image. In this embodiment, the detection unit 40 is an example of detection means. The shape model data representing a shape model of the specific object is generated from a captured image of the specific object, such as a narrow-angle view image of the specific object having been captured by the image capturing unit 33. Alternatively, the shape model data may be generated from any other data representing the specific object, such as drawing of the specific object. That is, as long as the shape model data can specify the specific object in the image, any type of data may be used to generate the shape model data.

Example Operation

Figure 17:
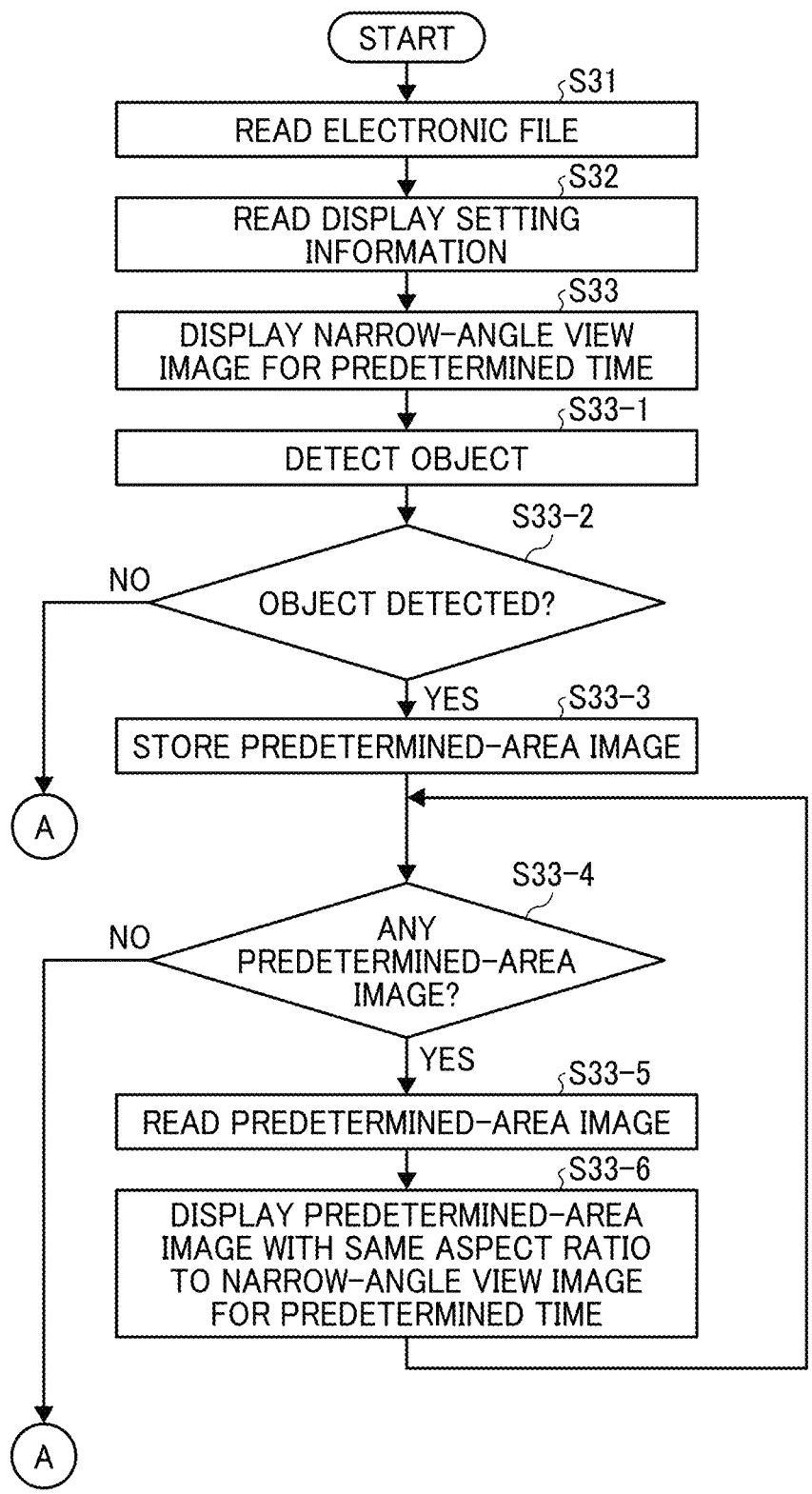
FIG. 17 is a flowchart illustrating processing to display a predetermined-area image according to the second embodiment.

Display Processing:

In the second embodiment, processing is performed substantially the same as described above in the first embodiment, except for processing to display the narrow-angle view image and the wide-angle view image performed at S8 of FIG. 12. For this reason, description of processing from S1 to S7 including linked image capturing processing is omitted. FIG. 17 is a flowchart illustrating processing to display a predetermined-area image according to the second embodiment. Since FIG. 17 is a variation of processing to display the predetermined-area image described in FIG. 13, only a modified part is described below.

FIG. 19(a) is an illustration for explaining a time in which the planar image is displayed, and a time in which one or more predetermined-area images corresponding to different viewable areas of the equirectangular projection image are displayed, according to the second embodiment. FIG. 19(b) is an example planar image displayed on the smart phone, according to the second embodiment. FIGS. 19(c) and 19(d) are each an example predetermined-area image, of the equirectangular projection image, displayed on the smart phone at different times, according to the second embodiment. Also in the second embodiment, a predetermined area of the equirectangular projection image in which the predetermined-area image (for example, Q21) is displayed, can be defined by a display range DR as described in the first embodiment.

Referring to FIG. 17, as illustrated in FIG. 19(a), the display control unit 37 displays, on the display 318, a planar image P2 (narrow-angle view image) based on the narrow-angle view image data in the electronic file read out at S31 for a predetermined (preset) time (S33). The predetermined time here corresponds to the display time of the narrow-angle view image (for example, 1.0 second). In this case, as illustrated in FIG. 19(b), the planar image P2, as the narrow-angle view image, is displayed from t0 (time is 0) to t1 (time is one second), for 1.0 second. In this embodiment, a display range in the wide-angle view image, included in the display setting information read out at S32 is to be used when the object cannot be detected. The planar image P2 includes a specific object, such as a person or a building (in this example, a face of the person).

Next, the detection unit 40 searches the wide-angle view image for feature points, as a candidate of a specific object, to detect the specific object in one or more predetermined areas of the wide-angle view image (that is, the predetermined-area image) (S33-1). Specifically, the detection unit 40 detects a human face, based on facial feature points such as eyes, a nose, and a mouth of a person. The detection unit 40 may detect specific feature points to detect a person, or any part of the person. Then, the detection unit 40 normalizes such as the position (location) and size of the feature points of the human face. Specifically, the detection unit 40 picks up a rectangular section (that is, a predetermined area), one by one, starting from the leading end BE2 to the rear end TE2 of the captured image, to search for features points that match the shape model data of the specific object, and specifies a position (coordinates) of the feature points that match the shape model data (S33-2).

The shape model data is generated based on feature points of the human face, obtained from the planar image P2 (an example of narrow-angle view image) captured with the smart phone 3. More specifically, the detection unit 40 performs similar image searching, that is, processing to search for an image that is similar to an image of a specific object, to determine whether there is any object (face) similar to a specific object (for example, the face of a person) in the wide-angle view image. In one example, the shape model data of a specific object may be generated based on a human face (a part of the detection target) obtained from the narrow-angle view image having been captured with the smart phone 3 and stored in the storage unit 3000. In another example, the shape model data of a specific object may be generated based on a human face (a part of the detection target) obtained from a drawing image, such as an illustration or a caricature drawn by handwriting or by computer and stored in the storage unit 3000. Further, in one example, the shape model data may specify a unique object, such as a face of a particular person. In another example, the shape model data may specify a general object, such as a face of any person. That is, the shape model data may be selectively acquired according to various usage scenes.

More specifically, the detection unit 40, together with the determination unit 35, performs matching processing to match the detected facial feature points, based on information related to the position (location) or the shape or size of the detected feature points. When a matched rate (similarity), based on a result of matching, indicates that the degree of similarity in facial feature points is equal to or greater than a threshold, the determination unit 35 determines that a particular person is present (or the existing person is the same person) in that predetermined area of the wide-angle view image. On the other hand, when the matched rate (similarity), based on a result of matching, indicates that the degree of similarity in facial feature points is less than the threshold, the determination unit 35 determines that the particular person is not present (or the existing person is not the same person) in that predetermined area of the wide-angle view image. That is, the display control unit 37 changes the predetermined-area image to be displayed on the display 318 depending on whether the matched rate indicating the degree of similarity in facial feature points is equal to or greater than the threshold. The threshold may be set, for example, by the user. For example, when the degree of similarity ranges between 0.0 to 1.0, the threshold may be set to 0.9. That is, when the degree of similarity is equal to or greater than 0.9, the determination unit 35 determines that an area of the wide-angle view image (that is, the predetermined-area image) includes a specific object as indicated by the narrow-angle view image. The value of threshold may be changed according to user preference.

Further, a technique for face detection performed by the detection unit 40 is not limited to the above-described example using information on shape (that is, shape model data), such that the face detection may be performed in various other ways. For example, differences in brightness in a local region of the face may be used as feature points, which may be used for face detection (matching). Another example of face detection performed by the detection unit 40 will be described later. In either case, the display control unit 37 changes the predetermined-area image to be displayed on the display 318 depending on whether the matched rate indicating the degree of similarity in facial feature points is equal to or greater than the threshold. This matching processing may be performed using any desired known method, such as the method described in, for example, Hitoshi IMAOKA, et. al., "Face recognition technology and its application: features on elemental technologies and solutions supporting public safety", Biometrics authentication, NEC Technical Journal, Vol. 63, no. 3, pp. 26-30, September 2010.

In addition to or in alternative to the above-described detection of a human face, the detection unit 40 may detect, as a specific object, an animal such as a pet, or non-living object such as a building or specific characters such as symbols. Further, the detection unit 40 may detect a specific object based on specific feature characteristics, such as a specific color or brightness, or strokes of characters, without using shape model data. As the specific color, for example, a red color may be detected. When the detection unit 40 detects the red color, the display control unit 37 displays a predetermined-area image specified with the red color. For example, when the detection unit 40 is programmed to detect a skin color of a person, the specific object, which is a person, can be specified in the image using the skin color. That is, the detection unit 40 is able to detect the human face using color information, without using the above-described face recognition technique. In such case, the skin color may be determined so as to reflect variation in race. In another example, the detection unit 40 may be programmed to detect a portion having brightness values equal to or greater than a threshold, using brightness information in the image. In another example, the detection unit 40 may be programmed to detect a specific character or symbol, for example, to determine whether the same character is present such as at a construction site. In such case, the display control unit 37 may display a predetermined-area image including the character detected by the detection unit 40.

As described above, in the present embodiment, searching of similar images performed by the detection unit 40, together with the determination unit 35, is based on information on feature characteristics of a specific object, such as information on position (location), shape, size, color, brightness, or strokes (if characters) of the object. For simplicity, in this disclosure, when a result of matching by the detection unit 40 indicates that the degree of similarity to the feature characteristics is equal to or greater than a threshold, it is determined that a target object is similar to the specific object.

Figure 18:
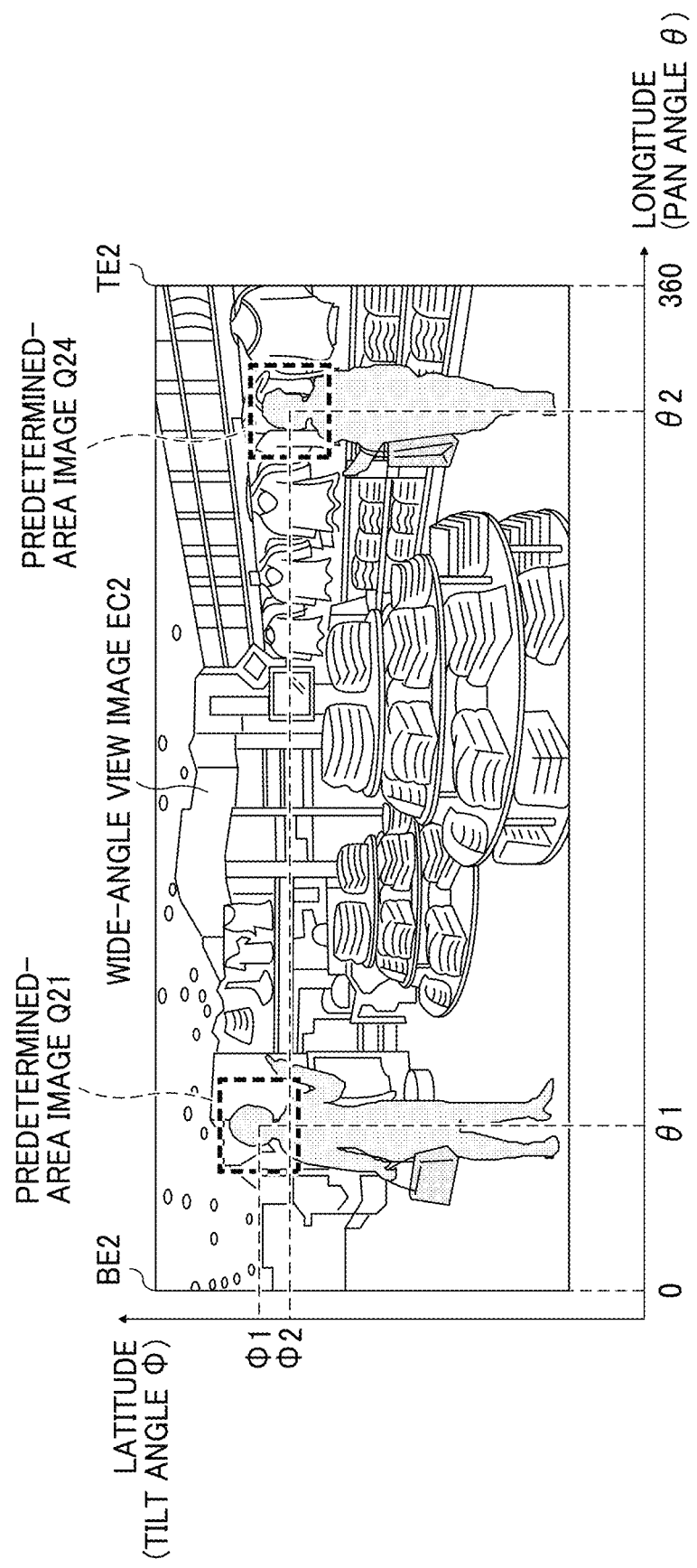
FIG. 18 is a diagram illustrating the relationship between the equirectangular projection image and the predetermined-area image, according to the second embodiment.

FIG. 18 is a conceptual diagram illustrating processing to detect a human face in the wide-angle view image according to the second embodiment. Referring to FIG. 18, the detection unit 40 picks up a rectangular section, which is a predetermined area, one by one, from the leading end BE2 to the rear end TE2 of the wide-angle view image, to search for a specific object. In FIG. 18, it is assumed that the predetermined-area image Q21 with a pan angle θ1 and the predetermined-area image Q24 with a pan angle of θ2 are respectively detected as having the specific object (that is, a human face).

Returning to FIG. 17, when the detection unit 40 detects a specific object in a particular predetermined area (S33-2: YES), the storing and reading unit 39 stores an image of that predetermined area in the storage unit 3000 (S33-3). In this example, information on the predetermined area, such as coordinates or pan angle, may be stored. Further, more than one predetermined-area images with the specific object may be stored.

On the other hand, when the detection unit 40 does not detect the specific object in the particular predetermined area (S33-2: NO), the operation proceeds to S34 of FIG. 13 in a substantially similar manner as described above in the first embodiment. In such case, different predetermined-area images are displayed, as described above in the first embodiment.

When the specific object is detected, the determination unit 35 determines whether or not there is any predetermined-area image to be displayed (S33-4). For example, the determination unit 35 may refer to the storage unit 3000 to determine whether there is any predetermined-area image (or information on the predetermined-area image) to be displayed is stored. When there is any predetermined-area image to be displayed (S33-4: YES), the storing and reading unit 39 reads an image of the predetermined area from the storage unit 3000 (S33-5).

As illustrated in FIG. 19(c), the display control unit 37 displays the predetermined-area image Q21 on the display 318 with the same aspect ratio as the narrow-angle view image, which is the planar image P2, for a predetermined time counted from time t2. (S33-6). The predetermined-area image (or information on the predetermined-area image), which is displayed, may be deleted from the storage unit 3000. The predetermined time is, for example, 1.0 second. The operation then returns to S33-4.

Figure 19:
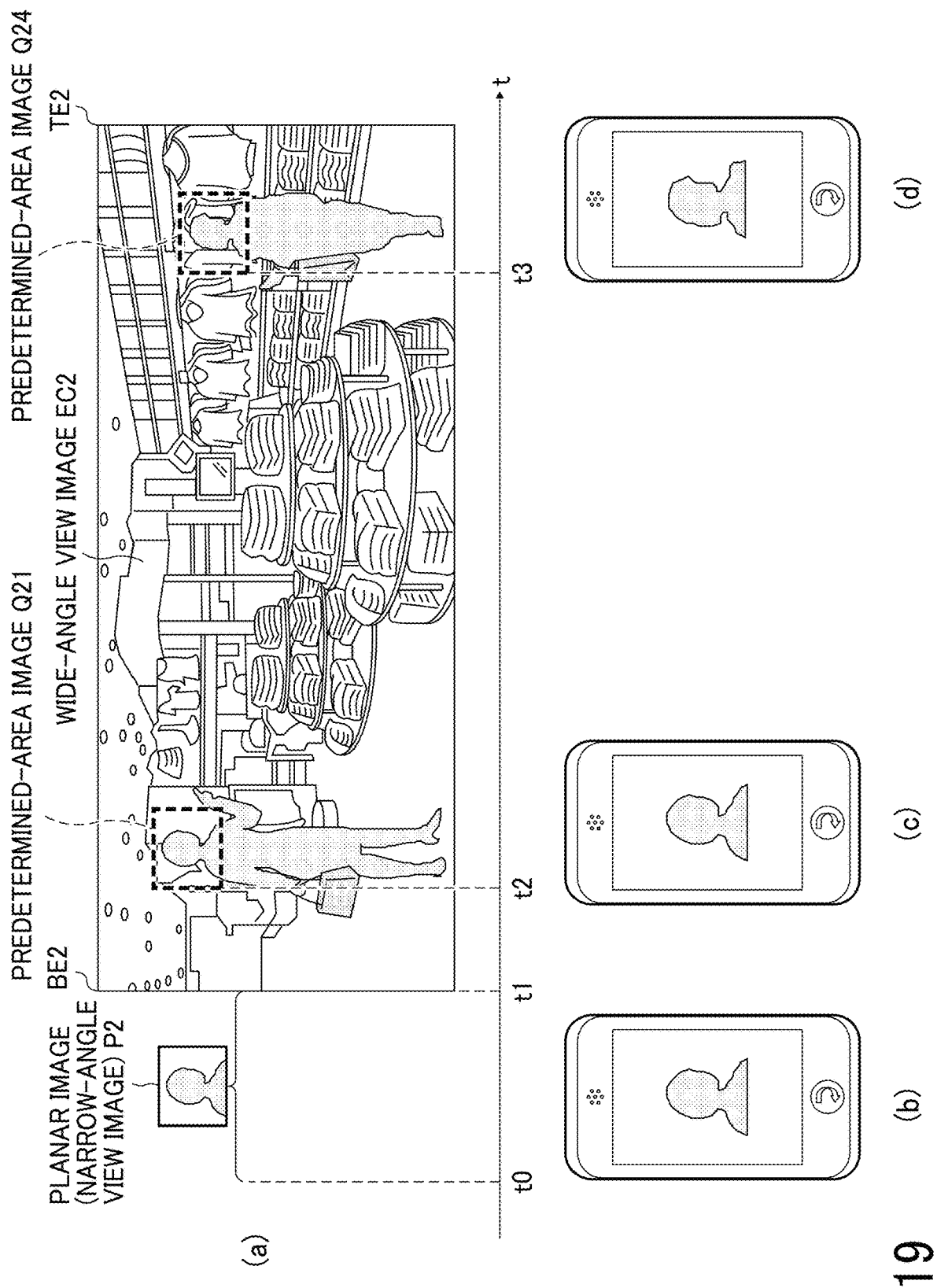
FIG. 19 is an illustration for explaining a time in which the planar image is displayed, and a time in which the predetermined-area image corresponding to a viewable area of the equirectangular projection image is displayed, according to the second embodiment.

In this example, a time period between time t1 and time t2 in FIG. 19 may be set in various ways. In one example, the time period between time t1 and time t2 is set to 0 second (t1=t2). In another example, the time period between time t1 and time t2 may be set to any value other than 0 second (t1<t2).

Further, images displayed at time t1 and time t2 may be set in various ways. In one example, in the example case in which t1=t2, the predetermined-area image Q21 (image of FIG. 19(c)) is displayed from time t1, and the predetermined-area image Q21 (image of FIG. 19(c)) is continuously displayed after time t2. In the example case in which t1<t2, in one example, the planar image P2 (the image of FIG. 19(b)) is displayed between time t1 and time t2. In the example case in which t1<t2, in another example, the predetermined-area image Q21 (the image of FIG. 19(c)) is displayed between time t1 and time t2. In the example case in which t1<t2, in another example, no image is displayed between time t1 and time t2, such that such time is used to prepare for switching to the image to be displayed. The processing to control timing for displaying the planar image P2 and the predetermined-area image Q in FIG. 19 can be applied to the example case referring to FIG. 21.

Returning to S33-4 of FIG. 17, when there is any predetermined-area image to be displayed ("YES"), the display control unit 37 displays the predetermined-area image Q24 on the display 318 as illustrated in FIG. 19(d), with the same aspect ratio as the narrow-angle view image, which is the planar image P2, for a predetermined time counted from time t3. (S33-6). The predetermined-area image, which is displayed, may be deleted from the storage unit 3000. The predetermined time is, for example, 1.0 second.

As described above, when the detection unit 40 determines that there is more than one predetermined-area image similar to the planar image P2, the detection unit 40 displays a plurality of predetermined-area images in order from the predetermined-area image having the highest degree of similarity. The following describes processing to display a plurality of predetermined-area images in order from the predetermined-area image having the highest degree of similarity. As described with reference to FIG. 18, the detection unit 40 picks up a rectangle section, which is a predetermined area, one by one, from the leading end BE2 to the rear end TE2 of the entire range (between 0° and 360° of pan angle θ) of wide-angle view image EC2 stored in the storage unit 3000 to search for a specific object. In this example, it is assumed that the predetermined-area images Q21 and Q24 with pan angles θ1 and θ2, respectively, are detected as having the specific object. Here, three or more predetermined-area images may be detected. The detection unit 40 then determines one of the predetermined-area images Q21 and Q24 having the highest degree of similarity, and rearranges the predetermined-area images in order from the highest degree of similarity to the lowest degree of similarity. The display control unit 37 displays the rearranged predetermined-area images Q21 and Q24 at desired times t2 and t3 as illustrated in FIG. 19. That is, the correlation between the longitude (pan angle θ) as illustrated in FIG. 18 and the time t illustrated in FIG. 19 may be ignored, and the predetermined-area image having a smaller pan angle θ is not necessarily displayed at time t having a smaller value.

On the other hand, when there is no predetermined-area image to be displayed (S33-4: NO), the smart phone 3 proceeds to S34 of FIG. 13, to start displaying different predetermined-area images while moving the display range DR. After processing of S34, operation is performed in a substantially similar manner as described above referring to the first embodiment.

According to the present embodiment, as illustrated in FIG. 19, the display control unit 37 displays the narrow-angle view image P2 obtained firstly by capturing an image with the smart phone 3, for a predetermined time period. Then, the display control unit 37 displays the predetermined-area images Q21 and Q24, in order from the degree of similarity to the narrow-angle view image P2. The display control unit 37 then sequentially displays the predetermined-area images one by one, while moving (changing) the predetermined area T throughout the wide-angle view image, which is obtained by the spherical image capturing device 1 by linked image capturing as described above. Accordingly, even if a viewer of the narrow-angle view image P2 does not recognize where the captured image is taken under what situation just by looking at an object in the narrow-angle view image P2, the viewer can easily recognize one or more persons who were present, once the predetermined-area images that are similar to the narrow-angle view image (such as the predetermined-area images Q21, Q24) are displayed, one by one, each at a predetermined time interval for a predetermined time period. This helps the viewer (user) to easily recognize the place or the situation, where the image was taken.

In this embodiment, the display control unit 37 does not reproduce an image of each viewable area T in the equirectangular projection image EC2 as one frame of video data, but displays the predetermined-area image Q21 (or Q24) corresponding to the viewable area T in the equirectangular projection image EC2, while shifting the viewable area T subjected to displaying. Accordingly, in the present embodiment, encoding of video image is not required, such that respective viewable areas T in the equirectangular projection image EC2 can be displayed seamlessly like a moving image. This also reduces processing load due to encoding processing. In this disclosure, the processing of displaying different predetermined-area images at predetermined time intervals along the time axis t is one example mode of sequentially displaying the predetermined-area images.

Third Embodiment

Figure 20A:
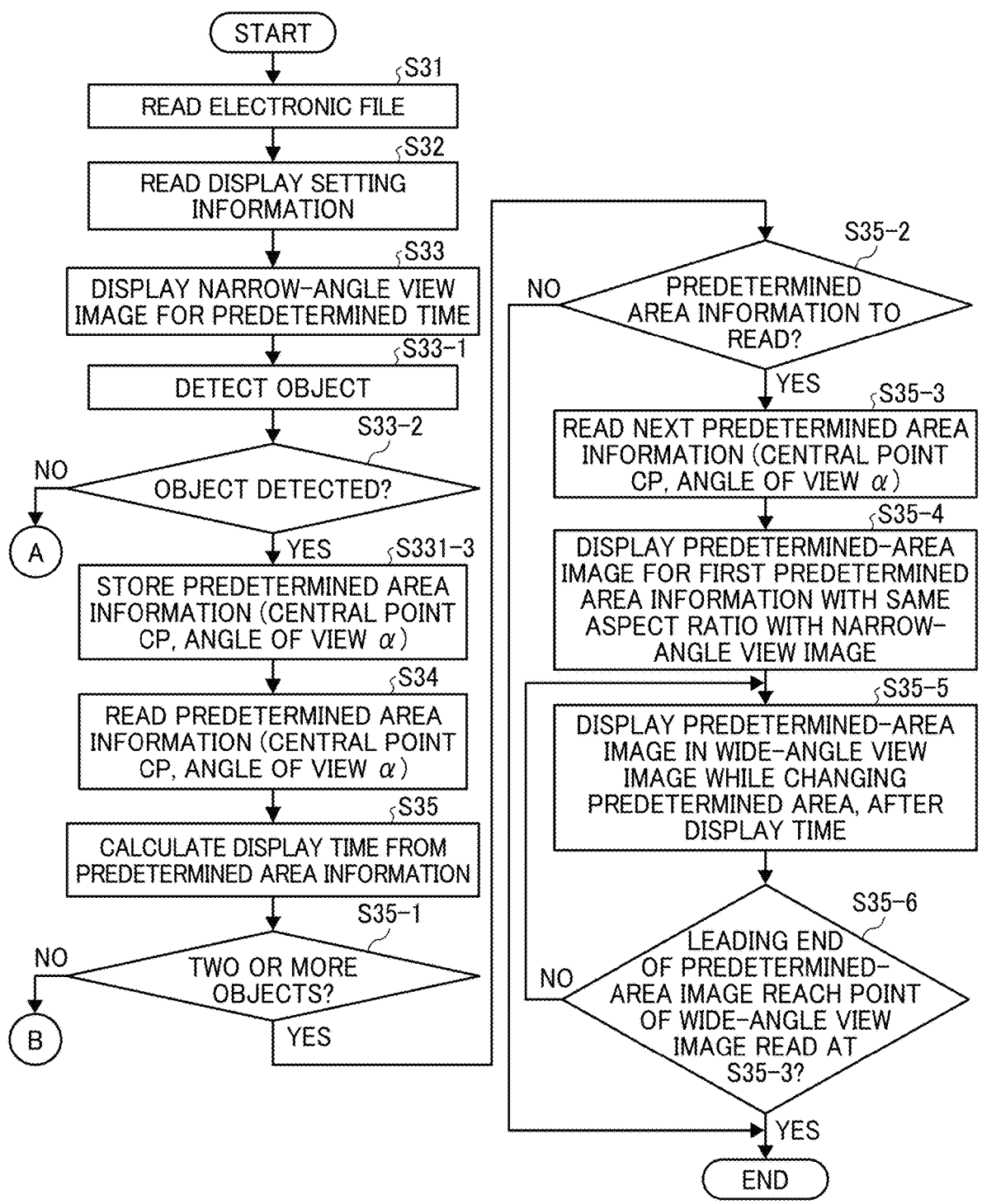
FIGS. 20A and 20B (FIG. 20) are a flowchart illustrating processing to display a predetermined-area image according to the third embodiment.
Figure 20B:
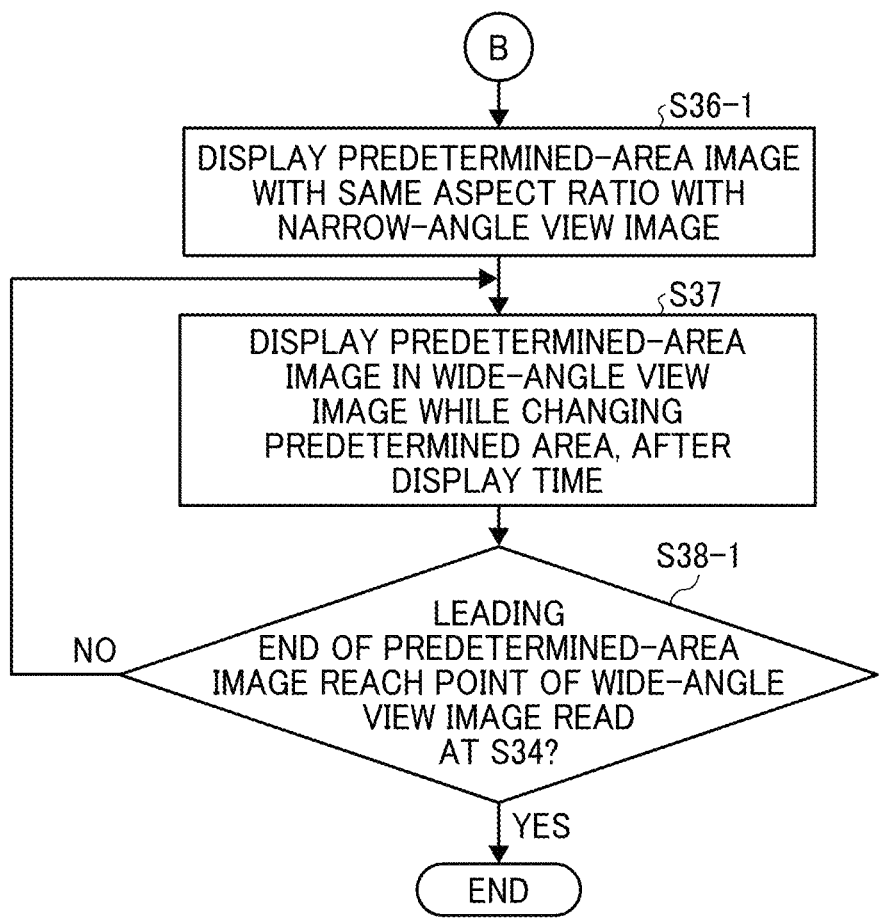
Figure 21:
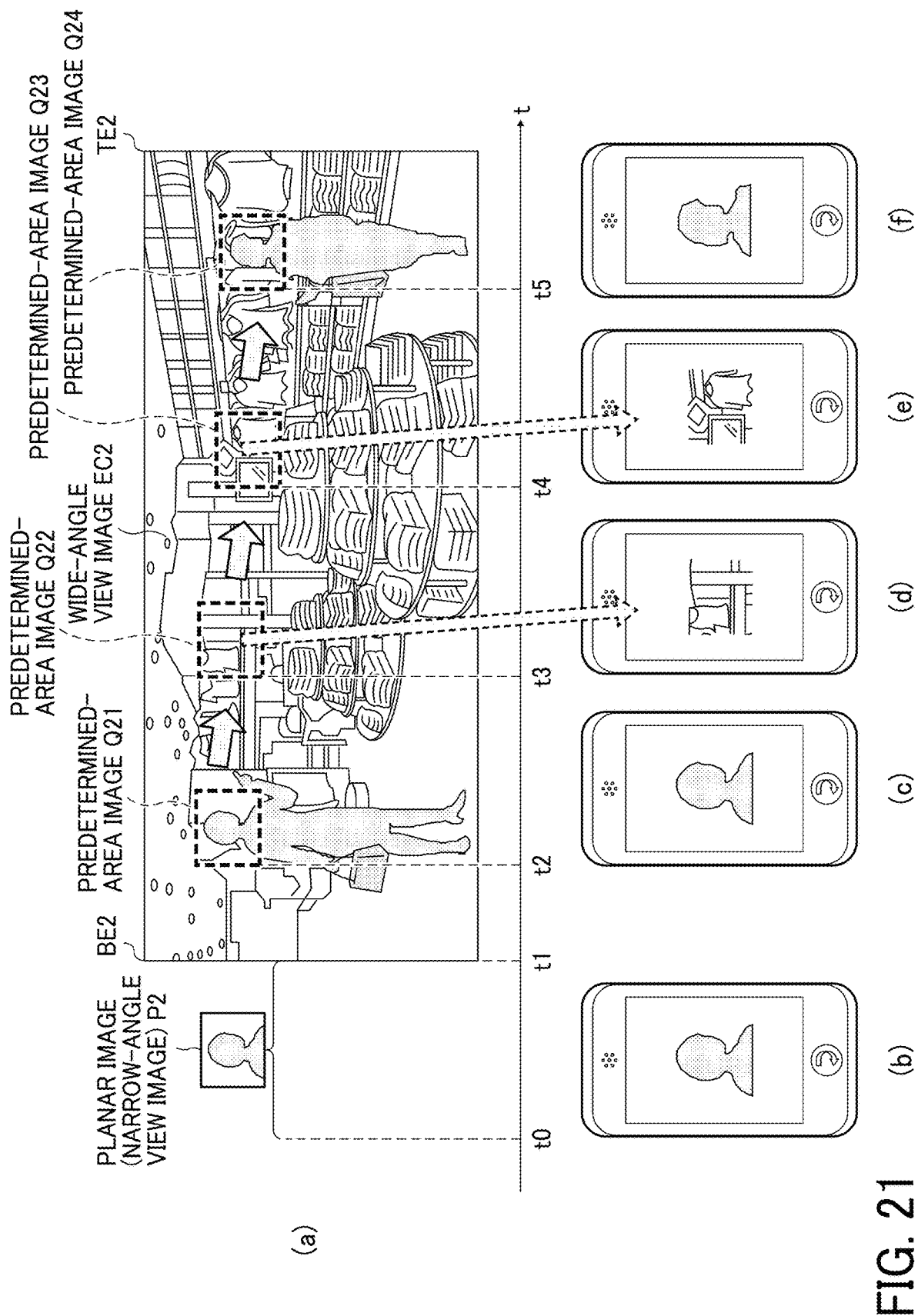
FIG. 21 is an illustration for explaining a time in which the planar image is displayed, and a time in which the predetermined-area image corresponding to a viewable area of the equirectangular projection image is displayed, according to the third embodiment.

Referring now to FIGS. 20A, 20B, and 21, an image communication system is described according to a third embodiment. Since the image communication system of the third embodiment is substantially the same in hardware and functional configurations of the image communication system according to the second embodiment, description thereof is omitted. Also in the third embodiment, various types of shape model data (or shape model) or information on feature points of a specific object may be used as described above in the second embodiment.

FIGS. 20A and 20B (FIG. 20) are a flowchart illustrating processing to display a predetermined-area image according to the third embodiment. In FIG. 20, processing after S33-2 is different from processing of FIG. 17 described above referring to the second embodiment. Therefore, description of the same processing with FIG. 17 is omitted, and description of processing after S33-2 (that is, YES: S33-2) is described. In the third embodiment, the detection unit 40 also performs similar image searching, that is, processing to search for an image that is similar to an image of a specific object, to determine whether there is any object (face) similar to a specific object (for example, the face of a person) in the wide-angle view image.

FIG. 21(*a*) is an illustration for explaining a time in which the planar image is displayed, and a time in which one or more predetermined-area images corresponding to different viewable areas of the equirectangular projection image are displayed, according to the third embodiment. FIG. 21(*b*) is an example planar image displayed on the smart phone, according to the third embodiment. FIGS. 21(*c*), 21(*d*), 21(*e*), and 21(*f*) are each an example predetermined-area image, of the equirectangular projection image, displayed on the smart phone at different times, according to the third embodiment. FIG. 21 is an example in which the smart phone 3 displays images, when two facial images are detected in the wide-angle view image. Also in the third embodiment, a predetermined area of the equirectangular projection image in which the predetermined-area image (for example, Q21, Q22, Q23, or Q24) is displayed, can be defined by a display range DR as described in the first embodiment.

As illustrated in FIG. 21, the display control unit 37 displays the predetermined-area image Q21 on the display 318 with the same aspect ratio as the narrow-angle view image, which is the planar image P2, for a predetermined time counted from time t2, as described above referring to S33-6 of FIG. 17. The predetermined-area image, which is displayed, may be deleted from the storage unit 3000. The predetermined time is, for example, 1.0 second.

Referring to FIG. 20A, the storing and reading unit 39 stores the predetermined-area information (central point CP, angle of view α) on the detected predetermined-area in the storage unit 3000 (S331-3).

The storing and reading unit 39 reads the predetermined-area information on one predetermined-area from the storage unit 3000 (S34).

The display control unit 37 calculates a display time of the predetermined-area image, which is a time period during which an image of a certain viewable area T is kept displayed (S35).

The determination unit 35 determines whether or not a number of detected objects is two or more (S35-1).

When the number of detected objects is two or more (S35-1: YES), the determination unit 35 determines whether there is any predetermined-area information to be read next (S35-2).

When it is determined that there is predetermined-area information to be read next (S35-2: YES), the storing and reading unit 39 reads the predetermined-area information from the storage unit 3000 (S35-3).

As illustrated in FIG. 21(c), the display control unit 37 displays the predetermined-area image Q21 on the display 318 based on the predetermined-area information that is read immediately before, with the same aspect ratio as the narrow-angle view image, which is the planar image P2, for a predetermined time counted from time t2. (S35-4). The predetermined-area image (or information on the predetermined-area image), which is displayed, may be deleted from the storage unit 3000.

Next, after the above-calculated display time of the predetermined-area image Q (for example, 0.005 seconds), the display control unit 37 increments the value of pan angle θ representing the viewable area T by one degree (for example, θ=1°). Accordingly, a range of the predetermined-area image Q changes, such that the image is displayed on the display 318 as the predetermined-area image Q keeps moving gradually in the moving direction, from the leading end BE1 to the rear end TE1 of the equirectangular projection image EC2 (S35-5). The predetermined-area image displayed at this time is, for example, the predetermined-area image Q22 displayed from time t3, as illustrated in FIG. 21(d). In the above-described displaying method, the display range DR may be shifted along a line between the central point CP of the predetermined-area image defined by the predetermined-area information that is read immediately before (the predetermined-area image Q21), and the central point CP of the predetermined-area image defined by the predetermined-area information that is just read (the predetermined-area image Q24). Since the central point CP is defined by the pan angle θ and the tilt angle Φ, the tilt angle Φ can be obtained using Equation 2 below with reference to the pan angle θ. Here, the pan angle θ is changed at a time by a predetermined angle (for example, 1°).

$$\Phi=((\Phi 2-\Phi 1)/(\theta 2-\theta 1))*(\theta-\theta 1)+\Phi 1(\theta 1\leq\theta<\theta 2)$$ [Equation 2]

Next, the determination unit 35 determines whether the leading end a21 of the predetermined-area image Q (that is, the display range DR) with respect to the moving direction has reached a position (point) indicated by the predetermined-area information of the equirectangular projection image EC2 (an example of wide-angle view image) (S35-6). The position indicated by the predetermined-area information of the wide-angle view image is the position indicated by the predetermined-area information (in this example, pan angle θ2) read from the storage unit 3000 by the storing and reading unit 39 at S35-3 described above. When the leading end a21 of the predetermined-area image Q reaches the position defined by the pan angle θ2 of the wide-angle view image, as the equirectangular projection image EC2 (S35-6: YES), the smart phone 3 ends operation of FIG. 20A, and proceeds to S34 of FIG. 13.

On the other hand, when the leading end a21 of the predetermined-area image Q has not reached the position defined by the pan angle θ2 of the wide-angle view image, as the equirectangular projection image EC2 (S35-6: NO), the determination unit 35 determines to perform processing of S35-5. After the above-calculated display time of the predetermined-area image, the display control unit 37 change a display range DR, to shift a predetermined area in the wide-angle view image, by predetermined angle, according to an amount calculated using Equation 2, and displays the predetermined-area image on the display 318. The predetermined-area image displayed at this time is, for example, the predetermined-area image Q23 displayed from time t4 as illustrated in FIG. 21(e).

Here, assuming that the pan angle θ displayed at S35-4 is θ1, by repeating the processes of S35-5 and S35-6, the display range DR moves to display different predetermined-area images, while increasing the pan angle θ, during a time period between the times t2 and t5 (FIGS. 21 (c), (d), (e), (f)). Through the above-described processing of moving the display range DR, when the leading end a21 of the predetermined-area image reaches the position of the wide-angle view image (an example of equirectangular projection image EC2), defined by the pan angle of θ2, the operation of FIG. 20A ends.

Referring back to FIG. 20A, at S35-1, when the number of detected objects is one (S35-1: NO), the operation proceeds to S36-1 of FIG. 20B. As illustrated in FIG. 21(c), the display control unit 37 displays the predetermined-area image on the display 318 based on the predetermined-area information that is read immediately before, with the same aspect ratio as the narrow-angle view image, which is the planar image P2, for a predetermined time counted from time t2. (S36-1). The predetermined-area image, which is displayed, may be deleted from the storage unit 3000. The process of S36-1 is the same as the process of S35-4.

Next, in a substantially similar manner as described above referring to S37 of FIG. 13, after the above-calculated display time of the predetermined-area image (for example, 0.005 seconds), the display control unit 37 moves the display range DR by certain angle, such as one degree (for example, θ=1°), to display on the display 318 a predetermined-area image corresponding to the display range DR having θ of 1 degree (S37).

Next, the determination unit 35 determines whether the leading end a21 of the predetermined-area image Q (that is, the display range DR) with respect to the moving direction has reached a position (point) indicated by the predetermined-area information of the equirectangular projection image EC2 (an example of wide-angle view image), which is read at S34 (S38-1). When it is determined that the leading end a11 has not reached (S38-1: NO), the determination unit 35 proceeds to S37. After the display time of the predetermined-area image, the display control unit 37 again moves the display range DR by one degree of pan angle of imaging direction (for example, θ=1°), and displays on the display 318 a predetermined-area image corresponding to the display range DR having been moved (with θ of 2 degrees). Here, assuming that the pan angle θ displayed at S36 is θ1, by repeating the processes of S37 and S38, the display range DR moves to display different predetermined-area images, while increasing the pan angle θ. Through the above-described processing of moving the display range DR, even after the leading end a21 of the predetermined-area image reaches the rear end TE2 of the wide-angle view image (an example of equirectangular projection image EC2), the display range DR is continuously moved to display a predetermined-area image starting from the leading end BE2 of the wide-angle view image.

On the other hand, when it is determined that the leading end a11 has reached the position indicated by the predetermined-area information read at S34 (S38-1: YES), the determination unit 35 determines to end the operation of FIG. 20B.

According to the present embodiment, as illustrated in FIG. 21, the display control unit 37 displays the narrow-angle view image (planar image P2) obtained firstly by capturing an image with the smart phone 3, for a predetermined time period. The display control unit 37 then sequentially displays the predetermined-area images (Q21, Q22, Q23, and Q24), one by one, while moving (changing) the predetermined area T throughout the wide-angle view image, which is obtained by the spherical image capturing device 1 by linked image capturing as described above. Accordingly, even if a viewer of the narrow-angle view image does not recognize where the captured image is taken under what situation just by looking at an object in the narrow-angle view image, the viewer can easily recognize the place or the situation once the predetermined-area images Q (Q21, Q22, Q23, and Q24) with slightly different viewable-areas T are sequentially displayed. Further, in this embodiment, the different predetermined-area images to be displayed include those images that are similar to the narrow-angle view image.

Accordingly, in the third embodiment described above, the viewer of the narrow-angle view image can easily recognize the place or the situation, from surroundings of those images (objects) similar to the narrow-angle view image.

In this embodiment, the display control unit 37 does not reproduce an image of each viewable area T in the equirectangular projection image EC2 as one frame of video data, but displays the predetermined-area image Q21 (or Q22, Q23, or Q24) corresponding to the viewable area T in the equirectangular projection image EC2, while shifting the viewable area T subjected to displaying. Accordingly, in the present embodiment, encoding of video image is not required, such that respective viewable areas T in the equirectangular projection image EC2 can be displayed seamlessly like a moving image. This also reduces processing load due to encoding processing.

Fourth Embodiment

Figure 22:
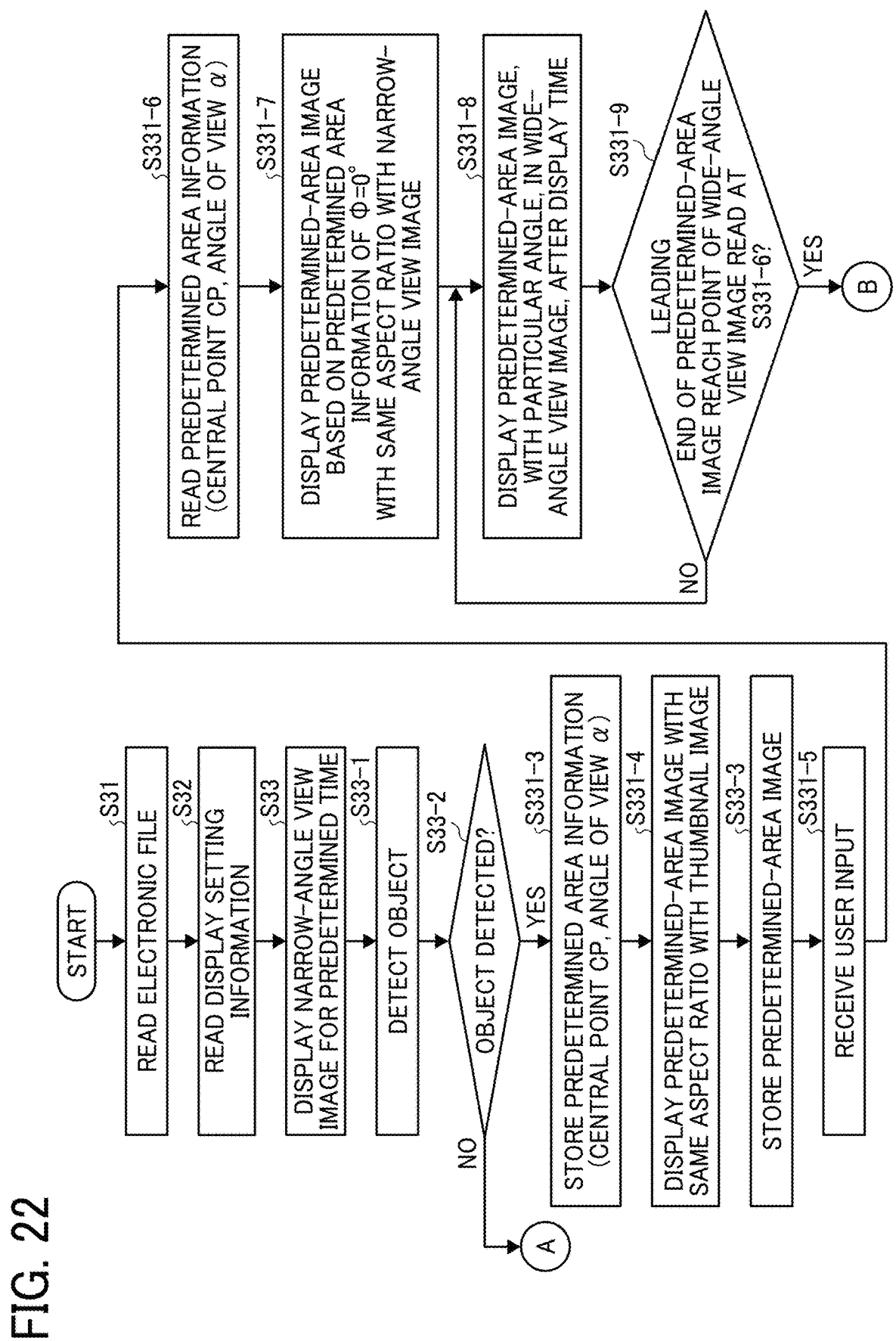
FIG. 22 is a flowchart illustrating processing to display a predetermined-area image according to the fourth embodiment.
Figure 23:
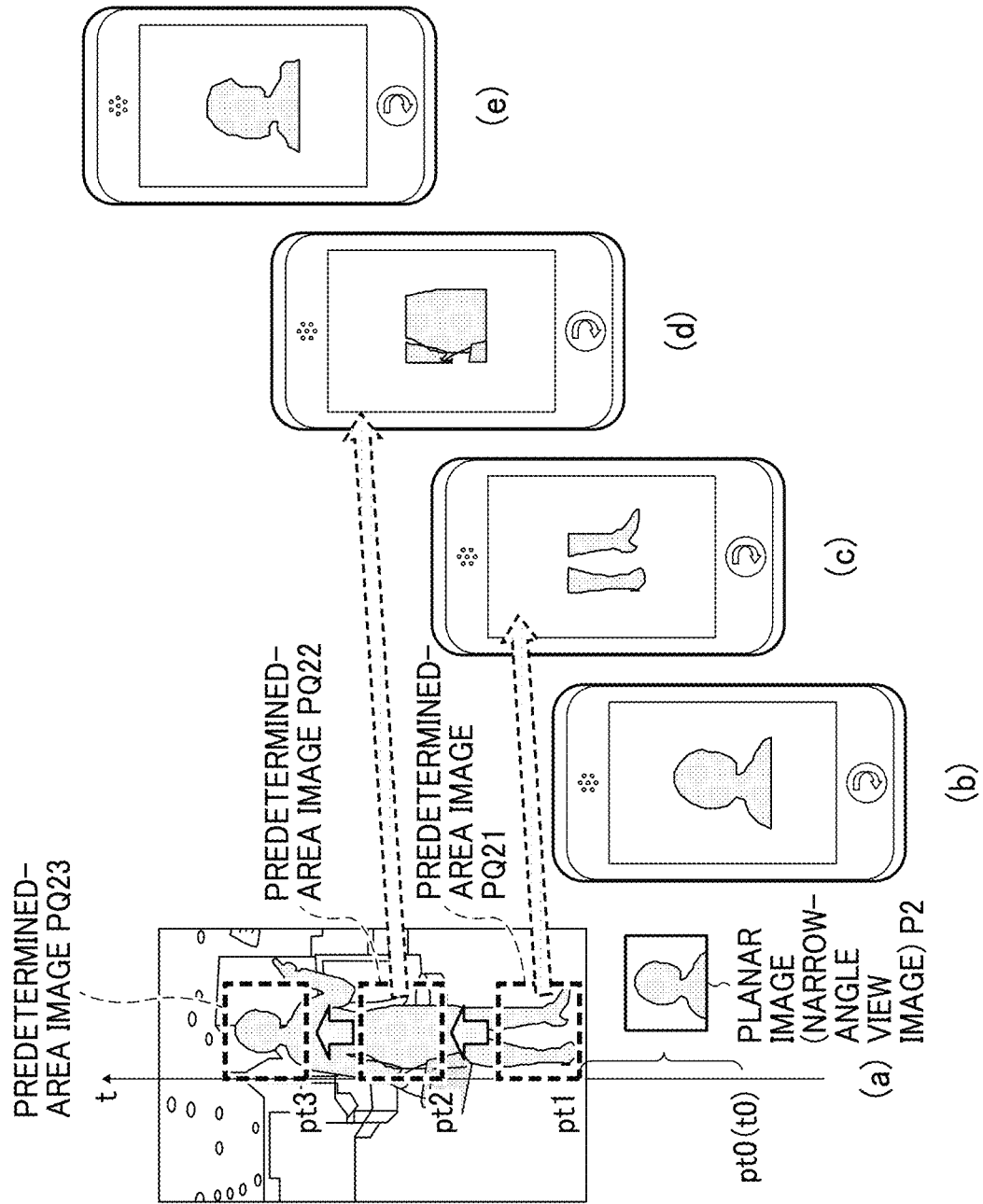
FIG. 23 is an illustration for explaining a time in which the planar image is displayed, and a time in which the predetermined-area image corresponding to a viewable area of the equirectangular projection image is displayed, according to the fourth embodiment.
Figure 24:
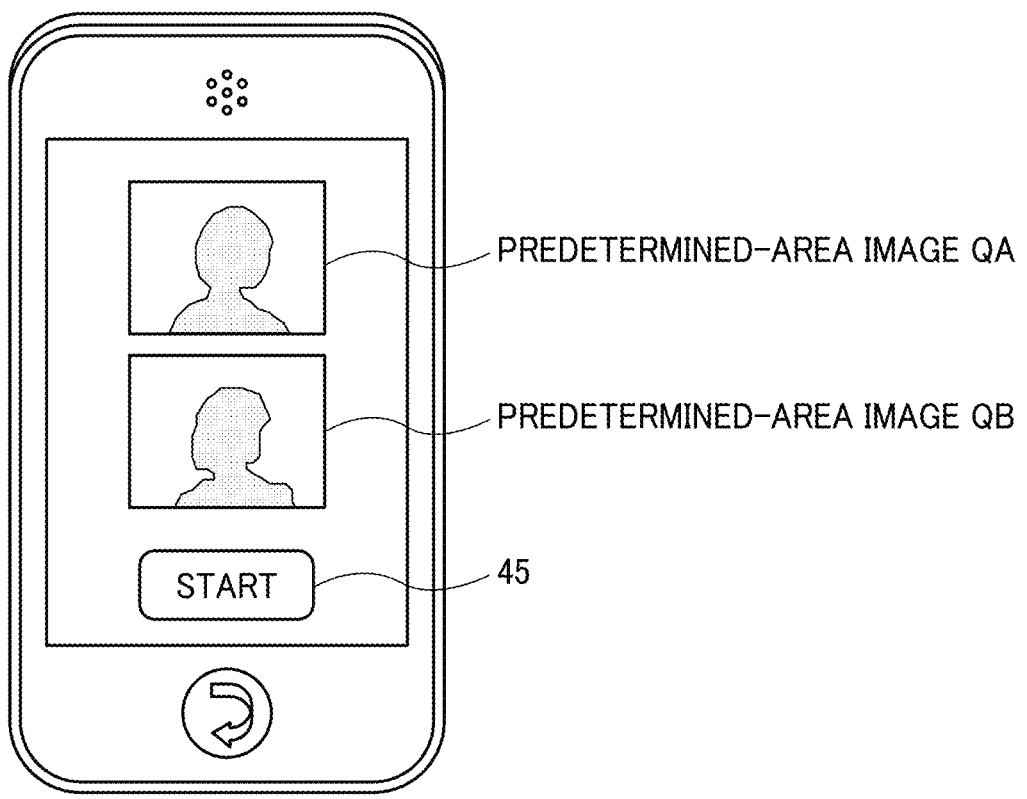
FIG. 24 is an illustration of an example screen for selecting a predetermined-area image for display according to the fourth embodiment.

Referring now to FIGS. 22 to 24, an image communication system is described according to a fourth embodiment. Since the image communication system of the fourth embodiment is substantially the same in hardware and functional configurations of the image communication system according to the second and third embodiments, description thereof is omitted. Also in the fourth embodiment, various types of shape model data (or shape model) or information on feature points of a specific object may be used as described in the second embodiment.

FIG. 22 is a flowchart illustrating processing to display a predetermined-area image according to the fourth embodiment. Since S31 to S331-3 of FIG. 22 are performed in a substantially similar manner as described above referring to S31 to S331-3 according to the third embodiment, description thereof is omitted, and processing after S331-4 is mainly described below. In the fourth embodiment, the detection unit 40 also performs similar image searching, that is, processing to search for an image that is similar to an image of a specific object, to determine whether there is any object (face) similar to a specific object (for example, the face of a person) in the wide-angle view image.

FIG. 23(*a*) is an illustration for explaining a time in which the planar image is displayed, and a time in which one or more predetermined-area images corresponding to different viewable areas of the equirectangular projection image are displayed, according to the fourth embodiment. FIGS. 23(*b*), 23(*c*), 23(*d*), and 23(*e*) are each an example predetermined-area image, of the equirectangular projection image, displayed on the smart phone at different times, according to the fourth embodiment. In the fourth embodiment, it is assumed that a display range DR moves in the direction of the tilt angle Φ representing the latitude direction, so that different predetermined-area images are displayed in the equirectangular projection image as the images were moved in the vertical direction, as compared to the case in which the display range DR moves in the direction of the pan angle θ representing the longitude direction. In FIG. 23, the time axis t is a vertical axis.

Returning to FIG. 22, to improve visibility of an image when displayed at the smart phone 3, the display control unit 37 displays a predetermined-area image having a specific object detected at S33-2 with an aspect ratio that matches an aspect ratio of a thumbnail image displayable by the smart phone 3 (S331-4). In this way, even when the smart phone has relatively a smaller display size, a specific object can be displayed with a larger size. That is, a display range DR can be adjusted to have a size that matches a size of a thumbnail image to be displayed at the smart phone 3. As illustrated in FIG. 23(*b*), a planar image P2 showing a particular person is displayed on the display 318 at time pt0 (t0).

The thumbnail image that is displayed as a predetermined-area image having a specific object (or similar to the planar image) is, for example, each image illustrated in FIG. 24. In this example, two predetermined-area images, each being determined as similar to the planar image, are displayed as thumbnail image based on search. FIG. 24 illustrates an example screen for selecting a predetermined-area image for further display according to the fourth embodiment. As illustrated in FIG. 24, the smart phone 3 displays on the display 318, a predetermined-area image QA corresponding to the planar image P2 of the head of the person A and its surroundings, and a predetermined-area image QB corresponding to the planar image P2 of the head of the person B and its surroundings. Further, a START button 45 is displayed on the display 318, which, when selected, starts processing to move a display area to switch display of the predetermined-area image, after the predetermined-area image QA or the predetermined-area image QB is selected by the user. After the user selects either the predetermined-area image QA or the predetermined-area image QB, the reception unit 32 receives user selection of the predetermined-area image in response to pressing of the START button 45, and starts processing to display different areas of the wide-angle view image.

Specifically, following the processing of S331-4, the storing and reading unit 39 stores information on the predetermined-area image having the detected specific object in the storage unit 3000 (S33-3). In this example, the predetermined-area image QA and the predetermined-area image QB, or information on any one of such images, are stored.

Subsequently, the reception unit 32 receives a user input (selection or tapping on the desired predetermined-area image) that selects the predetermined-area image QA or the predetermined-area image QB illustrated in FIG. 24 (S331-5).

Subsequently, the storing and reading unit 39 reads out, from the storage unit 3000, the predetermined-area information (central point CP, angle of view α) on the predetermined-area image that is selected at S331-5 (S331-6).

Subsequently, the display control unit 37 displays the predetermined-area image on the display 318 with the same aspect ratio as the planar image P2, which is an example of narrow-angle view image (S331-7). For example, as illustrated in FIG. 23(*b*), the selected predetermined-area image (in this case, the predetermined-area image QA), is displayed on the display 318 between time pt0 and time pt1.

Next, after the display time of the predetermined-area image (for example, 0.005 seconds) calculated using Equation 2, a predetermined-area image specifying the same object, represented by the selected predetermined-area image, is displayed (S331-7). Specifically, the predetermined-area image displayed by the display control unit 37 at this time is an image defined by a display range, as the display range moves so that the tilt angle Φ of the predetermined-area information read at S331-6 is changed to 0°. For example, as illustrated in FIG. 23(c), a predetermined-area image PQ21 is displayed on the display 318 at time pt1. The predetermined-area image PQ21 is an image showing feet of the person displayed in the thumbnail image that is selected.

The display control unit 37 then moves the display range DR by certain angle, such as one more degree (for example, Φ=1°), to display a predetermined-area image corresponding to the display range DR having Φ of 1 degree. That is, the image of a predetermined area being displayed on the display 318 changes, as the display range DR moves in the moving direction, along the time axis t (S331-8). Here, the moving direction is a direction perpendicular to the equator in the spherical image. For example, as illustrated in FIG. 23(d), a predetermined-area image PQ22 is displayed on the display 318 at time pt2. The predetermined-area image PQ22 is an image showing around waist of the person displayed in the thumbnail image that is selected.

Next, the determination unit 35 determines whether the leading end of the predetermined-area image Q (that is, the display range DR) with respect to the moving direction has reached a position (point) indicated by the predetermined-area information of the equirectangular projection image (an example of wide-angle view image), which is read at S331-6 (S331-9). When it is determined that the leading end has not reached (S331-9: NO), the determination unit 35 returns to S331-8. After the display time of the predetermined-area image, the display control unit 37 again moves the display range DR by one degree of tilt angle of imaging direction, and displays on the display 318 a predetermined-area image corresponding to the display range DR having been moved. For example, as illustrated in FIG. 23(a), a predetermined-area image PQ23 is displayed on the display 318 at time pt3. The predetermined-area image PQ23 is an image showing head (face) of the person displayed in the thumbnail image that is selected.

The image of a detected person can be displayed with the same aspect ratio as the planar image, using the following technique. Since the aspect ratio (aspect ratio) of a screen of the smart phone 3 that displays the narrow-angle view image is a preset value, the aspect ratio of the planar image P2 captured by the smart phone 3 can also be obtained as a uniquely determined value. Using this uniquely determined value, the display 318 is able to display a predetermined-area image with the same aspect ratio as the planar image P2, which is an example of the narrow-angle view image.

In the fourth embodiment, the display control unit 37 moves a display range in the tilt angle Φ direction, that is, in the direction perpendicular to the equator, to display different predetermined-area images. Accordingly, for example, when the planar image (or a firstly-displayed predetermined-area image) represents a facial image of a particular person, an image of entire body of that person including the facial image can be displayed for confirmation. The processing to move a display range in the vertical direction to display an image of a predetermined area is, for example, processing to move a display range vertically so as to display an image to show from the feet to the head of a person as illustrated in FIGS. 23 and 24. In the present embodiment, the display range is moved in the direction so as to increase the tilt angle from 0° as the starting point, but may be moved in the direction so as to decrease the tilt angle from 360° as the starting point. That is, the display range may be moved vertically so as to display from an image of the head (face) of the person to an image of the feet of the person. Further, while this example describes the example case in which the specific object is a part of a person, the above-described technique can be applied to the example case in which the specific object is a part of building or a part of any single entity.

When it is determined at S331-9 that the read position has been reached (S331-9: YES), the determination unit 35 performs processing after S36-1 of FIG. 20B. The moving direction of the display range to display a predetermined-area image for processing after S36-1 is the horizontal direction with respect to the equator in the spherical image (that is, wide-angle view image).

The detection unit 40 also performs similar image searching, that is, processing to search for an image that is similar to an image of a specific object, to determine whether there is any object (face) similar to a specific object (for example, the face of a person) in the wide-angle view image. The display control unit 37 then sequentially moves a display range to display different predetermined-area images as described above referring to S36-1 in the second to fourth embodiments.

As illustrated in FIG. 24, a technique for selecting a thumbnail image displayed on the display 318 of the smart phone 3, and moving a display range to display different predetermined-area images may be applied at any desired time in any one of the second to fourth embodiments.

As described above, the smart phone 3 displays on the display 318, a predetermined-area image QA corresponding to the planar image P2 showing the head of the person A and its surroundings, and a predetermined-area image QB corresponding to the planar image P2 showing the head of the person B and its surroundings. After the user selects either the predetermined-area image QA or the predetermined-area image QB, the reception unit 32 receives selection of the predetermined-area image in response to pressing of the START button 45 for starting processing to move a display range to display different predetermined-area images. Accordingly, the smart phone 3 is able to start displaying, from the predetermined-area image according to preference of the viewer who is viewing the narrow-angle view image.

In this embodiment, a display range is moved in the direction perpendicular to the equator. Accordingly, when the planar image (that is, the firstly-displayed predetermined-area image) represents a facial image of a particular person, an image of entire body of that person including the facial image can be displayed for confirmation. As illustrated in FIGS. 22 and 23, the display control unit 37 displays the narrow-angle view image (planar image P2) obtained firstly by capturing an image with the smart phone 3, for a predetermined time period. The display control unit 37 then sequentially displays the predetermined-area images (PQ21, PQ22, and PQ23) one by one, while moving (changing) the display range, which defines the predetermined area T in the wide-angle view image, in the direction of tilt angle Φ (direction perpendicular to equator). After that, in one example, the display control unit 37 continuously moves a display range in the pan angle θ direction (horizontal direction with respect to the equator) to display different predetermined-area images. The user (viewer) can see the predetermined-area images displayed one after another, while checking not only the face but also other characteristic parts of the specific object in the narrow-angle view image. Accordingly, the user can easily recognize the characteristics of the specific object more clearly, and therefore the place or the situation where the specific object is captured. Therefore, the user can effectively recognize not only details of the specific object in the predetermined-area image, but also surroundings of the specific object in more detail.

In this embodiment, the display control unit 37 does not reproduce an image of each viewable area T in the equirectangular projection image as one frame of video data, but displays the predetermined-area image PQ21, PQ22, or PQ23, corresponding to the viewable area T in the equirectangular projection image, while shifting the viewable area T subjected to displaying. Accordingly, in the present embodiment, encoding of video image is not required, such that respective viewable areas T in the equirectangular projection image EC2 can be displayed seamlessly like a moving image. This also reduces processing load due to encoding processing.

Variations of First to Fourth Embodiments

Figure 25:
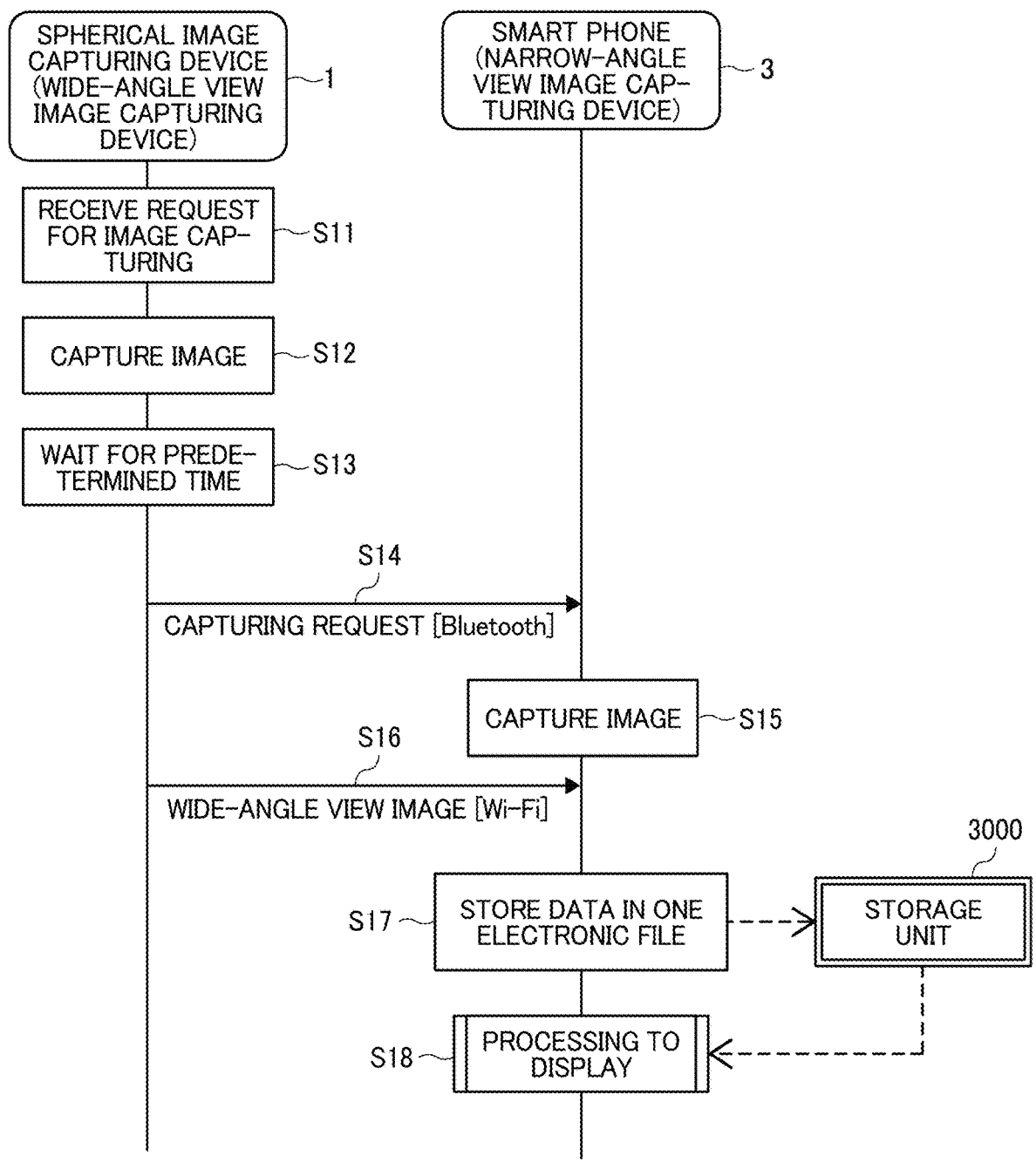
FIG. 25 is a sequence diagram illustrating linked image capturing processing according to a variation of the first to fourth embodiments.

Referring now to FIG. 25, another example of linked image capturing processing is described as a variation of the example described above in the first to fourth embodiments. FIG. 25 is a sequence diagram illustrating linked image capturing processing according to a variation of the first to fourth embodiments.

In FIG. 12, a notification is sent to the spherical image capturing device 1, at the time when the smart phone 3 starts image capturing, to start linked image capturing. Alternatively, in FIG. 25, a notification is sent to the smart phone 3 at the time when the spherical image capturing device 1 starts image capturing. The details will be described below. Prior to processing of FIG. 25, it is assumed that a connection is established between the smart phone 3 and the spherical image capturing device 1 to enable communication via Wi-Fi and Bluetooth.

First, the reception unit 12 of the spherical image capturing device 1 receives a request for capturing an image from the user A (S11). The image capturing unit 13 captures a target object and its surroundings (such as scenery), to obtain two items of hemispherical image data. The image and audio processing unit 16 generates equirectangular projection image, from these two items of hemispherical image data, as wide-angle view image data (S12). In this case, the audio collecting unit 14 may collect sounds to generate audio data, and associate the audio data with the wide-angle view image data.

The image capturing unit 13 of the spherical image capturing device 1 waits for a predetermined time (S13). For example, the predetermined time may be set to 3 seconds. With this waiting time, when the user A himself or herself is the target object to be captured as instructed at S12, the user A can either pick up the smart phone 3 in addition to the spherical image capturing device 1, or changes from the spherical image capturing device 1 to the smart phone 3, to be ready for image capturing.

Next, the communication unit 18 of the spherical image capturing device 1 transmits image capturing request information indicating a request for starting image capturing (capturing request) to the smart phone 3 by Bluetooth (S14). The communication unit 38 of the smart phone 3 receives the image capturing request information. Accordingly, at the smart phone 3, the image capturing unit 33 captures an image of the target object. The image and audio processing unit 36 generates narrow-angle view image data (S15).

Next, the communication unit 18 of the spherical image capturing device 1 transmits the wide-angle view image data obtained at S12 to the smart phone 3 by Wi-Fi (S16). Accordingly, the communication unit 38 of the smart phone 3 receives the wide-angle view image data. In the image communication system of the present embodiment, the communication unit 18 of the spherical image capturing device 1 may transmit two items of hemispherical image data to the smart phone 3. The smart phone 3 may then combine these two items of hemispherical image data into equirectangular projection image data, as wide-angle view image data. The Bluetooth used for transmission and reception of capturing request at S14 is an example of a first communication method, and the Wi-Fi used for transmission and reception of captured image data at S16 is an example of a second communication method.

Through processing of S11 to S16, the smart phone 3 can acquire wide-angle view image data that cannot be obtained by capturing with its own terminal. Further, the time to capture image data is synchronized by this linking image capturing processing between the smart phone 3 and the spherical image capturing device 1.

Next, the image and audio processing unit 36 of the smart phone 3 stores the narrow-angle view image data obtained at S15 and the wide-angle view image data obtained at S16 in the same, one electronic file. The storing and reading unit 39 stores data of this electronic file in the storage unit 3000 (S17). The narrow-angle view image data or the wide-angle view image data may be stored in any other memory, which may be disposed outside the smart phone 3. Examples of such external memory include, but not limited to, any external server such as a cloud server. This may make easier to share the narrow-angle view image data or the wide-angle view image data. Then, the display control unit 37 of the smart phone 3 controls the display 318 to display the narrow-angle view image and the wide-angle view image (S18). S18 of FIG. 17 is performed in a substantially similar manner as described above referring to S10 of FIG. 12 and FIG. 14, and description thereof is omitted.

As described above, according to the variation of the first embodiment, the user A can visually check an image to be captured as a wide-angle view image, even when a target object is away from the smart phone 3, before instructing the spherical image capturing device 1 to transmit the wide-angle view image data to the smart phone 3. For example, assuming that the user A, who is having a party on board, wants to capture an image, the user A may ask another person to capture an image of a certain area inboard (inside) with the smart phone 3. The user A himself or herself may go outside the board (such as on deck), with the spherical image capturing device 1. Then, the user A captures an image of scenery with the spherical image capturing device 1, at a desired timing, such as when a boat approaches a bridge. Accordingly, the user A is able to instruct the spherical image capturing device 1 to capture an image of a particular object at any desired time, while checking landscape that can be captured. In response to capturing at the spherical image capturing device 1, the smart phone 3, which is placed apart, can take an image of another place (such as a room) by linked image capturing. The above-described case assumes that the user A takes the spherical image capturing device 1 on deck, but the user A may instead bring the smart phone 3 on deck, while leaving the spherical image capturing device 1 inboard. In such case, it is more desirable for the user A to capture an image of a particular object on deck, as the narrow-5 angle view image data, rather than scenery of surroundings. For example, the user A may take an image reflecting scene that caught his or her mind, with the smart phone 3.

Fifth Embodiment

Referring now to FIGS. 26 to 30, an image communication system is described according to a fifth embodiment.

Schematic Configuration of Image Communication System:

First, referring to FIG. 26, an overview of the image communication system is described according to the fifth embodiment. FIG. 26 is a schematic diagram illustrating a configuration of the image communication system according to the fifth embodiment. In the fifth embodiment, the image communication system of FIG. 26 is further provided with an image management server 5 and an access point 7, compared to the system configuration illustrated in FIG. 8.

In the first embodiment, the smart phone 3 communicates data with the spherical image capturing device 1 by Wi-Fi. In the fifth embodiment, an access point 7 is additionally provided to intermediate data between the smart phone 3 and the image management server 5. The smart phone 3 enables communication of data with the image management server 5 by switching a counterpart of communication from the spherical image capturing device 1 to the access point 7. Accordingly, the image management server 5 is able to communicate data with the smart phone 3 via the access point 7. The image management server 5 may be implemented by a computer. The image management server 5 may be implemented by a single computer or may be implemented by a plurality of computers. The image management server 5 is an example of image management apparatus. Also in the fifth embodiment, various types of shape model data (or shape model) or information on feature points of a specific object may be used as described above in the second embodiment.

Example Hardware Configuration

Figure 27:
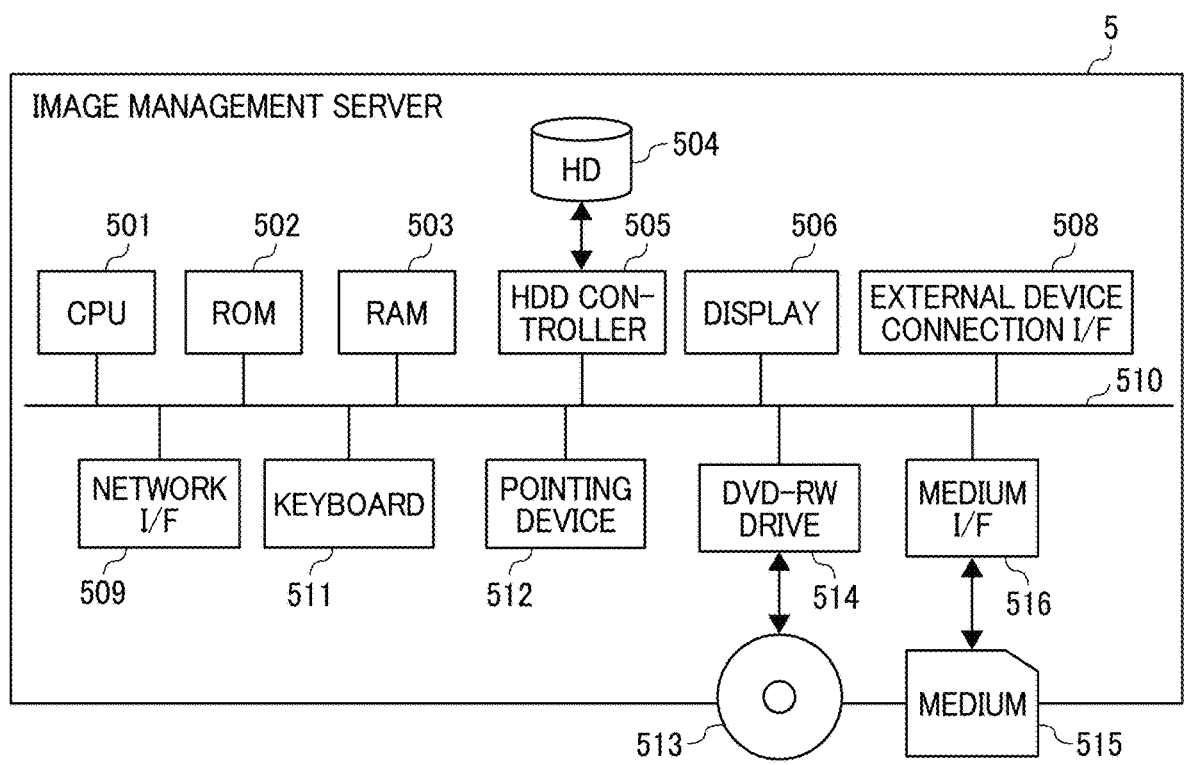
FIG. 27 is a schematic diagram illustrating a hardware configuration of an image management server according to the fifth embodiment.

Next, referring to FIG. 27, a hardware configuration of the image management server 5 is described according to the embodiment. Since the spherical image capturing device 1 and the smart phone 3 are substantially the same in hardware configuration as described in the second to fourth embodiments, description thereof is omitted. Since the access point 7 is a general-purpose access point, description of a hardware configuration thereof is omitted.

Hardware configuration of Image Management Server:

FIG. 27 illustrates a hardware configuration of the image management server 5 according to the fifth embodiment. As illustrated in FIG. 27, the image management server 5, which is implemented by a computer, includes a CPU 501, a ROM 502, a RAM 503, a HD 504, a hard disk drive (HDD) controller 505, a display 506, an external device connection interface (I/F) 508, a network I/F 509, a bus line 510, a keyboard 511, a pointing device 512, a digital versatile disk rewritable (DVD-RW) drive 514, and a medium I/F 516.

The CPU 501 controls entire operation of the image management server 5. The ROM 502 stores a program for controlling the CPU 501, such as IPL. The RAM 503 is used as a work area for the CPU 501. The HD 504 stores various data such as a program. The HDD controller 505 controls reading and writing of various data from and to the HD 504 under control of the CPU 501. The display 506 displays various information such as a cursor, menu, window, characters, or image. The external device connection I/F 508 is an interface that connects the computer as the image management server 5 to various external devices. Examples of the external devices include, but not limited to, a universal serial bus (USB) memory and a printer. The network I/F 509 is an interface that controls communication of data with an external device through the communication network 100. The bus line 510 may be an address bus or a data bus, which electrically connects various elements such as the CPU 501 of FIG. 19.

The keyboard 511 is one example of input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. In alternative to the DVD-RW, any recording medium may be used such as a DVD-R, Blu-ray Disc (Blu-ray Disc), etc. The medium I/F 516 controls reading and writing (storing) of data from and to a storage medium 515 such as a flash memory.

Example Functional Configuration

Figure 28:
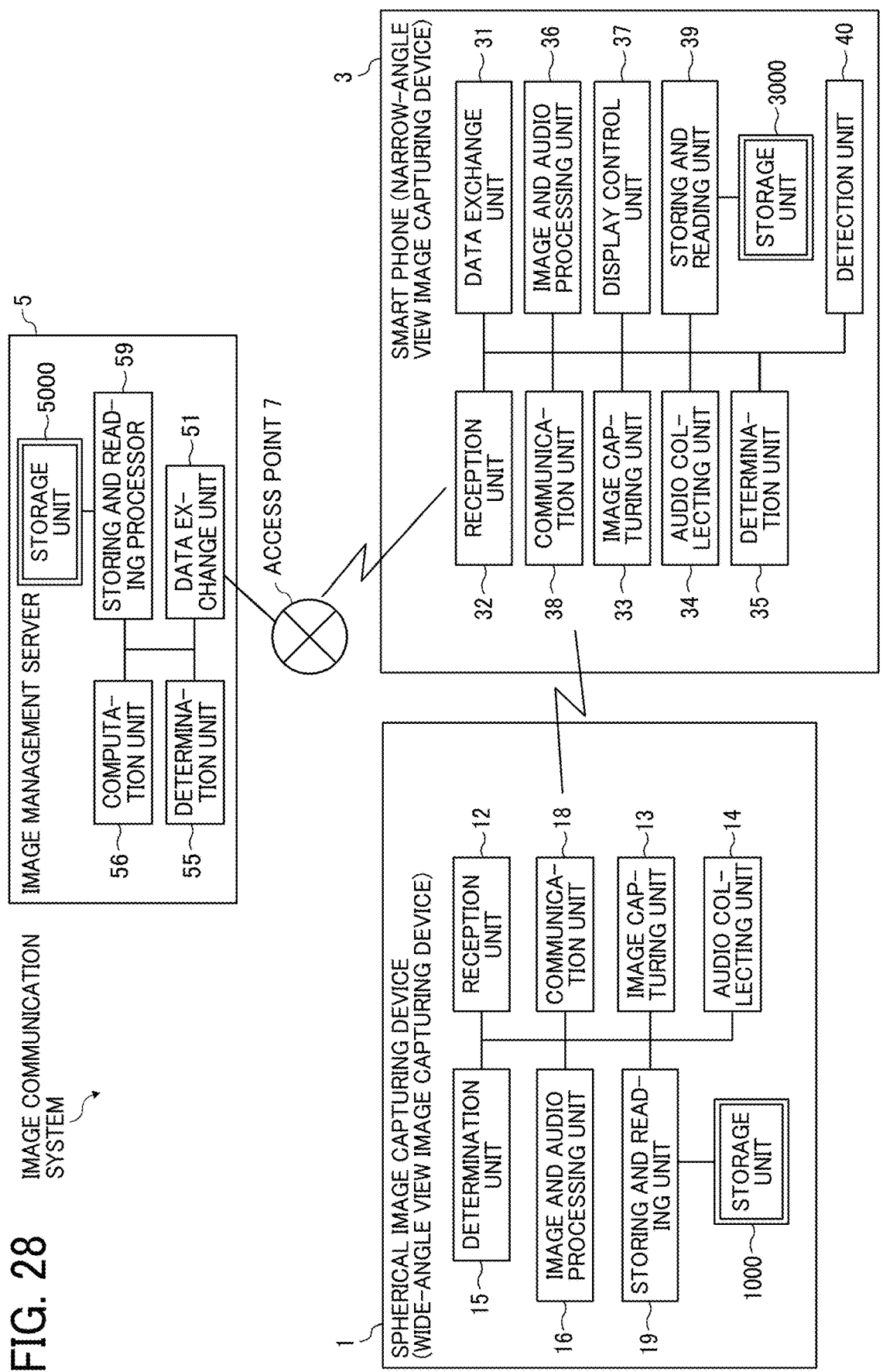
FIG. 28 is a schematic block diagram illustrating a functional configuration of the image communication system according to the fifth embodiment.

Referring now to FIG. 28, a functional configuration of the image communication system is described according to the embodiment. FIG. 28 is a schematic block diagram illustrating a functional configuration of the image communication system according to the fifth embodiment. Since the spherical image capturing device 1 and the smart phone 3 are substantially same in functional configuration as described in the second to fourth embodiments, description thereof is omitted, while using the same reference numerals for the same functional units. Since the access point 7 is a general-purpose access point, description of functional configuration thereof is omitted.

Functional Configuration of Image Management Server:

Referring to FIG. 28, a functional configuration of the image management server 5 is described according to the embodiment.

As illustrated in FIG. 28, the image management server 5 includes a data exchange unit 51, a determination unit 55, a computation unit 56, and a storing and reading unit 59. These units are functions that are implemented by or that are caused to function by operating any of the elements illustrated in FIG. 27 in cooperation with the instructions of the CPU 111 according to the image capturing device control program deployed from the HD 504 to the RAM 503.

The image management server 5 further includes a storage unit 5000, implemented by the ROM 502 and the HD 504 illustrated in FIG. 27.

Functional Configuration of Image Communication System:

Still referring to FIGS. 27 and 28, each functional unit of the image management server 5 is described according to the embodiment.

The data exchange unit 51 of the image management server 5, which is implemented by instructions of the CPU 501 to the network I/F 509, transmits or receives various data or information to or from other device (for example, the smart phone 3) through a communication network such as the Internet.

The determination unit 55, which is implemented by instructions of the CPU 501, performs various determinations.

The computation unit 56, which is implemented by instructions of the CPU 501, performs various calculations.

The storing and reading unit 59, which is implemented by instructions of the CPU 501, stores various data or information in the storage unit 5000 or reads out various data or information from the storage unit 5000.

Example Operation

Figure 29:
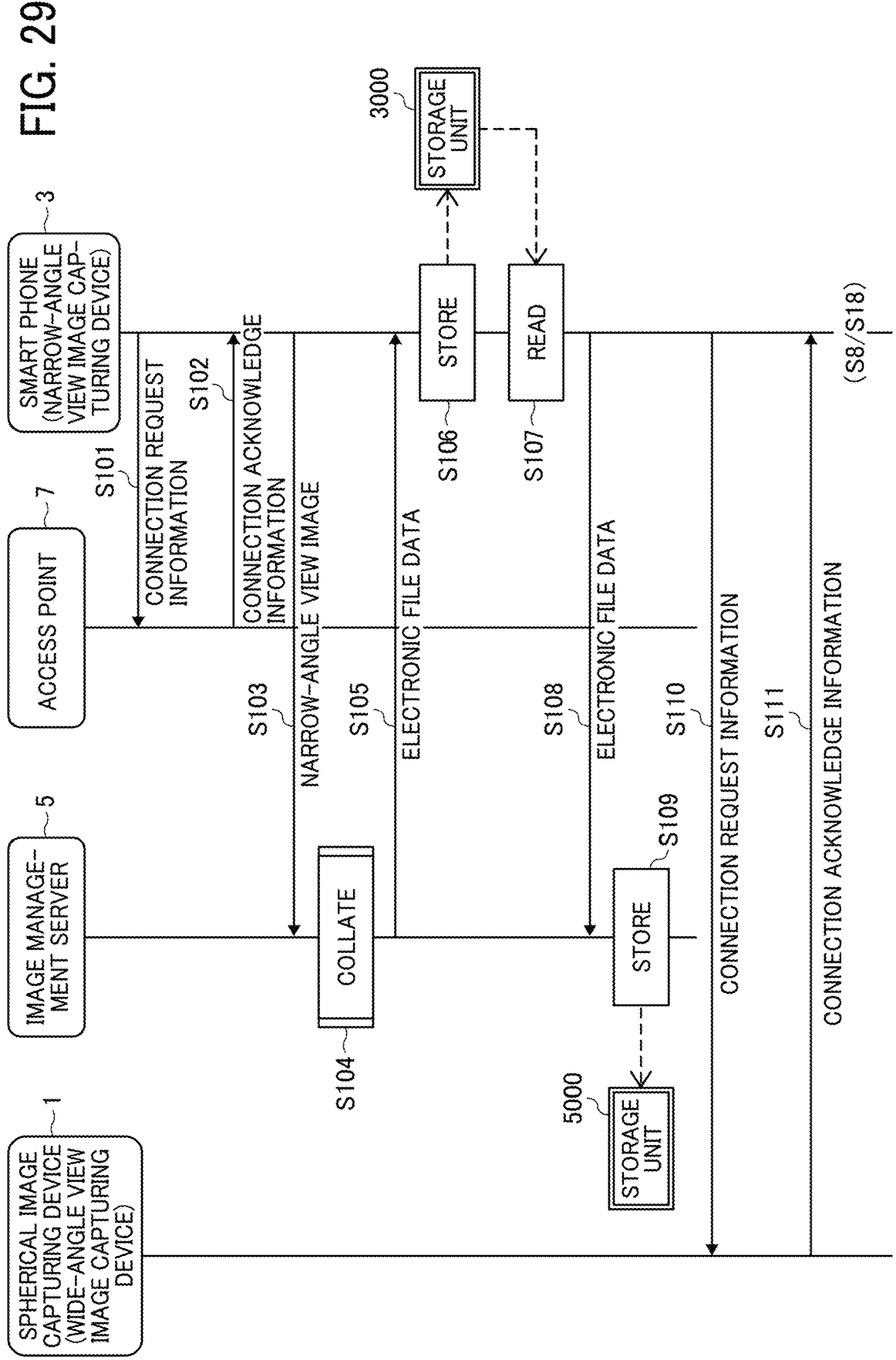
FIG. 29 is a sequence diagram illustrating operation of processing communication of electronic file data, according to the fifth embodiment.

The processing or operation of the fifth embodiment will be described with reference to FIG. 29. FIG. 29 is a sequence diagram illustrating processing to communicate electronic file data according to the fifth embodiment. In the fifth embodiment, it is assumed that the processing of FIG. 21 is performed between S7 of FIG. 12 (or S17 of FIG. 25) and S8 of FIG. 12 (or S18 of FIG. 25) of the second to fourth embodiments.

First, after the process of S7 (or S17), the communication unit 38 of the smart phone 3 transmits connection request information indicating a connection request to the access point 7 (S101). Accordingly, the access point 7 receives the connection request information.

Next, the access point 7 transmits connection acknowledge information indicating that the connection request is acknowledged to the smart phone 3 (S102). The communication unit 38 of the smart phone 3 receives the connection acknowledge information. Through processing of S101 and S102, a destination of the Wi-Fi connection of the smart phone 3 (that is, a communication counterpart) is switched from the spherical image capturing device 1 to the access point 7.

Next, the communication unit 38 of the smart phone 3 transmits the narrow-angle view image data acquired at S2 (or S15) to the image management server 5 via the access point 7 (S103).

Accordingly, the data exchange unit 51 of the image management server 5 receives the narrow-angle view image data.

Figure 30:
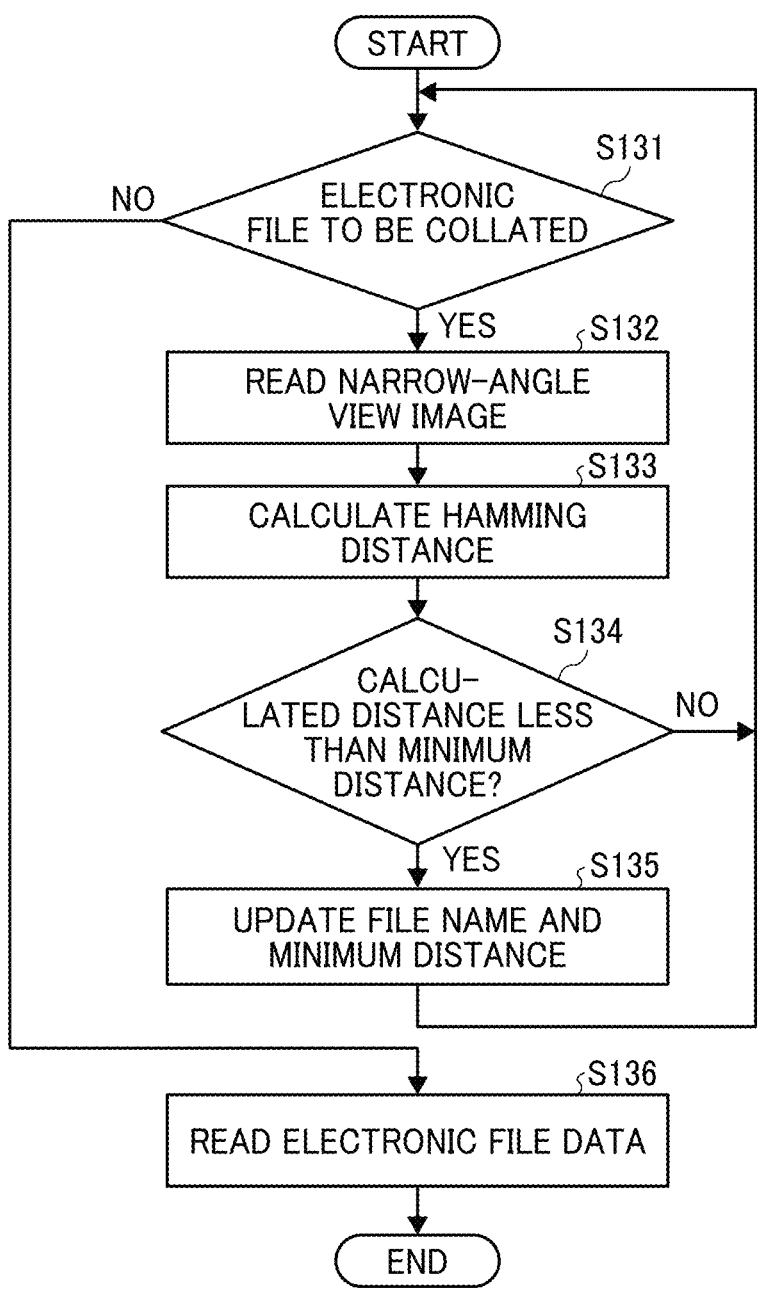
FIG. 30 is a flowchart illustrating collation processing on the narrow-angle view image data, according to the fifth embodiment.

Next, the image management server 5 performs collation processing on the narrow-angle view image data (S104). Referring to FIG. 30, collation processing is described in detail. FIG. 30 is a flowchart illustrating collation processing performed on the narrow-angle view image data, according to the embodiment.

As illustrated in FIG. 30, the determination unit 55 of the image management server 5 determines whether or not any electronic file stored in the storage unit 5000 is to be collated (S131). When it is determined that there is any electronic file to be collated exists (S131: YES), the storing and reading unit 59 reads out the narrow-angle view image data, from the electronic file (S132).

Next, the computation unit 56 compares the narrow-angle view image data received at S103 obtained through image capturing, with the narrow-angle view image data read at S132, to calculate the Hamming distance (S133). There are various methods for calculating the Hamming distance. In this disclosure, according to the well-known method, average Hash is used as a feature value of the narrow-angle view image data received at S103, and the computation unit 56 obtains a 64 bit feature value (hash value) as follows.

(1) The narrow-angle view image data is converted to grayscale image data.

(2) The grayscale image data is reduced in data size so that the grayscale image data has 64 (8×8) pixels.

(3) The average value is obtained for each pixel of the grayscale image data.

(4) The 64 bit feature value (hash value) is obtained for each pixel of the grayscale image data. Specifically, the value of pixel is set to 1 if the pixel has a value equal to or greater than the average value obtained at (3). The value of pixel is set to 0 if the pixel has a value less than the average value obtained at (3).

(5) Hamming distance of the hash value obtained at (4) is calculated, between the narrow-angle view image data received at S103 and the narrow-angle view image data read at S132 for collation.

Next, the determination unit 55 compares a distance L1 calculated at S133 with the minimum distance L0 obtained from the previous collation processing, and determines whether or not the distance L1 is less than the minimum distance L0 (S134). When the distance L1 is less than the minimum distance L0 (S134: YES), the storing and reading unit 59 updates the calculated distance L1 as the minimum distance, and temporarily stores the distance L1 in the storage unit 3000 in association with a file name of the narrow-angle view image data that is read at S132 (S135). The operation then returns to S131. When it is determined that the distance L1 is not less than the minimum distance L0 at S134 (S134: NO), the operation returns to S131.

On the other hand, when there is no electronic file to be collated is stored in the storage unit 5000 at S131 (S131: NO), the storing and reading unit 59 reads out the electronic file data having the file name that is temporarily stored at S135 (S136).

Through processing of FIG. 22, the narrow-angle view image data, which is collated with the narrow-angle view image data obtained at S103, is obtained.

The operation of S104 of FIG. 30 ends.

Subsequently, the data exchange unit 51 of the image management server 5 transmits the electronic file data read at S136 to the smart phone 3 via the access point 7 (S105). Accordingly, the communication unit 38 of the smart phone 3 receives the electronic file data.

Next, the storing and reading unit 39 of the smart phone 3 stores the electronic file data received at S105 in the storage unit 3000 (S106).

Next, the storing and reading unit 39 of the smart phone 3 reads out the electronic file data stored at S7 of FIG. 12 (S107). The communication unit 38 transmits the electronic file data read at S107 to the image management server 5 via the access point 7 (S108). Accordingly, the data exchange unit 51 of the image management server 5 receives the electronic file data.

Next, the storing and reading unit 59 of the image management server 5 stores the electronic file data received at S108 in the storage unit 5000 (S109). Through processing of S107 and S108, the electronic file data managed by the image management server 5 is kept up to date.

Next, the communication unit 38 of the smart phone 3 transmits connection request information indicating a connection request to the spherical image capturing device 1 (S110). Accordingly, the data exchange unit 11 of the spherical image capturing device 1 receives the connection request information.

Next, the spherical image capturing device 1 transmits connection acknowledge information indicating that the connection request is acknowledged to the smart phone 3 (S111). The communication unit 38 of the smart phone 3 receives the connection acknowledge information. Through processing of S110 and S111, a destination of the Wi-Fi connection is changed from the access point 7 back to the spherical image capturing device 1, such that the smart phone 3 can immediately execute linked image capturing processing as requested by the user A.

As described above, according to the present embodiment, in addition to the advantage that can be achieved by the second to fourth embodiments, the following advantage can be achieved. One or more items of electronic file data can be stored in the image management server 5, such that a storage area of the storage unit 3000 of the smart phone 3 is not so much affected, even when a size of image data (such as wide-angle view image) is large or a number of items of image data increases. Further, through processing to collate, electronic file data items of the same target object can be associated with each other.

Displaying of Predetermined-Area Images:

As described in the first to fourth and other embodiments, the image communication system according to the fifth embodiment can also displays different predetermined-area images. Specifically, in any processing referring to FIGS. 13, 17, 20, and 22 described above, the determination unit 55 and the storing and reading unit 59 of the image management server 5 may operate as the determination unit 35 and the storing and reading unit 39 of the smart phone 3, while communicating via the access point 7. Any functional unit other than the functional units of the smart phone 3 described above is able to execute the same processing as any one of the first to fourth and other embodiments, according to the fifth embodiment. Accordingly, the image communication system of the fifth embodiment has similar advantages as described above in the first to fourth and other embodiments.

Variation:

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

For example, any one of the above-described embodiments may be performed in various other ways.

The displaying processing of S8 of FIG. 12 (or S18 of FIG. 25) in the fifth embodiment may be repeated twice with different electronic files when executing processing of controlling display of the predetermined-area image of FIG. 14. For example, the display control unit 37 may display images based on a first electronic file and a second electronic file that are different from each other. In one example, the first electronic file and the second electronic file are respectively the electronic file data stored at S7 of FIG. 12 (or S17 of FIG. 25) and the electronic file data stored at S106 of FIG. 21. Accordingly, after displaying an image of the electronic file data that is obtained most recently, the display control unit 37 can display on the display 318 an image of the electronic file data that is similar to the most recent electronic file data, which has been previously obtained (that is, the electronic file data that are collated). This may recall the user's memories more effectively, allowing the user to remember the scene of the photographed image.

Further, at S104 of FIG. 29, the image management server 5 may collate the location information of the captured image data. In such case, the smart phone 3 acquires the location information using the GPS receiver 311 at the time of capturing images at S2 (or S15). The location information includes a latitude and a longitude of a location where the image is captured. Accordingly, at S7 (or S17), the storing and reading unit 39 embeds the location information in the narrow-angle view image data, and stores the narrow-angle view image embedded with the location information. The electronic file may be generated in Exchangeable Image File format (Exif). In this case, at S103 of FIG. 29, the communication unit 38 transmits the location information in addition to the narrow-angle view image data. Further, at S132 of FIG. 30, the storing and reading unit 59 reads out the location information in addition to the narrow-angle view image data. Then, at S133, the computation unit 46 calculates the Euclidean distance, using the coordinates (latitude and longitude of a place where the image is captured) indicated by the location information. By displaying an image previously taken at the same place or near that place, the user may easily recall memories related to the image being displayed. The location information may be acquired by a GPS receiver, which may be provided in the spherical image capturing device 1.

Further, in the fifth embodiment, the communication unit 38 communicates with the image management server 5 via the access point 7. Alternatively, the data exchange unit 31 may communicate with the image management server 5 via a communication network such as the Internet.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on Chip (SOC), and graphical processing unit (GPU), and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Examples of communication network such as the Internet may also include a network implemented by blockchain.

In any one of the above-described embodiments, the image communication system includes the spherical image capturing device 1 and the smart phone 3, but the image communication system may be implemented in various other ways.

For example, the image communication system may include any apparatus installed with a program that causes the apparatus to additionally have a function of the display control unit 37 and a function of the communication unit 38 as described above, and the spherical image capturing device 1. As described above, one example of such apparatus is a wide-angle view image capturing device, which may be implemented by the smart phone, PC, smart watch, display, game machine, car navigation system, and wearable terminal, or any apparatus capable of capturing a wide-angle view image and displaying images. Other examples of such apparatus is any apparatus capable of displaying images, but does not have to be provided with image capturing function. For instance, such apparatus may be implemented by a PC, which obtains the narrow-angle view image and the wide-angle view image, which have been associated with each other, and sequentially displays the narrow-angle view image and a predetermined-area image of the wide-angle view image.

Specifically, in one example, an apparatus for controlling display of an image is provided, which includes circuitry to: obtain a first image and a second image, the second image having an angle of view wider than that of the first image, the second image having been captured by a second image capturing device different from a first image capturing device that has captured the first image; and control a display to sequentially display the first image and one or more images similar to the first image.

In this disclosure, the smart phone is an example of a narrow-angle view image capturing device, which is an example of a first image capturing device. The spherical image capturing device 1 is an example of a wide-angle view image capturing device, which is an example of a second image capturing device.

The waiting time at S3 of FIG. 12 may be set in the smart phone 3 by the user. For example, if the waiting time is set to 0 second, no waiting time occurs, and the smart phone 3 and the spherical image capturing device 1 capture images at the same time, or substantially at the same time. In another example, processing of S3 or S13 may not be performed. That is, processing of S4 may be performed without waiting for the predetermined time. Accordingly, such processing is performed in the same manner as a case when the waiting time is set to 0 second if input of such value is acceptable. Similarly, the waiting time at S13 of FIG. 16 may be set directly on the spherical image capturing device 1 by the user, or may be indirectly set by the user from the smart phone 3 using Bluetooth or the like.

Further, at any one of S4 and S6 of FIGS. 12 and S14 and S16 of FIG. 25, only one of Bluetooth and Wi-Fi may be used.

Further, in at least one of the above-described embodiments, after the smart phone 3 and the spherical imaging device 1 respectively capture images, the smart phone 3 automatically stores the captured images as one electronic file in the storage unit 3000 (S7), but this disclosure is not limited to this example. For example, after the smart phone 3 and the spherical imaging device 1 respectively capture different images, the user A may instruct such as a PC to obtain the captured images (may include audio data), and merge the captured images into one electronic file. The electronic file of captured images may be transferred from the PC to the smart phone 3 to be stored in the storage unit 3000.

Further, when the storing and reading unit 39 stores the electronic file data at S7 of FIG. 12, the display control unit 37 may control the display 318 to display a user interface for receiving a file name, without proceeding to S8. In this case, the smart phone 3 may later perform the display processing of S8 by reading out the desired electronic file data according to operation of the user A. For example, the user A may designate desired electronic file data with a file name. Accordingly, the user A is able to check the displayed contents, not only at the time of image capturing but also at any time desired by the user.

Further, as illustrated in FIG. 15, the display control unit 37 switches the display from the narrow-angle view image to the predetermined-area image, after the waiting time t1, but this disclosure is not limited to this example. For example, the display control unit 37 may continue to display the narrow-angle view image until the smart phone 3 receives an operation input of the user A, such as a touch on the smart phone 3. In response to the operation input of the user A, the display control unit 37 displays the predetermined-area image while changing a predetermined area, at least for a time period during when the operation input, such as touch, by the user A continues (while the touched state remains). When the operation input of the user A is no longer received, the display control unit 37 may display the wide-angle view image again. According to this displaying method, display of the narrow-angle view image and the wide-angle view image can be switched at a timing desired by the user A.

Further, as illustrated in FIG. 15, the display control unit 37 displays the predetermined-area image Q11 in the wide-angle view image, after displaying the narrow-angle view image (the planar image P1, for example), but this disclosure is not limited to this example. For example, the display control unit 37 firstly displays the predetermined-area image Q11, throughout the entire predetermined area T in the equirectangular projection image EC1 as the wide-angle view image, and then displays the planar image P1 as the narrow-angle view image. That is, an order of displaying the respective images may be changed. This variation applies to one or more embodiments in this disclosure.

For example, as a first display pattern, the display control unit 37 performs a series of displaying the narrow-angle view image and displaying a predetermined-area image of the wide-angle view image.

In another example, as a second display pattern, the display control unit 37 repeats the series of displaying the narrow-angle view image and displaying a predetermined-area image of the wide-angle view image.

In another example, as a third display pattern, the display control unit 37 performs a series of displaying the narrow-angle view image, displaying a predetermined-area image of the wide-angle view image, and again displaying the narrow-angle view image. This display pattern may help a person who has taken this image recall feelings at that time with his or her facial expression.

Further, the display control unit 37 may control the display 318 to display a screen for selecting one of the above-described display patterns and prompt the user A to select the display pattern. In this case, the reception unit 32 receives the selection of the user A, and the display control unit 37 displays the selected display pattern.

Further, before and/or after the processing of S8 (or S18), the display control unit 37 may convert the captured image to have a little planet format for display. Since the entire spherical image can be displayed in the little planet format, the user A is able to check the entire image including an area outside the predetermined area T at the end.

Further, in order for the user A to use the smart phone 3 in cooperation with the spherical image capturing device 1, it is necessary to install software application for causing the smart phone 3 to execute the setting for establishing a wireless communication connection with the spherical image capturing device 1 by Wi-Fi or BLUETOOTH, and the processing of FIG. 12, FIG. 16, or FIG. 20. In order to reduce the work by the user that is needed, the following processing can be performed.

Specifically, the storage unit 1000 of the spherical image capturing device 1 stores in advance dedicated software for causing the smart phone 3 to configure a wireless communication connection and implementing the processing of FIG. 12, FIG. 25, or FIG. 29. The spherical image capturing device 1 and the smart phone 3 are connected by a wired cable such as a USB cable. The smart phone 3 accesses the storage unit 1000 of the spherical image capturing device 1 to acquire the dedicated software.

Moreover, at S6 and S16, the spherical image capturing device 1 directly transmits the wide-angle view image data to the smart phone 3. Alternatively, in a modified example, the storing and reading unit 19 of the spherical image capturing device 1 may store the wide-angle view image data in the storage unit 1000, before transmission of the wide-angle view image data.

Further, at the time of storing the electronic file data (S7, S17) in the first embodiment and the variation of the first embodiment, the smart phone 3 may upload the same electronic file data to the image management server 5 of the fifth embodiment, to keep backup data in the image management server 5.

The invention claimed is:

1. An image capturing device comprising:
an imager to capture a first image; and
circuitry configured to
receive a second image from another image capturing device, the second image being captured with the another image capturing device and having an angle of view wider than that of the first image,
store predetermined area information on a predetermined area of the second image that is similar to the first image, the predetermined area information including a center point and an angle of view of the predetermined area,
calculate display time of an image of the predetermined area based on the predetermined area information, and
control a display to sequentially display the first image, and the image of the predetermined area of the second image that is similar to the first image for the calculated display time while moving the predetermined area throughout the second image, the image similar to the first image having a degree of similarity to the first image that is equal to or greater than a threshold,
wherein the image of the predetermined area of the second image has a same aspect ratio as the first image and constitutes entire content of display on the display.

2. The image capturing device of claim 1, wherein, when the area of the second image that is similar to the first image includes a plurality of areas of the second image, the circuitry displays images of the plurality of areas that are similar to the first image, in an order from the image of area having the highest degree of similarity to the image of area having the lowest degree of similarity.

3. The image capturing device of claim 2, wherein the circuitry further displays an image of at least one area of the second image other than the plurality of areas similar to the first image, which lies between one of the plurality of areas similar to the first image and other one of the plurality of areas similar to the first image, after displaying the image of the one area similar to the first image and before displaying the image of the other area similar to the first image.

4. The image capturing device of claim 3, wherein
the area of the second image that is similar to the first image includes a part of or entire object that is similar to a part of or entire object in the first image, and
the circuitry sequentially displays images of different areas of the second image to display the entire object.

5. The image capturing device of claim 4, wherein the circuitry sequentially displays the images of different areas, while moving a display range either 1) from a first position to a second position, or from the second position to the first position, the first position and the second position having different values of imaging direction.

6. The image capturing device of claim 5, wherein the part of object is a face of a particular person, and
the circuitry moves the display range either from 1) the area showing feet of the particular person to the area showing the face of the particular person, or 2) from the area showing the face of the particular person to the area showing feet of the particular person.

7. The image capturing device of claim 1, wherein, when the area of the second image that is similar to the first image includes a plurality of areas of the second image, the circuitry is configured to:
receive selection of one image, from among the images of the plurality of areas of the second image that are similar to the first image, and
display the selected image, and images of one or more areas representing an object in the selected image.

8. An image communication system comprising:
the image capturing device of claim 1; and
the another image capturing device configured to capture the second image.

9. A method of controlling display of an image, comprising:
obtaining a first image and a second image, the second image having an angle of view wider than that of the first image, the second image having been captured by a second image capturing device different from a first image capturing device that has captured the first image;
storing predetermined area information on a predetermined area of the second image that is similar to the first image, the predetermined area information including a center point and an angle of view of the predetermined area;
calculating display time of an image of the predetermined area based on the predetermined area information; and
controlling a display to sequentially display the first image, and the image of the predetermined area of the second image that is similar to the first image for the calculated display time while moving the predetermined area throughout the second image, the image similar to the first image having the degree of similarity to the first image that is equal to or greater than a threshold,
wherein the image of the predetermined area of the second image has a same aspect ratio as the first image and constitutes entire content of display on the display.

10. The method of claim 9, wherein, when the area of the second image that is similar to the first image includes a plurality of areas of the second image, the controlling the display includes:
displaying images of the plurality of areas that are similar to the first image, in an order from the image of area having the highest degree of similarity to the image of area having the lowest degree of similarity.

11. The method of claim 10, further comprising:
displaying an image of at least one area of the second image other than the plurality of areas similar to the first image, which lies between one of the plurality of areas similar to the first image and other one of the plurality of areas similar to the first image, after displaying the image of the one area similar to the first image and before displaying the image of the other area similar to the first image.

12. The method of claim 11, wherein
the area of the second image that is similar to the first image includes a part or entire object that is similar to a part of or entire object in the first image, and
the controlling the display includes sequentially displaying images of different areas of the second image to display the entire object.

13. The method of claim 12, wherein the controlling the display includes sequentially displaying the images of different areas, while moving a display range either 1) from a first position to a second position, or from the second position to the first position, the first position and the second position having different values of imaging direction.

14. A non-transitory recording medium which, when executed by one or more processors, cause the processors to perform a method of controlling display of an image, the method comprising:
obtaining a first image and a second image, the second image having an angle of view wider than that of the first image, the second image having been captured by a second image capturing device different from a first image capturing device that has captured the first image;
storing predetermined area information on a predetermined area of the second image that is similar to the first image, the predetermined area information including a center point and an angle of view of the predetermined area;
calculating display time of an image of the predetermined area based on the predetermined area information; and
controlling a display to sequentially display the first image, and the predetermined image of the area of the second image that is similar to the first image while moving the predetermined area throughout the second image, the image similar to the first image having the degree of similarity to the first image that is equal to or greater than a threshold,
wherein the image of the predetermined area of the second image has a same aspect ratio as the first image and constitutes entire content of display on the display.

15. The image capturing device of claim 1, wherein the circuitry is further configured to:
obtain display setting information including a display time of the first image, and
control the display to sequentially display the first image and the image of the predetermined area of the second image that is similar to the first image while moving the predetermined area throughout the second image according to the display setting information.

16. The image capturing device of claim 15, wherein the display setting information further includes a displayable range of the second image and a total display time of the second image.

17. The image capturing device of claim 1, wherein the circuitry controls the display to display, directly after displaying one of the first image or the image of the predetermined area of the second image, the other one of the first image or the image of the predetermined area of the second image.

18. The image capturing device of claim 1, wherein the circuitry controls the display to repeat a series of displaying the first image and the image of the predetermined area of the second image.

19. The image capturing device of claim 1, wherein the circuitry controls the display to display a series of displaying the first image, the image of the predetermined area of the second image, and again the first image.

* * * * *